(12) United States Patent
Bayer et al.

(10) Patent No.: US 12,239,132 B2
(45) Date of Patent: Mar. 4, 2025

(54) COMPOUNDS AND METHODS FOR INCREASING SOIL NUTRIENT AVAILABILITY

(71) Applicant: SOUND AGRICULTURE COMPANY, Emeryville, CA (US)

(72) Inventors: Travis Bayer, San Francisco, CA (US); Allison Schwartz, Berkeley, CA (US); Kevin Schneider, Petaluma, CA (US); Eric Davidson, San Francisco, CA (US); Christian Ibarra, Half Moon Bay, CA (US); Aden Kinne, Piedmont, CA (US); Megan Kavanaugh, San Luis Obispo, CA (US)

(73) Assignee: SOUND AGRICULTURE COMPANY, Emeryville, CA (US)

( * ) Notice: Subject to any disclaimer, the term of this patent is extended or adjusted under 35 U.S.C. 154(b) by 939 days.

(21) Appl. No.: 17/273,226

(22) PCT Filed: Sep. 25, 2019

(86) PCT No.: PCT/US2019/052907
§ 371 (c)(1),
(2) Date: Mar. 3, 2021

(87) PCT Pub. No.: WO2020/068946
PCT Pub. Date: Apr. 2, 2020

(65) Prior Publication Data
US 2021/0329917 A1  Oct. 28, 2021

Related U.S. Application Data

(60) Provisional application No. 62/736,889, filed on Sep. 26, 2018.

(51) Int. Cl.
*A01N 43/16* (2006.01)
*A01C 1/06* (2006.01)
(Continued)

(52) U.S. Cl.
CPC ............. *A01N 43/16* (2013.01); *A01C 1/06* (2013.01); *A01C 21/00* (2013.01); *A01N 25/08* (2013.01);
(Continued)

(58) Field of Classification Search
CPC ........ A01N 43/16; A01N 83/25; A01N 83/27; A01N 83/20; A01N 83/22; A01N 25/08;
(Continued)

(56) References Cited

U.S. PATENT DOCUMENTS

2015/0257394 A1* 9/2015 Chambers ............... C05F 11/00
504/116.1

FOREIGN PATENT DOCUMENTS

CN    108137521    6/2018
EP    2623502 A1    8/2013
(Continued)

OTHER PUBLICATIONS

IN202117018934, "First Examination Report", Mar. 8, 2023, 9 pages.
(Continued)

*Primary Examiner* — Wayne A Langel
(74) *Attorney, Agent, or Firm* — Kilpatrick Townsend & Stockton LLP

(57) ABSTRACT

Disclosed herein are compounds, salts, solvates of Formula (1), and any formulation thereof. Also disclosed are methods of increasing soil nutrient availability to a plant by contacting a plant or soil with compounds, salts, solvates of Formula (1), or any formulation thereof. The compounds and methods disclosed herein may increase an amount of nitrogen or soluble phosphate in a soil.

27 Claims, 14 Drawing Sheets

(51) Int. Cl.
- *A01C 21/00* (2006.01)
- *A01N 25/08* (2006.01)
- *A01N 25/14* (2006.01)
- *A01N 43/08* (2006.01)
- *A01N 63/20* (2020.01)
- *A01N 63/22* (2020.01)
- *A01N 63/25* (2020.01)
- *A01N 63/27* (2020.01)

(52) U.S. Cl.
CPC .............. *A01N 25/14* (2013.01); *A01N 43/08* (2013.01); *A01N 63/20* (2020.01); *A01N 63/22* (2020.01); *A01N 63/25* (2020.01); *A01N 63/27* (2020.01)

(58) Field of Classification Search
CPC .......... A01N 25/14; A01N 43/08; A01C 1/06; A01C 21/00
See application file for complete search history.

(56) References Cited

FOREIGN PATENT DOCUMENTS

| | | | |
|---|---|---|---|
| EP | 2738267 | 6/2014 | |
| RO | 131928 A2 | 6/2017 | |
| RO | 132514 A2 | 5/2018 | |
| WO | WO 2010/128112 A2 * | 11/2010 | ............. A01N 43/08 |
| WO | WO-2010125065 A2 | 11/2010 | |
| WO | 2013092430 A1 | 6/2013 | |
| WO | WO-2016172655 A1 | 10/2016 | |

OTHER PUBLICATIONS

BR1120210053557 , "Office Action", Aug. 1, 2023, 4 pages.
Marzec, Strigolactones as Part of the Plant Defence System, Trends in Plant Science, vol. 21, No. 11, Nov. 2016, pp. 900-903.
Rozpadek et al., Arbuscular Mycorrhiza Improves Yield and Nutritional Properties of Onion (*Allium cepa*), Plant Physiology and Biochemistry, vol. 107, Jun. 2016, pp. 264-272.
Rydlová et al., Arbuscular Mycorrhiza Differentially Affects Synthesis of Essential Oils in Coriander and Dill, Mycorrhiza, vol. 26, No. 2, Feb. 2016, pp. 123-131.
Umehara, Strigolactone, A Key Regulator of Nutrient Allocation in Plants, Plant Biotechnology, vol. 28, No. 5, 2011, pp. 429-437.
Van Ha et al., Positive Regulatory Role of Strigolactone in Plant Responses to Drought and Salt Stress, Proceedings of the National Academy of Sciences, vol. 111, No. 2, Jan. 14, 2014, pp. 851-856.
Alinanuswe S Mwakaboko et al: Single step synthesis of strigolactone analogues from cyclic keto enols, germination stimulants for seeds of parasitic weeds, Bioorganic& Medicinal Chemistry, vol. 19, No. 16, Jun. 18, 2011 (Jun. 18, 2011), pp. 5006-5011, XP028252920, ISSN:0968-0896, DOI:10.1016/J.BMC.2011.06.057, [retrievedon Jun. 25, 2011].
Bray, R.H. and Kurtz, L.T., Determination of Total Organic and Available Forms of Phosphorus in Soils, 1945, Soil Science, 59, 39-45. http://dx.doi.org/10.1097/00010694-194501000-00006.
Y.P. Chen, P.D. Rekha, A.B. Arun, F.T. Shen, W.-A. Lai, C.C. Young, Phosphate solubilizing bacteria from subtropical soil and their tricalcium phosphate solubilizing abilities, Applied Soil Ecology, vol. 34, issue 1, 2006, pp. 33-41, ISSN 0929-1393, https://doi.org/10.1016/j.apsoil.2005.12.002.

* cited by examiner

*Agar plates containing insoluble phosphate. Microbial solubilization creates clearance 'halos' around colony. Larger halos indicate higher solubilization activity.*

More yield in lettuce trials

We found that Sound treatment increases the average size of lettuce heads, resulting in a 25% increase in harvest weight.

COMPOUNDS AND METHODS FOR INCREASING SOIL NUTRIENT AVAILABILITY

CROSS-REFERENCE

The present application claims the benefit of U.S. Provisional Application Ser. No. 62/736,889, filed Sep. 26, 2018, which is hereby incorporated by reference in its entirety.

BRIEF SUMMARY

In some of many aspects, compounds, formulations, methods, containers, and kits disclosed herein can increase plant nutrient availability and enhance crop yields, for example in broadacre crops like corn, soy, cereals, and wheat, and specialty crops like lettuce and tomatoes. In some instances, the compounds, formulations, methods, containers, and kits herein can reduce fertilizer consumption, while amplifying nutrient use efficiency, drought tolerance, plant growth, and stress resilience (e.g., to climate variability, water limitation).

Disclosed herein is an agricultural formulation that comprises: one or more bacterial cells, and a compound of Formula (1):

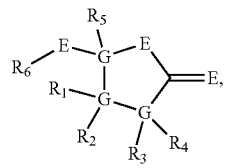

or any salt, solvate, or tautomer thereof,
wherein:
each E is independently O, S, or —NR$_7$;
each G is independently C or N;
R$_1$, R$_4$, R$_5$, and R$_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycle, substituted or unsubstituted heterocycloalkyl, —OR$_8$, —C(O)R$_8$,

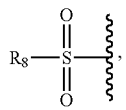

or a lone electron pair, wherein

indicates a single bond;
R$_2$ and R$_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, or a lone electron pair; or R$_2$ and R$_3$ together form a bond, or form a substituted or unsubstituted aryl; and R$_7$ and R$_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl. In some instances, the one or more bacterial cells comprises an isolated bacterium (e.g., purified, or substantially purified). In some instances, the one or more bacterial cells comprises a bacterium from an inoculated or cultured soil. In some instances, the one or more bacterial cells is present in at least about 10 (e.g., at least about 100 or at least about 1000) colony forming units per gram of the agricultural formulation. In some instances, the one or more bacterial cells comprises a wild-type bacterium. In some instances, the one or more bacterial cells comprises a genetically engineered bacterium. In some instances, the compound, salt, solvate, or tautomer has the structure of Formula (2):

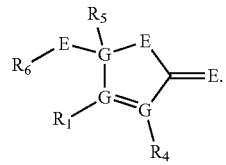

In some instances, R$_4$ is alkyl, e.g., methyl. In some instances, each G is independently C. In some instances, each E is independently O. In some instances, R$_1$ and R$_5$ are each independently H. In some instances, the compound has the structure of Formula (3):

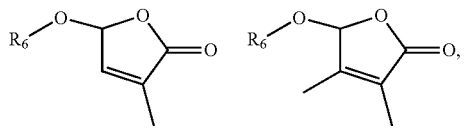

or a salt, solvate, or tautomer thereof. In some instances, R$_6$ has the structure of Formula (4):

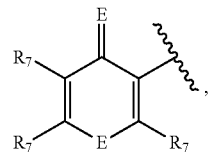

wherein

indicates a single bond. In some instances, each E is independently O, S, or —NR₇. In some instances, each E is independently O. In some instances, R₆ has one of the following structures:

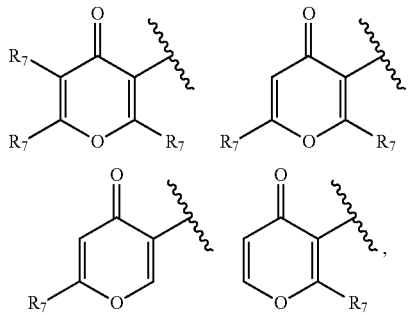

wherein

indicates a single bond. In some instances, each R₇ is independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl. In some instances, each R₇ is H. In some instances, at least one of R₇ is a substituted or unsubstituted alkyl. In some instances, the alkyl is methyl, ethyl, or propyl. In some instances, the alkyl is substituted with a hydroxy. In some instances, at least one of R₇ is —CH₃, —CH₂CH₃, or —CH₂OH. In some instances, the compound has a structure of Formula (5):

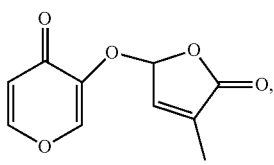

or a salt, solvate, or tautomer thereof. In some instances, the compound, salt, solvate, or tautomer thereof has a structure of Formula (6):

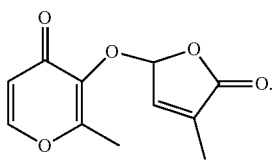 [SMILES: CC1=CC(Oc2c(C)occc2=O)OC1=O]

In some instances, the compound has one of the following structures:

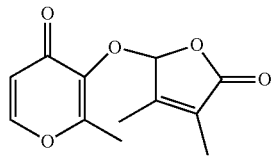

SA-002

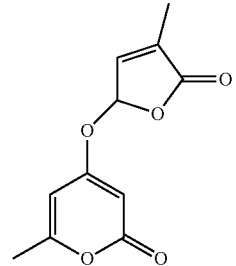

SA-004

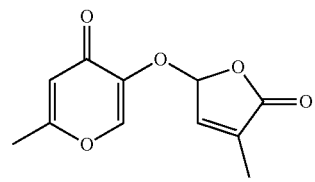

SA-008

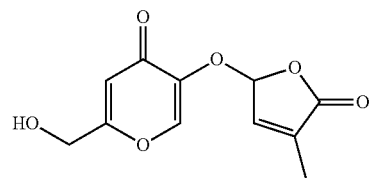

SA-001

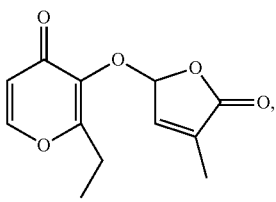

SA-005 or a salt, solvate, or tautomer thereof. In some instances, R₆ has a structure of:

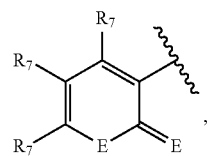

wherein

indicates a single bond. In some instances, R₆ has a structure selected from the group consisting of,

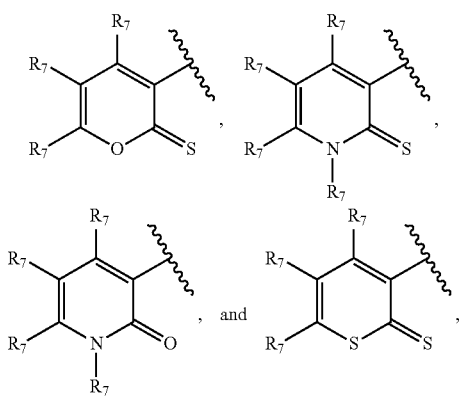

wherein

indicates a single bond. In some instances, the compound has a structure selected from the group consisting of:

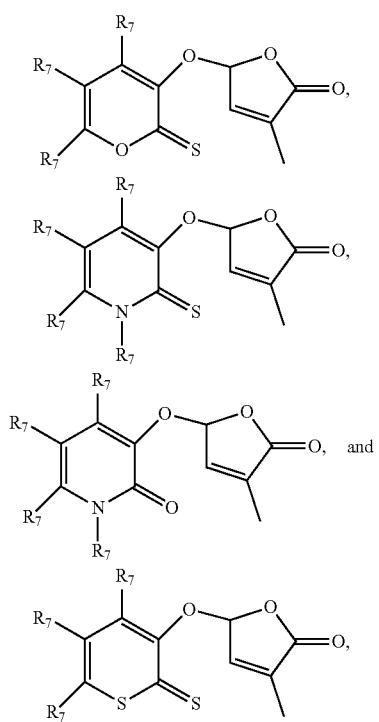

or a salt, solvate, or tautomer thereof. In some instances, the one or more bacterial cells comprises a phosphate solubilizing bacterium. In some instances, the agricultural formulation comprises from about $10^3$ to about $10^{11}$ colony forming units of the phosphate solubilizing bacterium per gram of the agricultural formulation. In some instances, the phosphate solubilizing bacterium comprises a recombinant phosphate solubilizing bacterium. In some instances, the phosphate solubilizing bacterium comprises a bacteria strain of the genus *Bacillus*. In some instances, the bacteria strain comprises the species *Bacillus megatarium*. In some instances, the one or more bacterial cells comprises a nitrogen fixing bacterium. In some instances, the agricultural formulation comprises from about $10^3$ to about $10^{11}$ colony forming units of the nitrogen fixing bacterium per gram of the agricultural formulation. In some instances, the nitrogen fixing bacterium comprises a recombinant nitrogen fixing bacterium. In some instances, the nitrogen fixing bacterium comprises *Azotobacter vinlandii*. In some instances, the agricultural formulation further comprises an insoluble phosphate. In some instances, the insoluble phosphate comprises calcium phosphate, aluminum phosphate, iron phosphate, or any combination thereof. In some instances, the insoluble phosphate is present in rock phosphate, bonemeal, or manure. In some instances, the agricultural formulation further comprises an agriculturally acceptable excipient. In some instances, the agriculturally acceptable excipient comprises a talc based carrier or a wettable powder. In some instances, the one or more bacterial cells comprises at least one Gram negative cell. In some instances, the at least one Gram negative cell comprises a Gram negative cocci, a Gram negative bacillus, or a combination thereof. In some instances, the one or more bacterial cells comprises at least one Gram positive cell. In some instances, the at least one Gram positive cell comprises a Gram positive cocci, a Gram positive bacillus, or a combination thereof. In some instances, the one or more bacterial cells comprises or further comprises at least one member selected from the group consisting of chlamydiae, green nonsulfure bacteria, acinobacteria, planctomycetes, spirochaetes, fusobacteria, cyanobacteria, thermophilic bacteria, acidobacteria, proteobacteria, *Azotobacter chroococcum, Pseudomonas stutzeri, Pseudomonas pseudoalcaligenes, Massilia tieshanesis, Massilia aerilata, Massilia putida, Bacillus solisilvae, Bacillus niacini, Massilia agilis, Bacillus wiedmannii, Massilia brevitalea, Bacillus acidiceler, Bacillus toyonensis, Pseudomonas otitidis, Pseudomonas citronellolis, Paenibacillus qinlingensis, Massilia solisilvae, Massilia terrae, Bacillus paramycoides, Massilia aurea, Bacillus acidicola, Panenibacillus alginolyticus, Bacillus novalis, Pseudomonas aeruginosa, Bacillus halmapalus, Pseudomonas knackmussii, Massilia arvi, Massilia agri, Massilia pinisoli, Bacillus megaterium, Bacillus bataviensis, Massilia chloroacetimidivorans, Bacillus mycoides, Bacillus flexus, Bacillus simplex, Pseudomonas balearica, Pseudomonas plecoglossicida, Caballeronia turbans, Psychobacillus lasiicaptis, Bacillus soli, Bacillus cohnii, Cupriavidus campinensis, Brevibacterium frigoritolerans, Bacillus pocheonensis, Pseudomonas monteilii, Bacillus vireti, Bacillus pacificus, Paenibacillus taihuensis, Azotobacter beijerinckii, Paenibacillus contaminans, Bacillus drentensis, Bacillus thuringiensis, Bacillus firmus, Bacillus cereus, Bacillus mobilis, Bacillus luciferensis, Massilia niastensis, Bacillus cucumis, Pseudomonas flavescens, Massilia timonae, Massilia kyonggiensis, Pseudomonas indica, Bacillus phyllosphaerae, Pseudomonas guguanensis, Paenibacillus beijingensis, Bacillus pseudomycoides, Adhaeribacter terreus, Microvirga zambiensis, Pseudomonas oryzae*, and any combination thereof In some aspects, disclosed herein is an agricultural formulation that comprises one or more bacterial cells, and a compound of Formula (6):

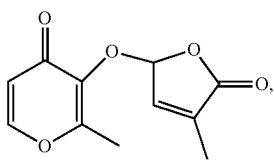 [SMILES: CC1=CC(Oc2c(C)occc2=O)OC1=O]

or a salt, solvate, or tautomer thereof, and an agriculturally acceptable excipient. In some instances, the one or more bacterial cells comprises an isolated bacterium (e.g., purified, or substantially purified). In some instances, the one or more bacterial cells comprises a bacterium from an inoculated or cultured soil. In some instances, the one or more bacterial cells is present in at least about 10 (e.g., at least about 100 or at least about 1000) colony forming units per gram of the agricultural formulation. In some instances, the one or more bacterial cells comprises a wild-type bacterium. In some instances, the one or more bacterial cells comprises a genetically engineered bacterium. In some instances, the one or more bacterial cells comprises a phosphate solubilizing bacterium, a nitrogen fixing bacterium, or a combination thereof. In some instances, the phosphate solubilizing bacterium comprises a bacteria strain of the genus *Bacillus*. In some instances, the bacteria strain of the genus *Bacillus* comprises *Bacillus megatarium*. In some instances, the nitrogen fixing bacterium comprises Azotobacter vinlandii. In some instances, the one or more bacterial cells comprises at least one Gram negative cell. In some instances, the at least one Gram negative cell comprises a Gram negative cocci, a Gram negative bacillus, or a combination thereof. In some instances, the one or more bacterial cells comprises at least one Gram positive cell. In some instances, the at least one Gram positive cell comprises a Gram positive cocci, a Gram positive bacillus, or a combination thereof. In some instances, the one or more bacterial cells comprises at least one member selected from the group consisting of chlamydiae, green nonsulfure bacteria, acinobacteria, planctomycetes, spirochaetes, fusobacteria, cyanobacteria, thermophilic bacteria, acidobacteria, proteobacteria, *Azotobacter chroococcum, Pseudomonas stutzeri, Pseudomonas pseudoalcaligenes, Massilia tieshanesis, Massilia aerilata, Massilia putida, Bacillus solisilvae, Bacillus niacini, Massilia agilis, Bacillus wiedmannii, Massilia brevitalea, Bacillus acidiceler, Bacillus toyonensis, Pseudomonas otitidis, Pseudomonas citronellolis, Paenibacillus qinlingensis, Massilia solisilvae, Massilia terrae, Bacillus paramycoides, Massilia aurea, Bacillus acidicola, Panenibacillus alginolyticus, Bacillus novalis, Pseudomonas aeruginosa, Bacillus halmapalus, Pseudomonas knackmussii, Massilia arvi, Massilia agri, Massilia pinisoli, Bacillus megaterium, Bacillus bataviensis, Massilia chloroacetimidivorans, Bacillus mycoides, Bacillus flexus, Bacillus simplex, Pseudomonas balearica, Pseudomonas plecoglossicida, Caballeronia turbans, Psychobacillus lasiicaptis, Bacillus soli, Bacillus cohnii, Cupriavidus campinensis, Brevibacterium frigoritolerans, Bacillus pocheonensis, Pseudomonas monteilii, Bacillus vireti, Bacillus pacificus, Paenibacillus taihuensis, Azotobacter beijerinckii, Paenibacillus contaminans, Bacillus drentensis, Bacillus thuringiensis, Bacillus firmus, Bacillus cereus, Bacillus mobilis, Bacillus luciferensis, Massilia niastensis, Bacillus cucumis, Pseudomonas flavescens, Massilia timonae, Massilia kyonggiensis, Pseudomonas indica, Bacillus phyllosphaerae, Pseudomonas guguanensis, Paenibacillus beijingensis, Bacillus pseudomycoides, Adhaeribacter terreus, Microvirga zambiensis, Pseudomonas oryzae*, and any combination thereof.

In some aspects, the present disclosure provides a method comprising contacting a plant or seed with an agricultural formulation described herein.

In some aspects, the present disclosure provides a method comprising adding an agricultural formulation described herein to a soil, wherein the soil comprises one or more consortia cultures.

In some aspects, the present disclosure provides a method comprising contacting a plant, seed, or soil one or more bacterial cells described herein, concurrently or separately with a compound described herein, for example a compound of Formula (1):

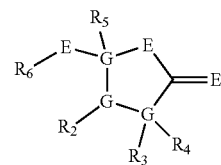

or any salt, solvate, or tautomer thereof, and
wherein:
each E is independently O, S, or —NR$_7$;
each G is independently C or N;
R$_1$, R$_4$, R$_5$, and R$_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycle, substituted or unsubstituted heterocycloalkyl, —OR$_8$, —C(O)R$_8$,

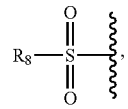

or a lone electron pair, wherein

indicates a single bond;
R$_2$ and R$_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, or a lone electron pair; or R$_2$ and R$_3$ together form a bond, or form a substituted or unsubstituted aryl; and R$_7$ and R$_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl. In some instances, the plant, seed, or soil is contacted concurrently with the one or more bacterial cells and the compound of Formula (1), salt, solvate, or tautomer thereof. In some instances, the plant, seed, or soil is contacted with the one or more bacterial cells before the compound of Formula (1), salt, solvate, or tautomer thereof. In some instances, the plant, seed, or soil is contacted with the compound of Formula (1), salt, solvate, or tautomer thereof before the one or more bacterial cells. In some instances, the yield of the contacted plant or seed is increased at least about 10% compared to a substantially identical but otherwise uncontacted plant. In some instances, the contacted plant or seed exhibits reduced leaf firing compared to a substantially identical but otherwise uncontacted plant. In some instances, the contacting increases by at least about 10% in shoot height, root surface area, root length, or any combination thereof, compared to a substantially identical but otherwise uncontacted plant. In some instances, the contacting comprises treating the plant or seed at least about: 1 µg of the compound, salt, solvate, or tautomer, per the seed or plant. In some instances, the contacting comprises a foliar spray. In some instances, the soil is a phosphate deficient soil. In some instances, the contacting increases an amount of an orthophosphate in the soil by at least about: 10%, 50%, 100%, 200%, or 300%, relative to an amount of the orthophosphate in the soil after contacting the soil with a control agricultural formulation lacking the compound, salt, solvate, or tautomer. In some instances, the contacting increases an amount of nitrogen in the soil by at least about: 10%, 50%, 100%, 200%, or 300%, relative to an amount of nitrogen in the soil after contacting the soil with a control agricultural formulation lacking the compound, salt, solvate, or tautomer. In some instances, the contacting increases an amount of nitrogen in a plant tissue by at least about: 10%, 50%, 100%, 200%, or 300%, relative to an amount of nitrogen in the plant tissue after contacting the soil with a control agricultural formulation lacking the compound, salt, solvate, or tautomer. In some instances, the increase is measured by measuring an amount of acetylene or ethylene gas released from nitrogenase activity. In some instances, the contacting increases expression of at least one nitrogen fixing gene in the one or more bacterial cells. In some instances, the at least one nitrogen fixing gene comprises 1, 2, 3, or more nif operon structural genes. In some instances, the nif operon structural genes comprise nifH, nifD, nifK, or any combination thereof. In some instances, the compound, salt, solvate, or tautomer thereof is present in a concentration of at least about: 1 µg/mL, 5 µg/mL, 10 µg/mL, 25 µg/mL, or 50 µg/mL.

In some aspects, the present disclosure provides a container that comprises the agricultural formulation described herein, optionally wherein the one or more bacterial cells and the compound, salt, solvate, or tautomer thereof are in separate compartments of the container.

In some aspects, the present disclosure provides a kit that comprises the container described herein and instructions for use thereof.

In some aspects, the present disclosure provides a kit that comprises two or more compartments, one or more of which comprises one or more bacterial cells described herein, and another of which comprises a compound described herein, for example a compound of Formula (1):

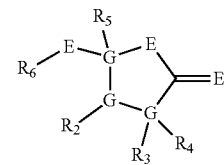

or any salt, solvate, or tautomer thereof, and
wherein:
each E is independently O, S, or —NR$_7$;
each G is independently C or N;
R$_1$, R$_4$, R$_5$, and R$_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycle, substituted or unsubstituted heterocycloalkyl, —OR$_8$, —C(O)R$_8$,

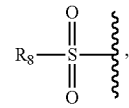

or a lone electron pair, wherein

indicates a single bond;
R$_2$ and R$_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted heterocycloalkyl, substituted or unsubstituted cycloalkyl, substituted or unsubstituted heterocycloalkyl, or a lone electron pair; or R$_2$ and R$_3$ together form a bond, or form a substituted or unsubstituted aryl; and
R$_7$ and R$_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

In some aspects, the present disclosure provides a method of making an agricultural formulation, comprising admixing one or more bacterial cells described herein (for example a phosphate solubilizing bacterium, a nitrogen fixing bacterium, or a combination thereof), with a compound described herein, for example a compound of Formula (1):

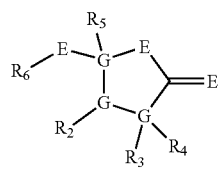

or any salt, solvate, or tautomer thereof,
wherein:
each E is independently O, S, or —NR$_7$;
each G is independently C or N;
R$_1$, R$_4$, R$_5$, and R$_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heterocycle, substituted or unsubstituted heteroarylalkyl, substituted or unsubstituted cycloalkyl, substituted or unsubstituted heterocycloalkyl, —OR$_8$, —C(O)R$_8$,

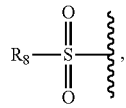

or a lone electron pair, wherein

indicates a single bond;
R$_2$ and R$_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, or a lone electron pair; or R$_2$ and R$_3$ together form a bond, or form a substituted or unsubstituted aryl; and R$_7$ and R$_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

In some aspects, the present disclosure provides a method comprising contacting a compound described herein, for example a compound of Formula (1):

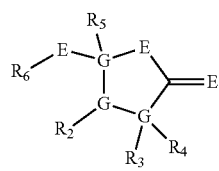

or any salt, solvate, or tautomer thereof, with a soil microbial consortium, wherein:
each E is independently O, S, or —NR$_7$;
each G is independently C or N;
R$_1$, R$_4$, R$_5$, and R$_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heterocycle, substituted or unsubstituted heteroarylalkyl, substituted or unsubstituted cycloalkyl, substituted or unsubstituted heterocycloalkyl, —OR$_8$, —C(O)R$_8$,

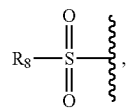

or a lone electron pair, wherein

indicates a single bond;
R$_2$ and R$_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, or a lone electron pair; or R$_2$ and R$_3$ together form a bond, or form a substituted or unsubstituted aryl; and R$_7$ and R$_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl. In some instances, the method increases diversity, abundance, or a combination thereof, of the soil microbial consortium. In some instances, the method increases a population of a nitrogen fixing bacterium in the soil microbial consortium. In some instances, the nitrogen fixing bacterium comprises *Azotobacter chroococcum, Pseudomonas stutzeri*, or a combination thereof. In some instances, the contacted soil microbial consortium comprises one or more of *Azotobacter chroococcum, Pseudomonas stutzeri, Pseudomonas pseudoalcaligenes, Massilia tieshanesis, Massilia aerilata, Massilia putida, Bacillus solisilvae, Bacillus niacini, Massilia agilis, Bacillus wiedmannii, Massilia brevitalea, Bacillus acidiceler, Bacillus toyonensis, Pseudomonas otitidis, Pseudomonas citronellolis, Paenibacillus qinlingensis, Massilia solisilvae, Massilia terrae, Bacillus paramycoides, Massilia aurea, Bacillus acidicola, Panenibacillus alginolyticus, Bacillus novalis, Pseudomonas aeruginosa, Bacillus halmapalus, Pseudomonas knackmussii, Massilia arvi, Massilia agri, Massilia pinisoli, Bacillus megaterium, Bacillus bataviensis, Massilia chloroacetimidivorans, Bacillus mycoides, Bacillus flexus, Bacillus simplex, Pseudomonas balearica, Pseudomonas plecoglossicida, Caballeronia turbans, Psychobacillus lasiicaptis, Bacillus soli, Bacillus cohnii, Cupriavidus campinensis, Brevibacterium frigoritolerans,*

*Bacillus pocheonensis, Pseudomonas monteilii, Bacillus vireti, Bacillus pacificus, Paenibacillus taihuensis, Azotobacter beijerinckii, Paenibacillus contaminans, Bacillus drentensis, Bacillus thuringiensis, Bacillus firmus, Bacillus cereus, Bacillus mobilis, Bacillus luciferensis, Massilia niastensis, Bacillus cucumis, Pseudomonas flavescens, Massilia timonae, Massilia kyonggiensis, Pseudomonas indica, Bacillus phyllosphaerae, Pseudomonas guguanensis, Paenibacillus beijingensis, Bacillus pseudomycoides, Adhaeribacter terreus, Microvirga zambiensis, Pseudomonas oryzae*, or any combination thereof. In some instances, in the contacted soil microbial consortium, *Azotobacter chroococcum* is present in a relative abundance of about 30% to about 40%, and *Pseudomonas stutzeri* is present in a relative abundance of about 10% to about 20%.

Incorporation by Reference

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1A:
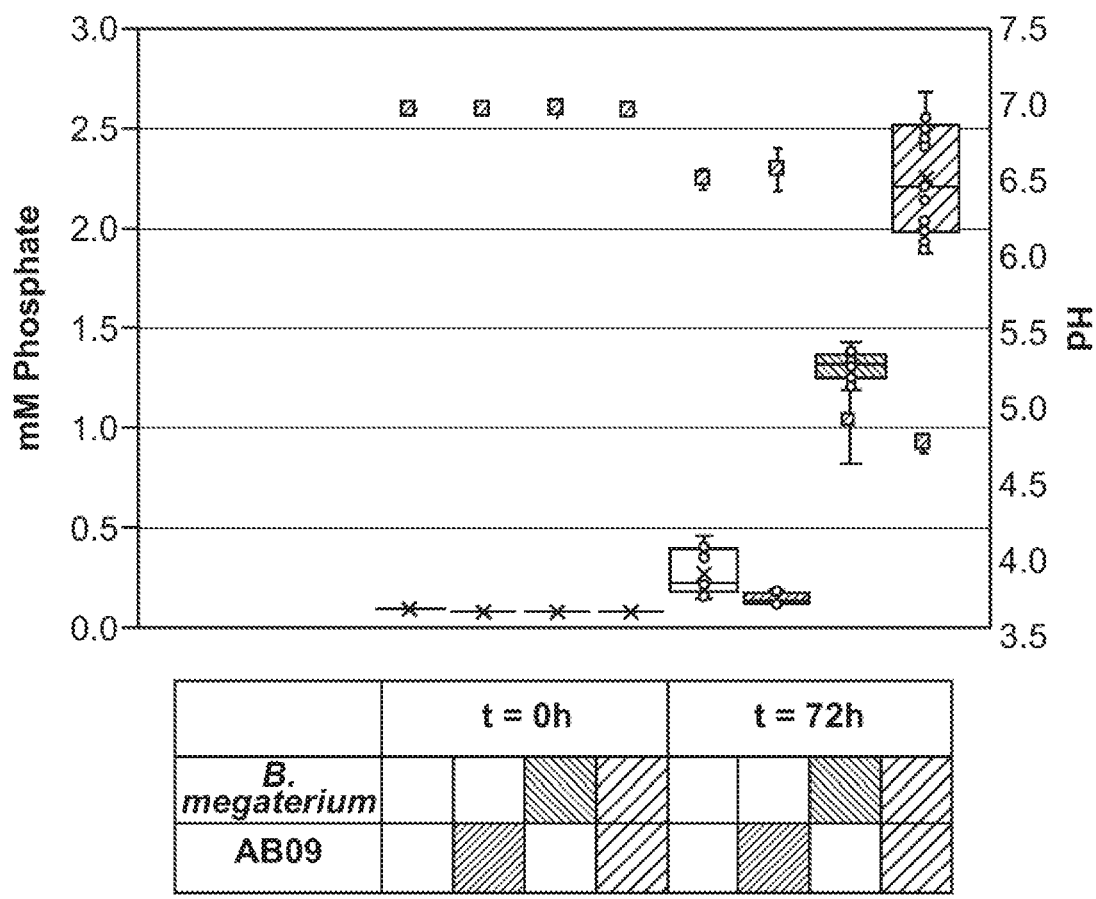
FIGS. 1A and 1B show that AB09 increased phosphate solubilization in *Bacillus megaterium* cultures.

In some aspects, a compound, formulation, method, container, or kit disclosed herein can increase production of available phosphorus and nitrogen available to a plant. In some instances, the formulation can comprise a phosphorous solubilizing bacterium that can covert insoluble phosphate to a form of phosphate available to a plant, a nitrogen fixing bacterium (e.g., legumes) or a fertilizer compound that can covert atmospheric nitrogen to a form of nitrogen available to a plant, or a combination thereof.

In some aspects, disclosed herein are small molecule compounds (e.g., molecular weight less than 500 daltons) that can serve as universal signals to native microbes to increase agronomically important activities is a potential solution for a standardized method to improve the soil's ability to provide nutrients to plants. In some instances, the small molecule can be chemically reminiscent of the broad class of strigolactone plant hormones used by plants to signal to symbiotic fungi in response to phosphate deficiency. In some instances, the small molecule can act as a soil amendment and stimulates microbial phosphate solubilization and nitrogen fixation activity. In some instances, the small molecule can cause an increase in bacterial phosphate solubilization and nitrogen fixation in model microbial systems and in diverse consortia of soil microbes. In some instances, the small molecule can improve plant growth across several metrics. In some instances, the small molecule can enhance microbial activities known to be beneficial to plants and be an avenue toward the chemical reprogramming of the soil microbiome for improved plant health. In some instances, the small molecule can be AB09.

In some aspects, compounds, formulations, methods, container, or kits herein can overcome the disadvantages of conventional efforts to improve bacterial phosphate solubilization and nitrogen fixation in soils. The conventional strategy has relied upon on the introduction of microbial inoculants into the soil, and has been ineffective in broad-acre farming and has several disadvantages: 1.) The viability of live microbes is reduced when bottled and not maintained in proper growth conditions 2.) Many beneficial soil microorganisms cannot be cultured 3.) The persistence and bioactivity of added soil microbes may be low due to being out-competed by the native, established soil microbial population and 4.) There are complex regulatory requirements and restrictions in the introduction of microbes to the environment.

In some instances, disclosed herein is a measurement of orthophosphate in liquid cultures of *Bacillus megaterium*, with and without the addition of maltol lactone (ML). At 72 hours, the average concentration of orthophosphate significantly increased in *Bacillus megaterium* cultures with ML compared to control *Bacillus megaterium* cultures.

In some instances, disclosed herein is qualitative observation phosphate solubilization. Increased consumption of insoluble phosphate was observed in test tubes with added ML, as evidenced by a clearing of the solution in the test tubes, relative to test tubes containing *Bacillus megaterium* alone.

In some instances, disclosed herein is a measurement of ML-induced phosphate solubilization in soil. The level of orthophosphate was significantly increased with ML treatment in non-sterile soil, compared to a control non-sterile soil lacking ML treatment.

In some instances, disclosed herein is a field trial of AB09 application to corn plants. Plants treated with AB09 exhibited reduced leaf firing (yellowing of the lower leaves) compared to control plants.

In some instances, disclosed herein is an aerial photograph description of a large scale strip field trial of corn plants applied with a compound, formulation, method, container, or kit disclosed herein, for example AB09. The plants treated with AB09 exhibited reduced yellowing at de-tassling than control plants. Greener (less yellow) coloring is indicative of healthier plants.

In some instances, a compound, formulation, method, container, or kit disclosed herein can release nutrients bound in soil to make them available for plant growth, and enhance inoculant activity as well as the activity of endogenous soil microbes. Such enhanced plant nutrition leads to higher yield potential.

In some instances, a compound, formulation, method, container, or kit disclosed herein can boost plants to release a signalling compound requiring nutrients (nitrogen and phosphorus) to soil microbes. Arbuscular mycorrhizal fungi (AMF) and phosphate solubilizing microbes (PSM) can sense these signals and increase phosphate solubilization and root symbiosis. As a result, nitrogen and phosphorous are liberated from the soil and available for uptake by plants.

In some instances, a compound, formulation, method, container, or kit disclosed herein can structurally resemble a flavonoid and/or a strigolactone, but increase dramatically phosphate solubilization activity of soil microbes such as PSM. In some instances, a a compound, formulation, method, container, or kit herein may not have effect on plant in absence of microbes.

In some instances, disclosed herein is a drug discovery approach for agriculture, which uses synthetic biology, high throughput screening, and big data analytics to rapidly identify and optimize molecular inputs to close the yield gap. The research areas disclosed herein include photosynthesis, shoot architecture, water capture and efficiency, nutrient uptake, and root architecture. With four seasons of both independent and internal field trials on broadacre crops such as corn, soy, and cereals and specialty crops such as tomatoes and lettuce, the data show that the a compound, formulation, method, container, or kit herein are an effective and reliable yield amplifier and produce climate resilient crops.

In some instances, a compound, formulation, method, container, or kit herein can enable broadacre crops such as corn, soy, and wheat to access nutrients previously inaccessible to control plants (without the help of the compound, formulation, method, container, or kit herein). In some instances, the compound, formulation, method, container, or kit disclosed herein not only increase yield performance, but also result in healthier plants and larger, high-quality crops, for example corns. Corn field trials in Buckingham, Iowa have shown that the compound, formulation, method, container, or kit herein lessens the damaging effects of nitrogen deficiency, and help promote healthy plant growth and ear development. The nitrogen content of plants can be quantified with a tissue sample. In a standard tissue sample test of plants with zero nitrogen applies, the compound, formulation, method, container, or kit can lead to higher nitrogen content. The same effect can be seen in drone imagery across large scale strip trials in corn at tasseling. For example, AB09 treated plots show healthier plants across the treated strip. Lab trials for example with wheat on a nutrient-stressed substrate show that plants treated with the compound, formulation, method, container, or kit herein can access nutrients unavailable to control plants. The plant's ability to thrive when challenged with nutrient stress supports vigorous germination and emergence.

In some instances, incorporation of a compound, formulation, method, container, or kit herein results in a higher proportion of larger produce at harvest, in addition to the yield increase.

Definitions

Unless defined otherwise, all technical and scientific terms used herein have the same meaning as commonly understood by one of the ordinary skill in the art to which this disclosure belongs. Although any methods and materials similar or equivalent to those described herein can be used in the practice or testing of the formulations or unit doses herein, some methods and materials are now described. Unless mentioned otherwise, the techniques employed or contemplated herein are standard methodologies. The materials, methods and examples are illustrative only and not limiting.

The details of one or more inventive embodiments are set forth in the accompanying drawings, the claims, and the description herein. Other features, objects, and advantages of the inventive embodiments disclosed and contemplated herein can be combined with any other embodiment unless explicitly excluded.

The open terms for example "contain," "containing," "include," "including," and the like mean comprising.

The singular forms "a", "an", and "the" are used herein to include plural references unless the context clearly dictates otherwise.

Unless otherwise indicated, some instances herein contemplate numerical ranges. When a numerical range is provided, unless otherwise indicated, the range can include the range endpoints. Unless otherwise indicated, numerical ranges can include all values and subranges therein as if explicitly written out.

The term "about" in relation to a reference numerical value can include a range of values plus or minus 10% from that value. For example, the amount "about 10" includes amounts from 9 to 11, including the reference numbers of 9, 10, and 11. The term "about" in relation to a reference numerical value can also include a range of values plus or minus 10%, 9%, 8%, 7%, 6%, 5%, 4%, 3%, 2%, or 1% from that value.

The term "compounds" can refer to compounds encompassed by generic formulae disclosed herein, any subgenus of those generic formulae, and any specific compounds within those generic or subgeneric formulae. The compounds can be a specific specie, a subgenus or larger genus identified either by their chemical structure and/or chemical name. Further, compounds also include substitutions or modifications of any of such species, subgenuses or genuses, which are set forth herein. When the chemical structure and chemical name conflict, the chemical structure can be determinative of the identity of the compound. The compounds can contain one or more chiral centers and/or double bonds and therefore, can exist as stereoisomers, isomers, enantiomers or diastereomers. Accordingly, the chemical structures within the scope of the specification encompass all possible enantiomers and stereoisomers of the illustrated compounds including the stereoisomerically pure form (e.g., geometrically pure, enantiomerically pure or diastereomerically pure) and enantiomeric and stereoisomeric mixtures. Further, when partial structures of the compounds are illustrated, asterisks indicate the point of attachment of the partial structure to the rest of the molecule. Enantiomeric and stereoisomeric mixtures can be resolved into their component enantiomers or stereoisomers using separation techniques or chiral synthesis techniques well known to the skilled artisan. The compounds can include any salt or solvate forms of the compounds. The compounds can include any derivatives of the compounds.

The term "derivative" can be used interchangeably with the term "analog." Compound A can be a derivative or analog of compound B if 1, 2, 3, 4, or 5 atoms of compound A is replaced by another atom or a functional group (e.g., amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl) to form compound B. The term "derivative" can also refer to a chemical compound that is structurally similar to another but differs slightly in composition (as in the replacement of one atom by an atom of a different element or in the presence of a particular functional group)

The term "isolated" can refer to a form isolated from a mixture, e.g., soil, or a substantially purified form, e.g., a high content of 80% or more w/w of all ingredients other than water, or of all active ingredients.

The term "solvate" can include, but is not limited to, a solvate that retains one or more of the activities and/or properties of the compound and that is not undesirable. Examples of solvates include, but are not limited to, a compound in combination with water, isopropanol, ethanol, methanol, DMSO, ethyl acetate, acetic acid, ethanolamine, or combinations thereof.

The term "salt" can include, but are not limited to, salts that retain one or more of the activities and properties of the free acids and bases and that are not undesirable. Illustrative examples of salts include, but are not limited to, sulfates, pyrosulfates, bisulfates, sulfites, bisulfites, phosphates, monohydrogenphosphates, dihydrogenphosphates, metaphosphates, pyrophosphates, chlorides, bromides, iodides, acetates, propionates, decanoates, caprylates, acrylates, formates, isobutyrates, caproates, heptanoates, propiolates, oxalates, malonates, succinates, suberates, sebacates, fumarates, maleates, butyne-1,4-dioates, hexyne-1,6-dioates, benzoates, chlorobenzoates, methylbenzoates, dinitrobenzoates, hydroxybenzoates, methoxybenzoates, phthalates, sulfonates, xylenesulfonates, phenylacetates, phenylpropionates, phenylbutyrates, citrates, lactates, y-hydroxybutyrates, glycolates, tartrates, methanesulfonates, propanesulfonates, naphthalene-1-sulfonates, naphthalene-2-sulfonates, and mandelates.

Unless otherwise indicated, a chemical structure can refer to any compound having the chemical structure.

Unless otherwise indicated, formulations herein can be powdery.

Unless otherwise indicated, powder formulations herein can contain water in an amount from about 0% to about 15% w/w, for example 0-10%, 0-5%, or 0-1% w/w; or about: 1%, 2%, 3%, 4%, 5%, 6%, 7%, 8%, 9%, 10%, 11%, 12%, 13%, 14%, 15%, 20%, 25%, 30%, 35%, 40%, 45%, 50%, 55%, 60%, 65%, 70%, 75%, 80%, 85%, 90% or 99% w/w, based on the weight of the formulation.

Unless otherwise indicated, whenever there is a stereocenter in a structure disclosed or illustrated herein, the stereocenter can be R or S in each case.

Unless otherwise indicated, whenever there is a symbol

when used as part of a molecular structure herein can refer to a single bond.

The term "amino" can refer to functional groups that contain a basic nitrogen atom with a lone pair. For example, amino can include the radical —NH$_2$,

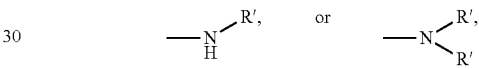

wherein each R' is independently H, halo, alkyl, aryl, heteroalkyl, arylalkyl, heteroaryl, heteroarylalkyl, cycloalkyl, or heterocycloalkyl.

The term "halo" or "halogen" can refer to fluorine, chlorine, bromine or iodine or a radical thereof.

The term "alkyl" can refer to a saturated or unsaturated, branched, straight-chain or cyclic monovalent hydrocarbon group derived by the removal of one hydrogen atom from a single carbon atom of a parent alkane, alkene or alkyne. Typical alkyl groups include, but are not limited to, methyl; ethyls such as ethanyl, ethenyl, ethynyl; propyls such as propan-1-yl, propan-2-yl, cyclopropan-1-yl, prop-1-en-1-yl, prop-1-en-2-yl, prop-2-en-1-yl (allyl), cycloprop-1-en-1-yl; cycloprop-2-en-1-yl, prop-1-yn-1-yl, prop-2-yn-1-yl; butyls such as butan-1-yl, butan-2-yl, 2-methyl-propan-1-yl, 2-methyl-propan-2-yl, cyclobutan-1-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, but-1-yn-1-yl, but-1-yn-3-yl, but-3-yn-1-yl; and the like.

The term "aryl" can refer to a monovalent aromatic hydrocarbon group derived by the removal of one hydrogen atom from a single carbon atom of a parent aromatic ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene and the like. In certain instances, an aryl group comprises from 6 to 20 carbon atoms.

The terms "heteroalkyl, heteroalkanyl, heteroalkenyl, heteroalkynyl" refer to alkyl, alkanyl, alkenyl and alkynyl groups, respectively, in which one or more of the carbon atoms (and any associated hydrogen atoms) are each independently replaced with the same or different heteroatomic groups. Typical heteroatomic groups include, but are not limited to, —O—, —S—, —O—O', —S—S—, —O—S—, —NR'—, =N—N=, —N=N—, —N=N—NR'—, —PH—, —P(O)$_2$—, —O—P(O)$_2$—, —S(O)—, —S(O)$_2$—, —SnH$_2$— and the like, wherein R' is hydrogen, alkyl, substituted alkyl, cycloalkyl, substituted cycloalkyl, aryl or substituted aryl.

The term "heteroaryl" can refer to a monovalent heteroaromatic group derived by the removal of one hydrogen atom from a single atom of a parent heteroaromatic ring system. Typical heteroaryl groups include, but are not limited to, groups derived from acridine, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In certain instances, the heteroaryl group is from 5-20 membered heteroaryl, and in other instances is from 5-10 membered heteroaryl. In certain instances heteroaryl groups are those derived from thiophene, pyrrole, benzothiophene, benzofuran, indole, pyridine, quinoline, imidazole, oxazole and pyrazine.

The term "arylalkyl" can refer to an acyclic alkyl group in which one of the hydrogen atoms bonded to a carbon atom, typically a terminal or sp$^3$ carbon atom, is replaced with an aryl group. Typical arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl and the like. Where specific alkyl moieties are intended, the nomenclature arylalkanyl, arylalkenyl and/or arylalkynyl is used. In certain instances, an arylalkyl group is (C$_6$-C$_{30}$) arylalkyl, e.g., the alkanyl, alkenyl or alkynyl moiety of the arylalkyl group is (C$_1$-C$_{10}$) and the aryl moiety is (C$_6$-C$_{20}$).

The term "heteroaryl" can refer to a monovalent heteroaromatic group derived by the removal of one hydrogen atom from a single atom of a parent heteroaromatic ring system. Typical heteroaryl groups include, but are not limited to, groups derived from acridine, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In certain instances, the heteroaryl group is from 5-20 membered heteroaryl, and in other instances is from 5-10 membered heteroaryl. In certain instances heteroaryl groups are those derived from thiophene, pyrrole, benzothiophene, benzofuran, indole, pyridine, quinoline, imidazole, oxazole and pyrazine.

The term "heteroarylalkyl" can refer to an acyclic alkyl group in which one of the hydrogen atoms bonded to a carbon atom, typically a terminal or sp$^3$ carbon atom, is replaced with a heteroaryl group. Where specific alkyl moieties are intended, the nomenclature heteroarylalkanyl, heteroarylalkenyl and/or heteroarylalkynyl is used. In certain instances, the heteroarylalkyl group is a 6-30 membered heteroarylalkyl, e.g., the alkanyl, alkenyl or alkynyl moiety of the heteroarylalkyl is 1-10 membered and the heteroaryl moiety is a 5-20-membered heteroaryl.

The term "cycloalkyl" can refer to a saturated or unsaturated cyclic alkyl group. Where a specific level of saturation is intended, the nomenclature "cycloalkanyl" or "cycloalkenyl" is used. Typical cycloalkyl groups include, but are not limited to, groups derived from cyclopropane, cyclobutane, cyclopentane, cyclohexane, and the like. In a certain instances, the cycloalkyl group is (C$_3$-C$_{10}$) cycloalkyl, or in certain instances (C$_3$-C$_6$) cycloalkyl.

The term "heterocycloalkyl" can refer to a saturated or unsaturated cyclic alkyl group in which one or more carbon atoms (and any associated hydrogen atoms) are independently replaced with the same or different heteroatom. Typical heteroatoms to replace the carbon atom(s) include, but are not limited to, N, P, O, S, and Si. Typical heterocycloalkyl groups include, but are not limited to, groups derived from epoxides, imidazolidine, morpholine, piperazine, piperidine, pyrazolidine, pyrrolidine, quinuclidine, and the like.

The term "diastereomeric excess" (DE) can refer to the difference from the relative abundance of two diastereomers. For instance, if there are two diastereomers and their mole or weight percentages are A and B, then DE can be calculated as: DE=[(A−B)/(A+B)]*100%. For example, if a mixture contains 75% of one diastereomer and 25% of the other diastereomer, the diastereomeric excess is 50%. In another example, if a mixture that is 95% of one diastereomer, the diastereomeric excess is 90%.

The term "enantiomeric excess" (EE) can refer to the difference from the relative abundance of two enantiomers. For instance, if there are two enantiomers and their mole or weight percentages are A and B, then EE can be calculated as: EE=[(A−B)/(A+B)]*100%. For example, if a mixture contains 75% of one enantiomer and 25% of the other enantiomer, the enantiomeric excess is 50%. In another example, if a mixture that is 95% of one enantiomer, the enantiomeric excess is 90%.

The term "substituted" can refer to a group in which one or more hydrogen atoms are each independently replaced with the same or different substituent(s). Typical substituents include, but are not limited to halo, alkyl, aryl, heteroalkyl, arylalkyl, heteroaryl, heteroarylalkyl, cycloalkyl, and heterocycloalkyl.

Unless otherwise indicated, "treated" can refer to "contacted." Similarly, "untreated" can refer to "uncontacted."

The term "substantially identical plant" can refer to a plant of the same species as an earlier referenced plant. For example, a substantially identical but otherwise uncontacted plant belongs to the same species as a contacted plant. The substantially identical but otherwise uncontacted plant can have a height of about 80% to 120% of the contacted plant (as measured from the surrounding soil to the highest point of the plant) and/or can have a mass of about 80% to 120% of the contacted plant.

The term "drought" can mean conditions with less than 20 inches, 15 inches, 10 inches, or 5 inches of rainfall within the past 12 months. The term "drought" can also mean conditions with a Palmer Drought Severity Index (PDSI) of less than −1.0. The term "adequately irrigated condition" can mean a condition with more than 20 inches of rainfall within the past 12 months. The term "adequately irrigated condition" can mean a condition with a PDSI of more than −1.0.

The term "plant" can be used interchangeably with the term "crop" and can include, but is not limited to any crop, cultivated plant, fungus, or alga that is harvested for food, clothing, livestock fodder, biofuel, medicine, or other uses. For example, plants include field and greenhouse crops, including but not limited to broad acre crops, fruits and vegetables, perennial tree crops, and ornamentals. Plants include, but are not limited to sugarcane, pumpkin, maize (corn), wheat, rice, cassava, soybeans, hay, potatoes, cotton, tomato, alfalfa, and green algae. Plants also include, but are not limited to any vegetable, such as cabbage, turnip, turnip, carrot, parsnip, beetroot, lettuce, beans, broad beans, peas, potato, eggplant, tomato, cucumber, pumpkin, squash, onion, garlic, leek, pepper, spinach, yam, sweet potato, and cassava.

Introduction

Phosphorous is a critical and limiting element for plants in agricultural system. Although agricultural soils are frequently supplemented with phosphorus-rich fertilizers, a large fraction of this phosphorus is rapidly immobilized and becomes unavailable to plants. Soil bacteria play a major role in the solubilization of immobilized phosphorus into orthophosphate, the bioavailable phosphorus source utilized by plants. A major mode of bacterial phosphate solubilization is the secretion of organic acids. Id. This natural process is massively under-utilized in modern large scale agriculture, and to date a dependable and effective solution to improving the soil's innate microbial orthophosphate production has yet to be developed for broad-acre farming.

If the bacterial capability to enhance the pool of available orthophosphates in the soil is increased, agricultural systems would experience enhanced plant growth while limiting the application of expensive and inefficient chemical fertilizers. Disclosed herein are compounds and formulation that cause a significant increase in phosphate solubilization of soil microbes, both in soil bacterium in isolated liquid culture and in the soil's innate microbial community.

Compounds, salts, solvates, and/or formulations described herein can be applied to a soil or a plant (e.g., to the seed, roots, or canopy of the plant). Compounds, salts, solvates, and/or formulations described herein can result in an increase in available phosphates in the soil, by stimulating the activity of phosphate solubilizing bacteria. Compounds, salts, solvates, and/or formulations described herein can result in an increase in available nitrogen in the soil, by stimulating the activity of nitrogen fixing bacteria. Disclosed herein are the compounds and formulations that can improve available soil phosphate and nitrogen. Also disclosed herein are methods of making the compounds and/or formulations and methods of using the compounds and/or formulations.

AB Compounds

Disclosed herein are AB compounds comprise a compound of Formula (1):

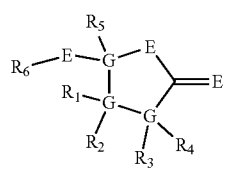

Formula (1)

or any salt or solvate thereof, wherein:
each E is independently O, S, or —NR$_7$;
each G is independently C or N;
R$_1$, R$_4$, R$_5$, and R$_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —OR$_8$, —C(O)R$_8$,

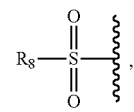

or a lone electron pair, wherein

indicates a single bond;
R$_2$ and R$_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, or a lone electron pair; or R$_2$ and R$_3$ together form a bond, or form a substituted or unsubstituted aryl; and
R$_7$ and R$_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

In some instances, R$_2$ and R$_3$ together form a bond. In some instances, the compound, salt, or solvate has a structure of Formula (2):

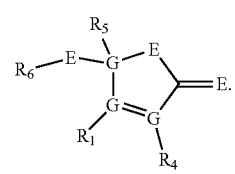

Formula (2)

In some instances, R$_4$ is alkyl. In some instances, R$_4$ is methyl. In some instances, each G is independently C. In some instances, each G is independently N. In some instances, each E is independently O. In some instances, each E is independently S. In some instances, each E is independently —NR$_7$. In some instances, R$_1$ and R$_5$ is each independently H.

In some instances, the compound, salt, or solvate has a structure of Formula (3):

Formula (3)

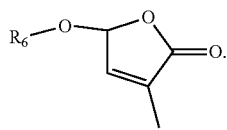

In some instances, $R_6$ has a structure of Formula (4):

Formula (4)

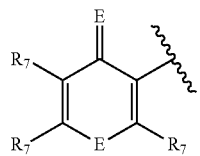

wherein

indicates a single bond.

In some instances, each E of the compound, salt, or solvate is independently O, S, or —$NR_7$. In some instances, each E is independently O. In some instances, each $R_7$ is independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl. In some instances, each $R_7$ is independently H or substituted or unsubstituted alkyl. In some instances, each $R_7$ is independently H.

In some instances, the compound, salt, or solvate has a structure of Formula (5):

Formula (5)

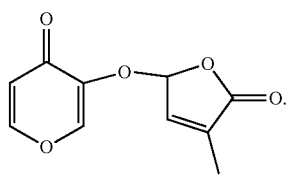

In some instances, the compound, salt, or solvate has the structure of Formula (6):

Formula (6)

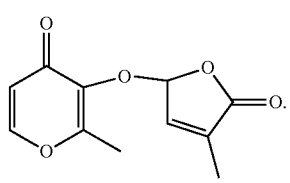

In some instances, $R_6$ has a structure of Formula (7):

Formula (6)

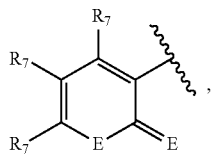

wherein

indicates a single bond.

In some instances, $R_6$ has a structure selected from the group consisting of,

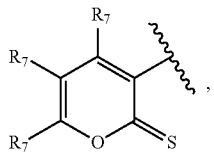 , 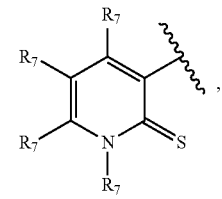 ,

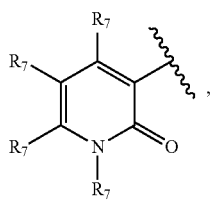 and 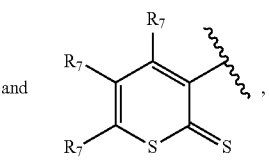 , wherein

indicates a single bond.

In some instances, the compound, salt, or solvate has a structure selected from the group consisting of Formula (8), (9), (10), and (11):

Formula (8)

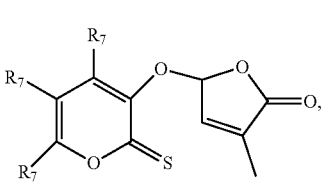

-continued

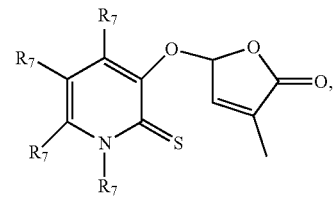

Formula (9)

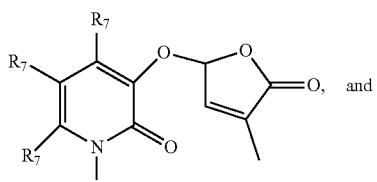

Formula (10)

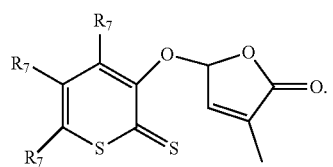

Formula (11)

In some instances, $R_6$ has a structure of Formula (12):

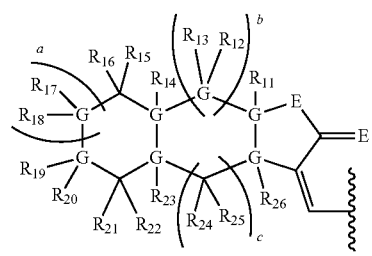

Formula (12)

wherein:

indicates a single bond;

a, b, c are each independently 0, 1, or 2;

$R_{15}$, $R_{16}$, $R_{21}$, $R_{22}$, $R_{24}$, and $R_{25}$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —OR$_8$, —C(O)R$_8$, or

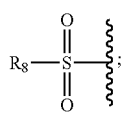

$R_{12}$, $R_{13}$, $R_{17}$, $R_{18}$, $R_{19}$, and $R_{20}$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —OR$_8$, —C(O)R$_8$,

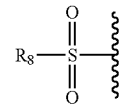

or a lone electron pair;

$R_{11}$ and $R_{26}$ are each independently H, alkyl, haloalkyl, amino, halo, lone electron pair, or —OR$_8$; or $R_{11}$ and $R_{26}$ together form a bond;

$R_{14}$ and $R_{23}$ are each independently H, alkyl, haloalkyl, amino, halo, lone electron pair, or —OR$_8$; or $R_{14}$ and $R_{23}$ together form a bond; and $R_8$ is each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

In some instances, the compound, salt, or solvate has a structure of Formula (12):

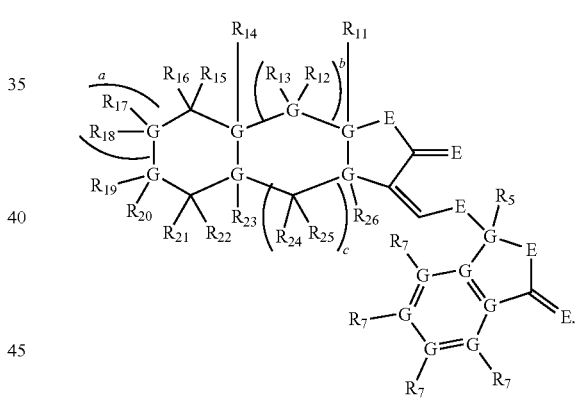

Formula (13)

In some instances, a, b, c are each independently 0, 1, or 2. The compound, salt, or solvate may be a compound, salt, or solvate, wherein a is 0, b is 0, and c is 0. The compound, salt, or solvate may be a compound, salt, or solvate, wherein a is 0, b is 0, and c is 1. The compound, salt, or solvate may be a compound, salt, or solvate, wherein a is 0, b is 0, and c is 2. The compound, salt, or solvate may be a compound, salt, or solvate, wherein a is 0, b is 1, and c is 0. The compound, salt, or solvate may be a compound, salt, or solvate, wherein a is 0, b is 1, and c is 1. The compound, salt, or solvate may be a compound, salt, or solvate, wherein a is 0, b is 1, and c is 2. The compound, salt, or solvate may be a compound, salt, or solvate, wherein a is 0, b is 2, and c is 0. The compound, salt, or solvate may be a compound, salt, or solvate, wherein a is 0, b is 2, and c is 1. The compound, salt, or solvate may be a compound, salt, or solvate, wherein a is 0, b is 2, and c is 2. The compound, salt, or solvate may be a compound, salt, or solvate, wherein a is 1, b is 0, and c is 0. The compound, salt, or solvate may be a compound, salt, or solvate, wherein a is 1, b is 0, and c is 1. The compound, salt, or solvate may be a compound, salt, or solvate, wherein a is 1, b is 0, and c is 2. The compound, salt, or solvate may be a compound, salt, or solvate, wherein a is 1, b is 1, and c is 0. The compound, salt, or solvate may be a compound, salt, or solvate, wherein a is 1, b is 1, and c is 1. The compound, salt, or solvate may be a compound, salt, or solvate, wherein a is 1, b is 1, and c is 2. The compound, salt, or solvate may be a compound, salt, or solvate, wherein a is 1, b is 2, and c is 0. The compound, salt, or solvate may be a compound, salt, or solvate, wherein a is 1, b is 2, and c is 1. The compound, salt, or solvate may be a compound, salt, or solvate, wherein a is 1, b is 2, and c is 2. The compound, salt, or solvate may be a compound, salt, or solvate, wherein a is 2, b is 0, and c is 0. The compound, salt, or solvate may be a compound, salt, or solvate, wherein a is 2, b is 0, and c is 1. The compound, salt, or solvate may be a compound, salt, or solvate, wherein a is 2, b is 0, and c is 2. The compound, salt, or solvate may be a compound, salt, or solvate, wherein a is 2, b is 1, and c is 0. The compound, salt, or solvate may be a compound, salt, or solvate, wherein a is 2, b is 1, and c is 1. The compound, salt, or solvate may be a compound, salt, or solvate, wherein a is 2, b is 1, and c is 2. The compound, salt, or solvate may be a compound, salt, or solvate, wherein a is 2, b is 2, and c is 0. The compound, salt, or solvate may be a compound, salt, or solvate, wherein a is 2, b is 2, and c is 1. The compound, salt, or solvate may be a compound, salt, or solvate, wherein a is 2, b is 2, and c is 2. In one example, the compound, salt, or solvate is a compound, salt, or solvate, wherein a is 1, b is 2, and c is 0.

In some instances, $R_6$ has a structure of Formula (14) or (15):

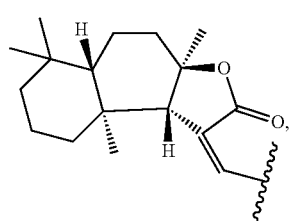

Formula (14)

or

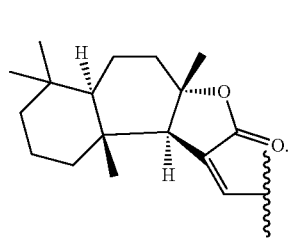

Formula (15)

In some instances, the compound, salt, or solvate has a structure of Formula (16) or (17):

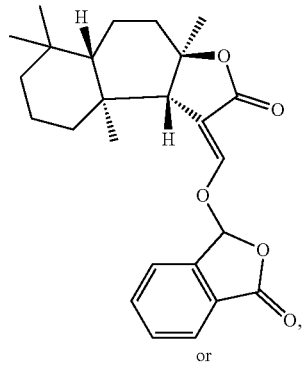

Formula (16)

or

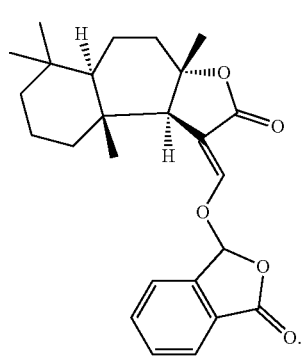

Formula (17)

In some instances, the compound, salt, or solvate is AB10, which has a structure of Formula (16) or (17).

In some instances, the compound, salt, or solvate is an isomer. In some instances, the compound, salt, or solvate is a stereoisomer. In some instances, the compound, salt, or solvate is a tautomer of the compound, salt, or solvate disclosed herein.

In some instances, the compound, salt, or solvate is a diastereoisomer. In some instances, the compound, salt, or solvate is a diastereoisomer having a diastereomeric excess of at least about 50%, 60%, 70%, 80%, 85%, 90%, 95%, or from at least about 50% to 100%. The compound, salt, or solvate disclosed herein, may have a diastereomeric excess of at least about 15%, 20%, 30%, 40%, 50%, 60%, 70%, 80%, 85%, 90%, 95%, or 99%. The compound, salt, or solvate disclosed herein, may have a diastereomeric excess of about 15%-99%, 20%-99%, 30%-99%, 40-99%, 50-99%, 60-99%, 70-99%, 80-99%, 90-99%, 15%-90%, 20%-90%, 30%-90%, 40-90%, 50-90%, 60-90%, 70-90%, 80-90%, 15%-80%, 20%-80%, 30%-80%, 40-80%, 50-80%, 60-80%, 70-80%, 15%-70%, 20%-70%, 30%-70%, 40-70%, 50-70%, 60-70%, 15%-60%, 20%-60%, 30%-60%, 40-60%, 50-60%, 15%-50%, 20%-50%, 30%-50%, 40-50%, 15%-40%, 20%-40%, 30%-40%, 15%-30%, 20%-30%, or 15-20%. In some instances, the compound, salt, or solvate disclosed herein, may have a diastereomeric excess of from at least about 50% to 100%.

In some instances, the compound, salt, or solvate is an enantiomer. In some instances, the compound, salt, or solvate is an enantiomer having an enantiomeric excess of at least about 50%, 60%, 70%, 80%, 85%, 90%, 95%, or from at least about 50% to 100%. The compound, salt, or solvate disclosed herein, may have an enantiomeric excess of at least about 15%, 20%, 30%, 40%, 50%, 60%, 70%, 80%, 85%, 90%, 95%, or 99%. The compound, salt, or solvate disclosed herein, may have an enantiomeric excess of about 15%-99%, 20%-99%, 30%-99%, 40-99%, 50-99%, 60-99%, 70-99%, 80-99%, 90-99%, 15%-90%, 20%-90%, 30%-90%, 40-90%, 50-90%, 60-90%, 70-90%, 80-90%, 15%-80%, 20%-80%, 30%-80%, 40-80%, 50-80%, 60-80%, 70-80%, 15%-70%, 20%-70%, 30%-70%, 40-70%, 50-70%, 60-70%, 15%-60%, 20%-60%, 30%-60%, 40-60%, 50-60%, 15%-50%, 20%-50%, 30%-50%, 40-50%, 15%-40%, 20%-40%, 30%-40%, 15%-30%, 20%-30%, or 15-20%. In some instances, the compound, salt, or solvate disclosed herein, may have an enantiomeric excess of from at least about 50% to 100%.

In some instances, the compound, salt, or solvate has a structure of Formula (18):

Formula (18)

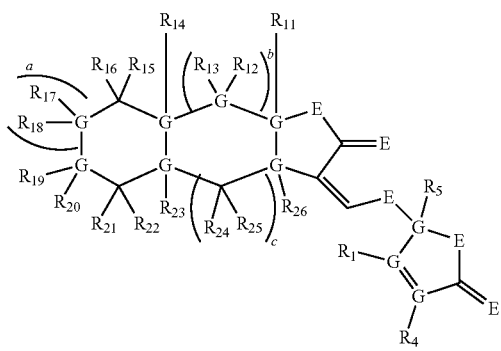

wherein:
a, b, c are each independently 0, 1, or 2;
each E is independently O, S, or —NR$_7$;
each G is independently C or N;
R$_1$, R$_4$, R$_5$, R$_{15}$, R$_{16}$, R$_{21}$, R$_{22}$, R$_{24}$, and R$_{25}$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —OR$_8$, —C(O)R$_8$, or

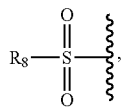

wherein

indicates a single bond;
R$_{12}$, R$_{13}$, R$_{17}$, R$_{18}$, R$_{19}$, and R$_{20}$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —OR$_8$, —C(O)R$_8$,

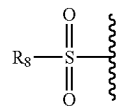

or a lone electron pair;
R$_{11}$ and R$_{26}$ are each independently H, alkyl, haloalkyl, amino, halo, lone electron pair, or —OR$_8$; or R$_{11}$ and R$_{26}$ together form a bond;
R$_{14}$ and R$_{23}$ are each independently H, alkyl, haloalkyl, amino, halo, lone electron pair, or —OR$_8$; or R$_{14}$ and R$_{23}$ together form a bond; and
R$_7$ and R$_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

In some instances, a, b, c are each independently 0, 1, or 2. The compound, salt, or solvate may be a compound, salt, or solvate, wherein a is 0, b is 0, and c is 0. The compound, salt, or solvate may be a compound, salt, or solvate, wherein a is 0, b is 0, and c is 1. The compound, salt, or solvate may be a compound, salt, or solvate, wherein a is 0, b is 0, and c is 2. The compound, salt, or solvate may be a compound, salt, or solvate, wherein a is 0, b is 1, and c is 0. The compound, salt, or solvate may be a compound, salt, or solvate, wherein a is 0, b is 1, and c is 1. The compound, salt, or solvate may be a compound, salt, or solvate, wherein a is 0, b is 1, and c is 2. The compound, salt, or solvate may be a compound, salt, or solvate, wherein a is 0, b is 2, and c is 0. The compound, salt, or solvate may be a compound, salt, or solvate, wherein a is 0, b is 2, and c is 1. The compound, salt, or solvate may be a compound, salt, or solvate, wherein a is 0, b is 2, and c is 2. The compound, salt, or solvate may be a compound, salt, or solvate, wherein a is 1, b is 0, and c is 0. The compound, salt, or solvate may be a compound, salt, or solvate, wherein a is 1, b is 0, and c is 1. The compound, salt, or solvate may be a compound, salt, or solvate, wherein a is 1, b is 0, and c is 2. The compound, salt, or solvate may be a compound, salt, or solvate, wherein a is 1, b is 1, and c is 0. The compound, salt, or solvate may be a compound, salt, or solvate, wherein a is 1, b is 1, and c is 1. The compound, salt, or solvate may be a compound, salt, or solvate, wherein a is 1, b is 1, and c is 2. The compound, salt, or solvate may be a compound, salt, or solvate, wherein a is 1, b is 2, and c is 0. The compound, salt, or solvate may be a compound, salt, or solvate, wherein a is 1, b is 2, and c is 1. The compound, salt, or solvate may be a compound, salt, or solvate, wherein a is 1, b is 2, and c is 2. The compound, salt, or solvate may be a compound, salt, or solvate, wherein a is 2, b is 0, and c is 0. The compound, salt, or solvate may be a compound, salt, or solvate, wherein a is 2, b is 0, and c is 1. The compound, salt, or solvate may be a compound, salt, or solvate, wherein a is 2, b is 0, and c is 2. The compound, salt, or solvate may be a compound, salt, or solvate, wherein a is 2, b is 1, and c is 0. The compound, salt, or solvate may be a compound, salt, or solvate, wherein a is 2, b is 1, and c is 1. The compound, salt, or solvate may be a compound, salt, or solvate, wherein a is 2, b is 1, and c is 2. The compound, salt, or solvate may be a compound, salt, or solvate, wherein a is 2, b is 2, and c is 0. The compound, salt, or solvate may be a compound, salt, or solvate, wherein a is 2, b is 2, and c is 1. The compound, salt, or solvate may be a compound, salt, or solvate, wherein a is 2, b is 2, and c is 2. In one example, the compound, salt, or solvate is a compound, salt, or solvate, wherein a is 1, b is 2, and c is 0.

In some instances, the compound, salt, or solvate has a structure of Formula (19) or (20):

Formula (19)

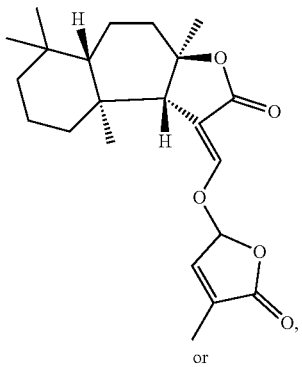

or

Formula (20)

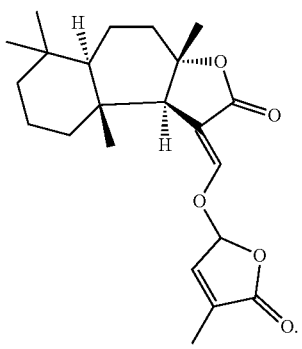

In some instances, the compound, salt, or solvate is AB01, which has a structure of Formula (19) or (20).

In some instances, R$_2$ and R$_3$ together form a substituted or unsubstituted aryl.

In some instances, the compound, salt, or solvate has a structure of Formula (21):

Formula (21)

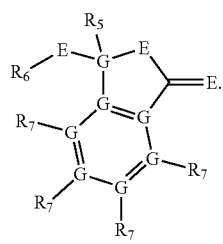

In some instances, each R$_7$ is independently H. In some instances, each G is independently C. In some instances, each E is independently O. In some instances, R$_5$ is independently H.

In some instances, the compound, salt, or solvate has a structure of Formula (21):

Formula (22)

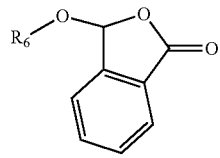

In some instances, R$_6$ has a structure selected from the group consisting of

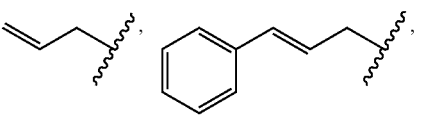

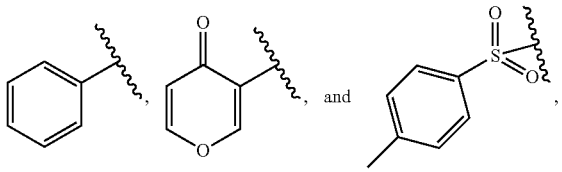, and wherein

indicates a single bond.

In some instances, the compound, salt, or solvate has a structure selected from the group consisting of Formula (23), (24), (25), and (26):

Formula (23)

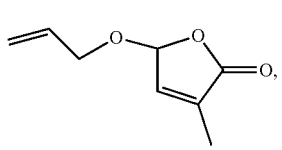

[AB06]

Formula (24)

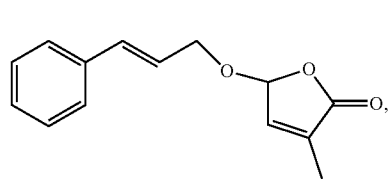

[AB07]

Formula (25)

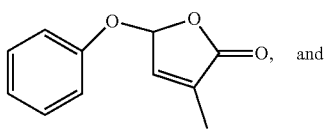, and

[AB08]

Formula (26)

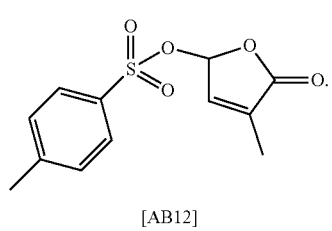

[AB12]

In some instances, the compound, salt, or solvate is an isomer. In some instances, the compound, salt, or solvate is a stereoisomer.

In some instances, the compound, salt, or solvate is a diastereoisomer. In some instances, the compound, salt, or solvate is a diastereoisomer having a diastereomeric excess of at least about 50%, 60%, 70%, 80%, 85%, 90%, 95%, or from at least about 50% to 100%. The compound, salt, or solvate disclosed herein, may have a diastereomeric excess of at least about 15%, 20%, 30%, 40%, 50%, 60%, 70%, 80%, 85%, 90%, 95%, or 99%. The compound, salt, or solvate disclosed herein, may have a diastereomeric excess of about 15%-99%, 20%-99%, 30%-99%, 40-99%, 50-99%, 60-99%, 70-99%, 80-99%, 90-99%, 15%-90%, 20%-90%, 30%-90%, 40-90%, 50-90%, 60-90%, 70-90%, 80-90%, 15%-80%, 20%-80%, 30%-80%, 40-80%, 50-80%, 60-80%, 70-80%, 15%-70%, 20%-70%, 30%-70%, 40-70%, 50-70%, 60-70%, 15%-60%, 20%-60%, 30%-60%, 40-60%, 50-60%, 15%-50%, 20%-50%, 30%-50%, 40-50%, 15%-40%, 20%-40%, 30%-40%, 15%-30%, 20%-30%, or 15-20%. In some instances, the compound, salt, or solvate disclosed herein, may have a diastereomeric excess of from at least about 50% to 100%.

In some instances, the compound, salt, or solvate is an enantiomer. In some instances, the compound, salt, or solvate is an enantiomer having an enantiomeric excess of at least about 50%, 60%, 70%, 80%, 85%, 90%, 95%, or from at least about 50% to 100%. The compound, salt, or solvate disclosed herein, may have an enantiomeric excess of at least about 15%, 20%, 30%, 40%, 50%, 60%, 70%, 80%, 85%, 90%, 95%, or 99%. The compound, salt, or solvate disclosed herein, may have an enantiomeric excess of about 15%-99%, 20%-99%, 30%-99%, 40-99%, 50-99%, 60-99%, 70-99%, 80-99%, 90-99%, 15%-90%, 20%-90%, 30%-90%, 40-90%, 50-90%, 60-90%, 70-90%, 80-90%, 15%-80%, 20%-80%, 30%-80%, 40-80%, 50-80%, 60-80%, 70-80%, 15%-70%, 20%-70%, 30%-70%, 40-70%, 50-70%, 60-70%, 15%-60%, 20%-60%, 30%-60%, 40-60%, 50-60%, 15%-50%, 20%-50%, 30%-50%, 40-50%, 15%-40%, 20%-40%, 30%-40%, 15%-30%, 20%-30%, or 15-20%. In some instances, the compound, salt, or solvate disclosed herein, may have an enantiomeric excess of from at least about 50% to 100%.

In some instances, the compound, salt, or solvate disclosed herein is not (+)-Strigol

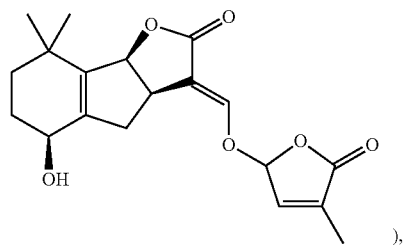

((+)-Strigyl acetate),

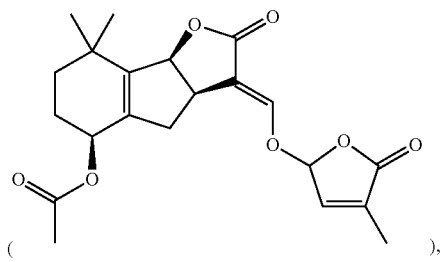

((+)-Orobanchol),

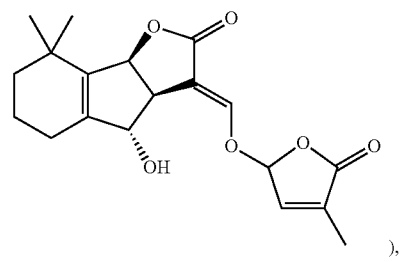

((+)-Orobanchyl acetate),

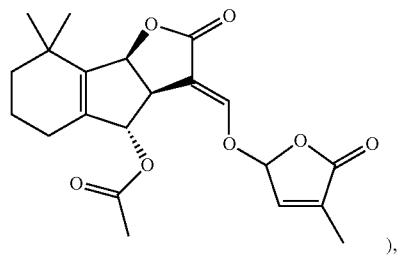

((+)-5-Deoxystrigol),

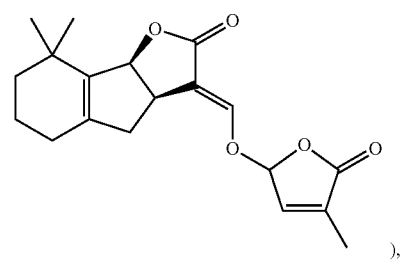

(Sorgolactone),

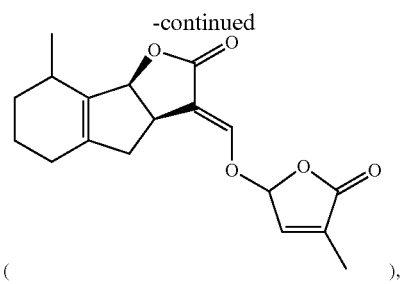

( ), or any combination thereof.

Formulations

Also disclosed herein are formulations comprising: one or more AB compounds, salts or solvates, one or more phosphate solubilizing bacteria, one or more nitrogen fixing bacteria, one or more inhibitors of abscisic acid biosynthesis, or any salt or solvate thereof, one or more plant growth regulators, or any salt or solvate thereof, or any combination thereof. The formulation can be as a seed treatment, soil drench, granule formulation, or foliar spray to improve the productivity of a wide variety of crops.

AB Compounds

Further disclosed herein are formulations comprising one or more AB compounds, salts or solvates. The one or more AB compounds, salts or solvates can increase the amount of phosphate solubilization in a soil. The one or more AB compounds, salts or solvates can increase an amount of available nitrogen in a soil. The one or more AB compounds can decrease an amount of nitrogen or soluble phosphate depletion in a soil. The one or more AB compounds, salts or solvates can increase harvest yield of the plant. The one or more AB compounds, salts or solvates can comprise AB01, AB06, AB07, AB08, AB09, AB10, AB10, AB12, or any salt, solvate, or derivative thereof. The one or more AB compounds, salts or solvates thereof can comprise AB09, or any salt, solvate, or derivative thereof. AB09 may be alternatively referred to as maltol lactone.

The formulation comprising one or more AB compounds, salts or solvates can further comprise one or more strigolactones, salts, or solvates. The formulation comprising one or more AB compounds, salts or solvates can further comprise one or more plant growth regulators (PGRs), salts or solvates. The formulation comprising one or more AB compounds, salts or solvates can further comprise one or more inhibitors of abscisic acid (ABA) biosynthesis, or any salt or solvate thereof. The formulation comprising one or more AB compounds, salts or solvates can further comprise one or more strigolactones, salts, or solvates and one or more plant growth regulators (PGRs), salts, or solvates. The formulation comprising one or more AB compounds, salts or solvates can further comprise one or more strigolactones, salts, or solvates and one or more inhibitors of abscisic acid (ABA) biosynthesis, or any salt or solvate thereof. The formulation comprising one or more AB compounds, salts or solvates can further comprise one or more plant growth regulators (PGRs), salts, or solvates and one or more inhibitors of abscisic acid (ABA) biosynthesis, or any salt or solvate thereof.

The formulations may comprise at least about 0.1% (w/w) of an AB compound, salt or solvate, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the AB compound, salt or solvate.

The formulations may comprise less than about 95% (w/w) of an AB compound, salt or solvate, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of the AB compound, salt or solvate.

The formulations may comprise about 0.1%-100% (w/w) of an AB compound, salt or solvate, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of the AB compound, salt or solvate.

AB01

The formulations may comprise at least about 0.1% (w/w) of AB01, or any salt or solvate thereof, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of AB01, or any salt or solvate thereof.

The formulations may comprise less than about 95% (w/w) of AB01, or any salt or solvate thereof, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of AB01, or any salt or solvate thereof.

The formulations may comprise about 0.1%400% (w/w) of AB01, or any salt or solvate thereof, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of AB01, or any salt or solvate thereof.

AB09

The formulations may comprise at least about 0.1% (w/w) of AB09, or any salt or solvate thereof, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of AB09, or any salt or solvate thereof.

The formulations may comprise less than about 95% (w/w) of AB09, or any salt or solvate thereof, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of AB09, or any salt or solvate thereof.

The formulations may comprise about 0.1%400% (w/w) of AB09, or any salt or solvate thereof, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of AB09, or any salt or solvate thereof.

AB09 Derivatives

The formulations may comprise at least about 0.1% (w/w) of an AB09 derivative, or any salt or solvate thereof, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the AB09 derivative, or any salt or solvate thereof.

The formulations may comprise less than about 95% (w/w) of an AB09 derivative, or any salt or solvate thereof, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of the AB09 derivative, or any salt or solvate thereof.

The formulations may comprise about 0.1%400% (w/w) of an AB09 derivative, or any salt or solvate thereof, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of the AB09 derivative, or any salt or solvate thereof.

Strigolactones

Further disclosed herein are formulations comprising one or more strigolactones, salts, or solvates. The one or more strigolactones, salts, or solvates can elicit hydraulic enhancement of a plant. The one or more strigolactones, salts, or solvates can increase harvest yield of the plant. The one or more strigolactones, salts, or solvates can comprise one or more natural strigolactones, salts, or solvates. The one or more strigolactones, salts, or solvates can comprise one or more synthetic strigolactones, salts, or solvates. The one or more strigolactones, salts, or solvates can comprise a mixture of natural and synthetic strigolactones, salts, or solvates. The one or more strigolactones, salts, or solvates can comprise strigol, strigyl, strigyl acetate, orobanchol, orobanchyl acetate, 5-deoxystrigol, sorgolactone, 2'-epi-orobanchol, sorgomol, solanacol, 7-oxoorobanchol, 7-oxoorobanchol acetate, fabacyl acetate, or GR24. The formulation can comprise a mixture of strigolactones, salts, or solvates. The mixture of strigolactones, salts, or solvates may comprise two or more strigolactones, salts, or solvates selected from the group consisting of strigol, strigyl, strigyl acetate, orobanchol, orobanchyl acetate, 5-deoxystrigol, sorgolactone, 2'-epiorobanchol, sorgomol, solanacol, 7-oxoorobanchol, 7-oxoorobanchol acetate, fabacyl acetate, or GR24.

The formulation comprising one or more strigolactones, salts, or solvates can further comprise one or more AB compounds, salts or solvates. The formulation comprising one or more strigolactones, salts, or solvates can further comprise one or more plant growth regulators (PGRs), salts, or solvates. The formulation comprising one or more strigolactones, salts, or solvates can further comprise one or more inhibitors of abscisic acid (ABA) biosynthesis, or any salt or solvate thereof. The formulation comprising one or more strigolactones, salts, or solvates can further comprise one or more AB compounds, salts or solvates and one or more plant growth regulators (PGRs), salts, or solvates. The formulation comprising one or more strigolactones, salts, or solvates can further comprise one or more AB compounds, salts or solvates and one or more inhibitors of abscisic acid (ABA) biosynthesis, or any salt or solvate thereof. The formulation comprising one or more strigolactones, salts, or solvates can further comprise one or more plant growth regulators (PGRs), salts, or solvates and one or more inhibitors of abscisic acid (ABA) biosynthesis, or any salt or solvate thereof.

The formulations may comprise at least about 0.1% (w/w) of a strigolactone, salt, or solvate, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the strigolactone, salt, or solvate.

The formulations may comprise less than about 95% (w/w) of a strigolactone, salt, or solvate, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of the strigolactone, salt, or solvate.

The formulations may comprise about 0.1%400% (w/w) of a strigolactone, salt, or solvate, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%400%, about 95%-99%, or about 99%400% of the strigolactone, salt, or solvate.

Strigol

The formulations may comprise at least about 0.1% (w/w) of strigol, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of strigol.

The formulations may comprise less than about 95% (w/w) of strigol, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of strigol.

The formulations may comprise about 0.1%400% (w/w) of strigol, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of strigol.

Strigyl

The formulations may comprise at least about 0.1% (w/w) of strigyl, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of strigyl.

The formulations may comprise less than about 95% (w/w) of strigyl, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of strigyl.

The formulations may comprise about 0.1%400% (w/w) of strigyl, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of strigyl.

Strigyl Acetate

The formulations may comprise at least about 0.1% (w/w) of strigyl acetate, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of strigyl acetate.

The formulations may comprise less than about 95% (w/w) of strigyl acetate, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of strigyl acetate.

The formulations may comprise about 0.1%-100% (w/w) of strigyl acetate, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of strigyl acetate.

Orobanchol

The formulations may comprise at least about 0.1% (w/w) of orobanchol, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of orobanchol.

The formulations may comprise less than about 95% (w/w) of orobanchol, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of orobanchol.

The formulations may comprise about 0.1%-100% (w/w) of orobanchol, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of orobanchol.

Orobanchyl Acetate

The formulations may comprise at least about 0.1% (w/w) of orobanchyl acetate, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of orobanchyl acetate.

The formulations may comprise less than about 95% (w/w) of orobanchyl acetate, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of orobanchyl acetate.

The formulations may comprise about 0.1%400% (w/w) of orobanchyl acetate, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%400%, about 95%-99%, or about 99%-100% of orobanchyl acetate.

5-Deoxystrigol

The formulations may comprise at least about 0.1% (w/w) of 5-deoxystrigol, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of 5-deoxystrigol.

The formulations may comprise less than about 95% (w/w) of 5-deoxystrigol, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of 5-deoxystrigol.

The formulations may comprise about 0.1%400% (w/w) of 5-deoxystrigol, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of 5-deoxystrigol.

Sorgolactone

The formulations may comprise at least about 0.1% (w/w) of sorgolactone, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of sorgolactone.

The formulations may comprise less than about 95% (w/w) of sorgolactone, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of sorgolactone.

The formulations may comprise about 0.1%400% (w/w) of sorgolactone, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of sorgolactone.

2'-Epiorobanchol

The formulations may comprise at least about 0.1% (w/w) of 2'-epiorobanchol, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of 2'-epiorobanchol.

The formulations may comprise less than about 95% (w/w) of 2'-epiorobanchol, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of 2'-epiorobanchol.

The formulations may comprise about 0.1%400% (w/w) of 2'-epiorobanchol, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of 2'-epiorobanchol.

Sorgomol

The formulations may comprise at least about 0.1% (w/w) of sorgomol, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of sorgomol.

The formulations may comprise less than about 95% (w/w) of sorgomol, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of sorgomol.

The formulations may comprise about 0.1%-100% (w/w) of sorgomol, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%400%, about 95%-99%, or about 99%-100% of sorgomol.

Solanacol

The formulations may comprise at least about 0.1% (w/w) of solanacol, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of solanacol.

The formulations may comprise less than about 95% (w/w) of solanacol, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of solanacol.

The formulations may comprise about 0.1%400% (w/w) of solanacol, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of solanacol.

7-Oxoorobanchol

The formulations may comprise at least about 0.1% (w/w) of 7-oxoorobanchol, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of 7-oxoorobanchol.

The formulations may comprise less than about 95% (w/w) of 7-oxoorobanchol, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of 7-oxoorobanchol.

The formulations may comprise about 0.1%400% (w/w) of 7-oxoorobanchol, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of 7-oxoorobanchol.

7-Oxoorobanchol Acetate

The formulations may comprise at least about 0.1% (w/w) of 7-oxoorobanchol acetate, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of 7-oxoorobanchol acetate.

The formulations may comprise less than about 95% (w/w) of 7-oxoorobanchol acetate, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of 7-oxoorobanchol acetate.

The formulations may comprise about 0.1%-100% (w/w) of 7-oxoorobanchol acetate, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%400% of 7-oxoorobanchol acetate.

Fabacyl Acetate

The formulations may comprise at least about 0.1% (w/w) of fabacyl acetate, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of fabacyl acetate.

The formulations may comprise less than about 95% (w/w) of fabacyl acetate, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of fabacyl acetate.

The formulations may comprise about 0.1%-100% (w/w) of fabacyl acetate, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of fabacyl acetate.

GR24

The formulations may comprise at least about 0.1% (w/w) of GR24, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of GR24.

The formulations may comprise less than about 95% (w/w) of GR24, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of GR24.

The formulations may comprise about 0.1%-100% (w/w) of GR24, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of GR24.

ABA Biosynthesis Inhibitors

The formulation can comprise one or more inhibitors of abscisic acid (ABA) biosynthesis, or any salt or solvate thereof. The inhibitors of abscisic acid biosynthesis, or any salt or solvate thereof can elicit hydraulic enhancement of a plant. The inhibitors of abscisic acid biosynthesis, or any salt or solvate thereof can increase harvest yield of the plant. For example, Inhibitors of phytoene destaturase can elicit hydraulic enhancement of a plant and/or increase harvest yield of the plant. Therefore, the formulation can comprise one or more inhibitors of phytoene destaturase, such as fluridone or any one of its derivatives. Additional ABA biosynthetic inhibitors can include inhibitors of phytoene desaturase, inhibitors of 9-cis-epoxycarotenoid dioxygenase enzyme (NCED), and inhibitors of abscisic aldehyde oxidase (AAO). The formulation can comprise one or more such compounds such as nordihydroguaiaretic acid, abamine, or any one of their derivatives.

The formulation comprising one or more inhibitors of abscisic acid (ABA) biosynthesis, or any salt or solvate thereof can further comprise one or more AB compounds, salts or solvates. The formulation comprising one or more inhibitors of abscisic acid (ABA) biosynthesis, or any salt or solvate thereof can further comprise one or more strigolactones, salts, or solvates. The formulation comprising one or more inhibitors of abscisic acid (ABA) biosynthesis, or any salt or solvate thereof can further comprise one or more plant growth regulators (PGRs), salts, or solvates. The formulation comprising one or more inhibitors of abscisic acid (ABA) biosynthesis, or any salt or solvate thereof can further comprise one or more AB compounds, salts or solvates and one or more strigolactones, salts, or solvates. The formulation comprising one or more inhibitors of abscisic acid (ABA) biosynthesis, or any salt or solvate thereof can further comprise one or more AB compounds, salts or solvates and one or more plant growth regulators (PGRs), salts, or solvates. The formulation comprising one or more inhibitors of abscisic acid (ABA) biosynthesis, or any salt or solvate thereof can further comprise one or more strigolactones, salts, or solvates and one or more plant growth regulators (PGRs), salts, or solvates.

The formulations may comprise at least about 0.1% (w/w) of an inhibitor of abscisic acid (ABA) biosynthesis, or any salt or solvate thereof, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the inhibitor of abscisic acid (ABA) biosynthesis, or any salt or solvate thereof.

The formulations may comprise less than about 95% (w/w) of an inhibitor of abscisic acid (ABA) biosynthesis, or any salt or solvate thereof, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of the inhibitor of abscisic acid (ABA) biosynthesis, or any salt or solvate thereof.

The formulations may comprise about 0.1%400% (w/w) of an inhibitor of abscisic acid (ABA) biosynthesis, or any salt or solvate thereof, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of the inhibitor of abscisic acid (ABA) biosynthesis, or any salt or solvate thereof.

Fluridone

The formulations may comprise at least about 0.1% (w/w) of fluridone, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of fluridone.

The formulations may comprise less than about 95% (w/w) of fluridone, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of fluridone.

The formulations may comprise about 0.1%400% (w/w) of fluridone, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of fluridone.

Nordihydroguaiaretic Acid

The formulations may comprise at least about 0.1% (w/w) of nordihydroguaiaretic acid, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of nordihydroguaiaretic acid.

The formulations may comprise less than about 95% (w/w) of nordihydroguaiaretic acid, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of nordihydroguaiaretic acid.

The formulations may comprise about 0.1%400% (w/w) of nordihydroguaiaretic acid, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of nordihydroguaiaretic acid.

Abamine

The formulations may comprise at least about 0.1% (w/w) of abamine, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of abamine.

The formulations may comprise less than about 95% (w/w) of abamine, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of abamine.

The formulations may comprise about 0.1%-100% (w/w) of abamine, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of abamine.

Plant Growth Regulators (PGRs)

The formulation can comprise one or more plant growth regulators (PGRs), salts, or solvates. PGRs can be numerous chemical substances that can influence the growth and/or differentiation of plant cells, tissues, or organs. Plant growth regulators can function as chemical messengers for intercellular communication. PGRs can include auxins, gibberellins, cytokinins, abscisic acid (ABA) and ethylene, brassinosteroids, and polyamines. They can work together coordinating the growth and/or development of cells. PGRs can elicit hydraulic enhancement of a plant. PGRs can increase the harvest yield of a plant. Auxins can comprise indole-3-acetic acid (IAA) or its derivative or chemical analog.

The formulation comprising one or more plant growth regulators (PGRs), salts, or solvates can further comprise one or more AB compounds, salts or solvates. The formulation comprising one or more plant growth regulators (PGRs), salts, or solvates can further comprise one or more strigolactones, salts, or solvates. The formulation comprising one or more plant growth regulators (PGRs), salts, or solvates can further comprise one or more inhibitors of abscisic acid (ABA) biosynthesis, or any salt or solvate thereof. The formulation comprising one or more plant growth regulators (PGRs), salts, or solvates can further comprise one or more AB compounds, salts or solvates and one or more strigolactones, salts, or solvates. The formulation comprising one or more plant growth regulators (PGRs), salts, or solvates can further comprise one or more AB compounds, salts or solvates and one or more inhibitors of abscisic acid (ABA) biosynthesis, or any salt or solvate thereof. The formulation comprising one or more plant growth regulators (PGRs), salts, or solvates can further comprise one or more strigolactones, salts, or solvates and one or more inhibitors of abscisic acid (ABA) biosynthesis, or any salt or solvate thereof.

The formulations may comprise at least about 0.1% (w/w) of a plant growth regulator (PGR), salt, or solvate, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the PGR, salt, or solvate.

The formulations may comprise less than about 95% (w/w) of a PGR, salt, or solvate, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of the PGR, salt, or solvate.

The formulations may comprise about 0.1%400% (w/w) of a PGR, salt, or solvate, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of the PGR, salt, or solvate.

Auxins (e.g., IAA)

The formulations may comprise at least about 0.1% (w/w) of an auxin (e.g., IAA), for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the auxin (e.g., IAA).

The formulations may comprise less than about 95% (w/w) of an auxin (e.g., IAA), for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of the auxin (e.g., IAA).

The formulations may comprise about 0.1%-100% (w/w) of an auxin (e.g., IAA), for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of the auxin (e.g., IAA).

Gibberellins

The formulations may comprise one or more gibberellins, such as GA1, GA3, GA4, GA7, GA0, ent-gibberellane, ent-kaurene, their derivatives and chemical analogs. The formulations may comprise at least about 0.1% (w/w) of a gibberellin, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the gibberellin.

The formulations may comprise less than about 95% (w/w) of a gibberellin, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of the gibberellin.

The formulations may comprise about 0.1%-100% (w/w) of a gibberellin, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of the gibberellin.

Cytokinins

The formulations may comprise one or more cytokinins, such as kinetin, zeatin, 6-benzylaminopurine, diphenylurea, thidiazuron, their derivatives and chemical analogs. The formulations may comprise at least about 0.1% (w/w) of a cytokinin, for example, at least about 0.1%, at least about 0.2%, at least about 0.3%, at least about 0.4%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the cytokinin.

The formulations may comprise less than about 95% (w/w) of a cytokinin, for example, less than about 0.1%, less than about 0.2%, less than about 0.3%, less than about 0.4%, less than about 0.5%, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, or less than about 95% of the cytokinin.

The formulations may comprise about 0.1%-100% (w/w) of a cytokinin, for example, about 0.1%-1%, 0.1%-5%, about 0.1-10%, about 0.1%-20%, about 0.5%-1%, about 0.5%-5%, about 0.5%-10%, about 0.5%-20%, about 1%-5%, about 1%-10%, about 1%-20%, about 5%-10%, about 5%-20%, about 10%-20%, about 10%-30%, about 20%-30%, about 20%-40%, about 30%-40%, about 30%-50%, about 40%-50%, about 40%-60%, about 50%-60%, about 50%-70%, about 60%-70%, about 60%-80%, about 70%-80%, about 70%-90%, about 80%-90%, about 80%-95%, about 90%-95%, about 90%-99%, about 90%-100%, about 95%-99%, or about 99%-100% of the cytokinin.

Phosphate Solubilizing Bacteria

Phosphate solubilizing bacteria (PSB) are beneficial bacteria capable of solubilizing inorganic phosphorus from insoluble compounds. Numerous genera and species of phosphate solubilizing bacteria have been described. See, e.g., Y. P. Chen; P. D. Rekha; A. B. Arun; F. T. Shen; W.-A. Lai; C. C. Young (2006). "Phosphate solubilizing bacteria from subtropical soil and their tricalcium phosphate solubilizing abilities". *Applied Soil Ecology.* 34 (1): 33-41. In some instances, phosphate solubilizing bacteria refers to a member of an endogenous soil consortium. In some instances, phosphate solubilizing bacteria refers to a non-native phosphate solubilizing bacteria. In some instances, the non-native phosphate solubilizing bacteria is recombinant. In some instances, the non-native phosphate solubilizing bacteria has increased phosphate solubilizing activity relative to a non-recombinant phosphate solubilizing bacteria.

In some instances, agricultural formulations can comprise from about $10^3$-$10^{11}$ cfu of the phosphate solubilizing bacteria per gram of the agricultural formulation. In some instances, agricultural formulations can comprise from about $10^4$-$10^{11}$ cfu of the phosphate solubilizing bacteria per gram of the agricultural formulation. In some instances, agricultural formulations can comprise from about $10^5$-$10^{11}$ cfu of the phosphate solubilizing bacteria per gram of the agricultural formulation. In some instances, agricultural formulations can comprise from about $10^6$-$10^{11}$ cfu of the phosphate solubilizing bacteria per gram of the agricultural formulation. In some instances, agricultural formulations can comprise from about $10^7$-$10^{11}$ cfu of the phosphate solubilizing bacteria per gram of the agricultural formulation. In some instances, agricultural formulations can comprise from about $10^8$-$10^{11}$ cfu of the phosphate solubilizing bacteria per gram of the agricultural formulation. In some instances, agricultural formulations can comprise from about $10^9$-$10^{11}$ cfu of the phosphate solubilizing bacteria per gram of the agricultural formulation. In some instances, agricultural formulations can comprise from about $10^{10}$-$10^{11}$ cfu of the phosphate solubilizing bacteria per gram of the agricultural formulation. In some instances, agricultural formulations can comprise from about $10^6$-$10^{10}$ cfu of the phosphate solubilizing bacteria per gram of the agricultural formulation. In some instances, agricultural formulations can comprise from about $10^6$-$10^9$ cfu of the phosphate solubilizing bacteria per gram of the agricultural formulation. In some instances, agricultural formulations can comprise from about $10^6$-$10^8$ cfu of the phosphate solubilizing bacteria per gram of the agricultural formulation. In some instances, agricultural formulations can comprise from about $10^6$-$10^7$ cfu of the phosphate solubilizing bacteria per gram of the agricultural formulation.

A mechanism of mineral phosphate solubilization by PSB strains may involve the release of low molecular weight organic acids, through which their hydroxyl and carboxyl groups chelate the cations bound to phosphate, thereby converting it into soluble forms.

In some instances, phosphate solubilizing bacteria may selected from the genus *Bacillus*. In some instances, a phosphate solubilizing bacteria may a strain selected from the species *Bacillus megaterium*.

Nitrogen Fixing Bacteria

Nitrogen-fixing bacteria are bacteria that can covert atmospheric nitrogen to ammonia or other molecules that are available to other living organisms. Nitrogen fixing bacteria can infect root hairs of leguminous plants, such as soybean, clover, alfalfa, string beans and peas. The infection leads to nodule formation within which free nitrogen is converted to combined nitrogen (nitrogen-fixation). Nitrogen fixing bacteria are widespread within domain Bacteria including cyanobacteria (e.g. the highly significant *Trichodesmium* and *Cyanothece*), as well as green sulfur bacteria, *Azotobacteraceae, rhizobia* and *Frankia*. In some instances, nitrogen fixing bacteria refers to a member of an endogenous soil consortium. In some instances, nitrogen fixing bacteria refers to a non-native nitrogen fixing bacteria. In some instances, the non-native nitrogen fixing bacteria is recombinant. In some instances, the non-native nitrogen fixing bacteria has increased nitrogen fixing activity relative to a non-recombinant nitrogen fixing bacteria.

In some instances, agricultural formulations can comprise from about $10^3$-$10^{11}$ colony forming units (cfu) of the nitrogen fixing bacteria per gram of the agricultural formulation. In some instances, agricultural formulations can comprise from about $10^4$-$10^{11}$ cfu of the nitrogen fixing bacteria per gram of the agricultural formulation. In some instances, agricultural formulations can comprise from about $10^5$-$10^{11}$ cfu of the nitrogen fixing bacteria per gram of the agricultural formulation. In some instances, agricultural formulations can comprise from about $10^6$-$10^{11}$ cfu of the nitrogen fixing bacteria per gram of the agricultural formulation. In some instances, agricultural formulations can comprise from about $10^7$-$10^{11}$ cfu of the nitrogen fixing bacteria per gram of the agricultural formulation. In some instances, agricultural formulations can comprise from about $10^8$-$10^{11}$ cfu of the nitrogen fixing bacteria per gram of the agricultural formulation. In some instances, agricultural formulations can comprise from about $10^9$-$10^{11}$ cfu of the nitrogen fixing bacteria per gram of the agricultural formulation. In some instances, agricultural formulations can comprise from about $10^{10}$-$10^{11}$ cfu of the nitrogen fixing bacteria per gram of the agricultural formulation. In some instances, agricultural formulations can comprise from about $10^6$-$10^{10}$ cfu of the nitrogen fixing bacteria per gram of the agricultural formulation. In some instances, agricultural formulations can comprise from about $10^6$-$10^9$ cfu of the nitrogen fixing bacteria per gram of the agricultural formulation. In some instances, agricultural formulations can comprise from about $10^6$-$10^8$ cfu of the nitrogen fixing bacteria per gram of the agricultural formulation. In some instances, agricultural formulations can comprise from about $10^6$-$10^7$ cfu of the nitrogen fixing bacteria per gram of the agricultural formulation.

Excipients

The formulations disclosed herein may further comprise one or more excipients. The one or more excipients can be one or more pesticides, one or more stabilizers, one or more additives, one or more carriers, one or more dispersants, one or more fertilizer, or any combination thereof. In one example, one or more excipients comprise acetone.

The formulations disclosed herein may further comprise one or more pesticides. The pesticide may be a biopesticide. A biopesticide may be a form of a pesticide that can be based on microorganisms or natural products. A biopesticide may include naturally occurring substances that control pests (biochemical pesticides), microorganisms that control pests (microbial pesticides), and pesticidal substances produced by plants containing added genetic material (plant-incorporated protectants) or PIPs. Examples of biopesticides can include, but are not limited to, gluocosinolate, chitosan, spinosad, alkaloids, terpenoids, phenolics, pyrethroids, rotenoids, nicotinoids, strychnine, scilliroside, canola oil and baking soda. The pesticide may be an organophosphate pesticide, carbamate pesticide, organochlorine insecticide, pyrethroid pesticide, sulfonylurea pesticides, or a combination thereof. The pesticide may be a herbicide, algicide, avidicide, bactericide, fungicide, insecticide, miticide, molluscicide, nematicide, rodenticide, virucide, or a combination thereof.

The formulations may further comprise one or more stabilizers and/or other additives. The stabilizers and/or additives can include, but are not limited to, penetration agents, adhesives, anticaking agents, dyes, dispersants, wetting agents, emulsifying agents, defoamers, antimicrobials, antifreeze, pigments, colorants, buffers, and carriers. The formulations may further comprise surfactants and/or adjuvants.

The formulations may further comprise one or more carriers. Examples of carriers include, but are not limited to, solid carriers, sponges, textiles, and synthetic materials. The synthetic material may be a porous synthetic material. Additional carriers can include organic carriers, such as waxes, linolin, paraffin, dextrose granules, sucrose granules and maltose-dextrose granules. Alternatively, the carrier can be an anorganic carrier such as natural clays, kaolin, pyrophyllite, bentonite, alumina, montmorillonite, kieselguhr, chalk, diatomaceous earths, calcium phosphates, calcium and magnesium carbonates, sulphur, lime, flours or talc. The formulation may be adsorbed into the carrier. The carrier may be characterized by enabling release of the compound, salt, solvate, or formulation.

The formulations may further comprise one or more dispersants. The dispersant may be an negatively charged anion dispersant. The dispersant may be a nonionic dispersant.

The formulations may further comprise fertilizer. The fertilizer may be a chemical fertilizer. The fertilizer may be an organic fertilizer. The fertilizer may be an inorganic fertilizer. The fertilizer may be a granulated or powdered fertilizer. The fertilizer may be a liquid fertilizer. The fertilizer may be a slow-release fertilizer.

The formulations disclosed herein may be formulated as a dry sprayable formulation. Examples of dry sprayable formulations can include, but are not limited to, wettable powders and water dispersible granules. Wettable powders may comprise compounds, salts, solvates, that have been microionized to powder form. Wettable powders may be applied as suspended particles after dispertion into water. Water dispersible granules may consist of granules that are applied after disintegration or dispersion in water. The water dispersible granules may comprise particles within the range of 0.2 to 4 mm. Water dispersible granules may be formed by agglomeration, spray drying, or extrusion techniques.

The formulations may be formulated as a liquid sprayable formulation. Examples of liquid sprayable formulations can include, but are not limited to, soluble concentrates, suspension concentrates, emulsifiable concentrates, microemulsions, oil dispersions, and microencapsulated particles. Suspension concentrates may comprise a stable suspension of the compound, salt, solvate, or formulation in a fluid usually intended for dilution with water before use. Emulsifiable concentrates may comprise a compound, salt, solvate, or formulation with an emulsifying agent in a water insoluble organic solvate which will form an emulsion when added to water. Microemulsions may comprise a compound, salt, solvate, or formulation with an emulsifying agent in a water insoluble organic solvate which will form a solution/emulsion when added to water.

The formulations may be formulated as a dry spreadable granule formulation. The dry spreadable granule formulation may comprise soil applied granule on inert or fertilizer carriers.

The formulations may be formulated as a seed treatment or seed dressing.

The formulations may be formulated for rapid release. The formulations may be formulated for slow release.

Methods of Increasing Nutrient Availability

Also disclosed herein are methods of increasing soil nutrient availability and/or increasing yield of a plant. The methods can comprise contacting a soil or plant with the compounds, salts, solvates, or formulations disclosed herein.

A large proportion of phosphorus in the soil is "locked up" as insoluble rock phosphates, which plants cannot access. The activity of phosphate solubilizing microbial activity in the root zone of the plant is critical for crops to access phosphorus. Phosphate solubilizing bacteria often work as part of a symbiosis with plants and soil fungi, liberating phosphates that plants can use for growth. In some instances, the compounds, salts, solvates, and formulations disclosed herein can directly stimulate the phosphate solubilizing activity of the soil's native bacteria consortium, providing more phosphorus for plant growth. In some instances, phosphate solubilizing bacteria disclosed herein can convert insoluble, plant-inaccessible phosphate to soluble, plant-available phosphate. Nitrogen-fixing bacteria (legumes) convert atmospheric nitrogen to plant available forms of nitrogen.

Nitrogen can also be a limiting nutrient for crop growth. Plants can access nitrogen in multiple ways. The most familiar in modern agriculture is to take up mineralized forms of nitrogen (ammonia, urea, nitrate) that are provided as fertilizer by a farmer. In legumes, plant available nitrogen is provided by the symbiotic relationship with nitrogen fixing bacteria living in root nodules. In some instances, the compounds, salts, solvates, and formulations disclosed herein can induce bacterial genes for nitrogen fixation, in both nodule forming bacteria and in free-living nitrogen fixing bacteria. By thus activating nitrogen fixation in the soil, the compounds, salts, solvates, and formulations disclosed herein can provide extra plant available nutrition. In some instances, compounds, salts, solvates, and formulations disclosed herein can significantly boost crop health and yield in nitrogen limiting environments.

The compounds, salts, solvates, and formulations disclosed herein may be used in agriculture. The compounds, salts, solvates, and formulations may be used to promote plant growth. The compounds, salts, solvates, and formulations disclosed herein may be used for enhancing shoot stability in plants. The compounds, salts, solvates, and formulations may be used for increasing transport capacity in plants. The compounds, salts, solvates, and formulations may be used for increasing drought tolerance of a plant.

Further disclosed herein are methods of improving agriculture comprising applying a formulation comprising a compound, salt, solvate, or formulation to a plant, thereby improving agriculture. Improving agriculture may comprise promoting plant growth. Improving agriculture may comprise enhancing shoot stability in plants. Improving agriculture may comprise increasing transport capacity in plants. Improving agriculture may comprise increasing drought tolerance. Improving agriculture may comprise reducing an application of one or more pesticides. Improving agriculture may comprise terminating application of one or more pesticides. Improving agriculture may comprise reducing watering amounts applied to the plants. Improving agriculture may comprise reducing watering frequency to the plants. Improving agriculture may comprise controlling phytopathogenic fungi. Improving agriculture may comprise controlling unwanted plant growth. Improving agriculture may comprise controlling unwanted insect or mite infestation. Improving agriculture may comprise regulating growth of the plant. Improving agriculture may comprise promoting or stimulating activity in one or more fungi.

Further disclosed herein are methods of controlling phytopathogenic fungi and/or unwanted plant growth and/or unwanted insect or mite infestation and/or for regulating the growth of plants. The methods may comprise use of a formulation comprising a compound, salt, solvate, or formulation disclosed herein to act on the respective pests, their habitat or the plants to be protected from the respective pest, to the soil and/or to unwanted plants and/or the crop plants and/or their habitat.

The compounds, salts, solvates, may increase plant growth by at least about 5%. The compounds, salts, solvates, may increase plant growth by at least about 10%. The compounds, salts, solvates, may increase plant growth by at least about 15%. The compounds, salts, solvates, may increase plant growth by at least about 20%. The compounds, salts, solvates, may increase plant growth by at least about 25%. The compounds, salts, solvates, may increase plant growth by at least about 30%. The compounds, salts, solvates, may increase plant growth by at least about 50%. The compounds, salts, solvates, may increase plant growth by at least about 60%, 70%, 80%, 90%, 95%, 100% or more.

The compounds, salts, solvates, may increase plant growth by at least about 1.5, 2, 3, 4, 5, 6, 7, 8, 9, 10, 11, 12, 13, 14, 15, 16, 17, 18, 19, 20, 25, 30, 40, 50-fold or more. The compounds, salts, solvates, may increase plant growth by at least about 1.5-fold or more. The compounds, salts, solvates, may increase plant growth by at least about 2-fold or more. The compounds, salts, solvates, may increase plant growth by at least about 3-fold or more. The compounds, salts, solvates, may increase plant growth by at least about 5-fold or more. The compounds, salts, solvates, may increase plant growth by at least about 10-fold or more. Plant growth may comprise secondary plant growth.

The compounds, salts, solvates, may enhance shoot growth by at least about 5%. The compounds, salts, solvates, may enhance shoot growth by at least about 10%. The compounds, salts, solvates, may enhance shoot growth by at least about 15%. The compounds, salts, solvates, may enhance shoot growth by at least about 20%. The compounds, salts, solvates, may enhance shoot growth by at least about 25%. The compounds, salts, solvates, may enhance shoot growth by at least about 30%. The compounds, salts, solvates, may enhance shoot growth by at least about 50%. The compounds, salts, solvates, may enhance shoot growth by at least about 60%, 70%, 80%, 90%, 95%, 100% or more. The compounds, salts, solvates, may enhance shoot growth by at least about 1.5, 2, 3, 4, 5, 6, 7, 8, 9, 10, 11, 12, 13, 14, 15, 16, 17, 18, 19, 20, 25, 30, 40, 50-fold or more.

The compounds, salts, solvates, may enhance shoot growth by at least about 1.5-fold or more. The compounds, salts, solvates, may enhance shoot growth by at least about 2-fold or more. The compounds, salts, solvates, may enhance shoot growth by at least about 3-fold or more. The compounds, salts, solvates, may enhance shoot growth by at least about 5-fold or more. The compounds, salts, solvates, may enhance shoot growth by at least about 10-fold or more.

The compounds, salts, solvates, may increase transport capacity in plants by at least about 5%. The compounds, salts, solvates, may increase transport capacity in plants by at least about 10%. The compounds, salts, solvates, may increase transport capacity in plants by at least about 15%. The compounds, salts, solvates, may increase transport capacity in plants by at least about 20%. The compounds, salts, solvates, may increase transport capacity in plants by at least about 25%. The compounds, salts, solvates, may increase transport capacity in plants by at least about 30%. The compounds, salts, solvates, may increase transport capacity in plants by at least about 50%. The compounds, salts, solvates, may increase transport capacity in plants by at least about 60%, 70%, 80%, 90%, 95%, 100% or more.

The compounds, salts, solvates, may increase transport capacity in plants by at least about 1.5, 2, 3, 4, 5, 6, 7, 8, 9, 10, 11, 12, 13, 14, 15, 16, 17, 18, 19, 20, 25, 30, 40, 50-fold or more. The compounds, salts, solvates, may increase transport capacity in plants by at least about 1.5-fold or more. The compounds, salts, solvates, may increase transport capacity in plants by at least about 2-fold or more. The compounds, salts, solvates, may increase transport capacity in plants by at least about 3-fold or more. The compounds, salts, solvates, may increase transport capacity in plants by at least about 5-fold or more. The compounds, salts, solvates, may increase transport capacity in plants by at least about 10-fold or more.

The compounds, salts, solvates, may increase drought tolerance in plants by at least about 5%. The compounds, salts, solvates, may increase drought tolerance in plants by at least about 10%. The compounds, salts, solvates, may increase drought tolerance in plants by at least about 15%. The compounds, salts, solvates, may increase drought tolerance in plants by at least about 20%. The compounds, salts, solvates, may increase drought tolerance in plants by at least about 25%. The compounds, salts, solvates, may increase drought tolerance in plants by at least about 30%. The compounds, salts, solvates, may increase drought tolerance in plants by at least about 50%. The compounds, salts, solvates, may increase drought tolerance in plants by at least about 60%, 70%, 80%, 90%, 95%, 100% or more.

The compounds, salts, solvates, may increase drought tolerance in plants by at least about 1.5, 2, 3, 4, 5, 6, 7, 8, 9, 10, 11, 12, 13, 14, 15, 16, 17, 18, 19, 20, 25, 30, 40, 50-fold or more. The compounds, salts, solvates, may increase drought tolerance in plants by at least about 1.5-fold or more. The compounds, salts, solvates, may increase drought tolerance in plants by at least about 2-fold or more. The compounds, salts, solvates, may increase drought tolerance in plants by at least about 3-fold or more. The compounds, salts, solvates, may increase drought tolerance in plants by at least about 5-fold or more. The compounds, salts, solvates, may increase drought tolerance in plants by at least about 10-fold or more.

The compounds, salts, solvates, may reduce the application of one or more pesticides. Reducing the application of one or more pesticides may comprise reducing an amount of the one or more pesticides that are applied to the plant. The amount of the one or more pesticides applied to the plant may be reduced by at least about 1%, 5%, 10%, 15%, 20%, 25%, 30%, 35%, 40%, 50%, 60%, 70%, 80%, 90%, 95%, or 100%. The amount of the one or more pesticides applied to the plant may be reduced by at least about 10%. The amount of the one or more pesticides applied to the plant may be reduced by at least about 20%. The amount of the one or more pesticides applied to the plant may be reduced by at least about 30%. The amount of the one or more pesticides applied to the plant may be reduced by at least about 50%.

Alternatively, or additionally, reducing the application of the one or more pesticides may comprise reducing a frequency of which the one or more pesticides are applied to the plant. The frequency of which the one or more pesticides are applied to the plant may be reduced by at least about 1%, 5%, 10%, 15%, 20%, 25%, 30%, 35%, 40%, 50%, 60%, 70%, 80%, 90%, 95%, or 100%. The frequency of which the one or more pesticides are applied to the plant may be reduced by at least about 10%. The frequency of which the one or more pesticides are applied to the plant may be reduced by at least about 20%. The frequency of which the one or more pesticides are applied to the plant may be reduced by at least about 30%. The frequency of which the one or more pesticides are applied to the plant may be reduced by at least about 40%. The frequency of which the one or more pesticides are applied to the plant may be reduced by at least about 50%.

Use of the compounds, salts, solvates, may allow a reduction in the amount of water applied to the plants. The amount of the water applied to the plant may be reduced by at least about 1%, 5%, 10%, 15%, 20%, 25%, 30%, 35%, 40%, 50%, 60%, 70%, 80%, 90%, 95%, or 100%. The amount of the water applied to the plant may be reduced by at least about 10%. The amount of the water applied to the plant may be reduced by at least about 20%. The amount of the water applied to the plant may be reduced by at least about 30%. The amount of the water applied to the plant may be reduced by at least about 50%.

Use of the compounds, salts, solvates, may allow a reduction in the frequency of which the water is applied to the plant. The frequency of which the water is applied to the plant may be reduced by at least about 1%, 5%, 10%, 15%, 20%, 25%, 30%, 35%, 40%, 50%, 60%, 70%, 80%, 90%, 95%, or 100%. The frequency of which the water is applied to the plant may be reduced by at least about 10%. The frequency of which the water is applied to the plant may be reduced by at least about 20%. The frequency of which the water is applied to the plant may be reduced by at least about 30%. The frequency of which the water is applied to the plant may be reduced by at least about 40%. The frequency of which the water is applied to the plant may be reduced by at least about 50%.

The compound, salt, solvate, formulation disclosed herein may be used to control phytopathogenic fungi. Improving agriculture may comprise controlling unwanted plant growth. Controlling unwanted plant growth may comprise stimulating germination activity of the unwanted plant. The unwanted plant may be a parasitic plant. The unwanted plant may be a root parasitic plant. Examples of parasitic plants can include, but are not limited to, witchweeds (*Striga* spp.), broomrapes (*Orobanche* spp, *Phelipanche* spp), *Alectra*, dodders, and mistletoes. The unwanted plant may belong to the family Orobanchaceae. The unwanted plant may be witchweed. The unwanted plant may be *Orobanche* spp. The compound, salt, solvate, or formulation may be applied directly to the unwanted plant. The compound, salt, solvate, or formulation may be applied indirectly to the unwanted plant.

The compound, salt, solvate, or formulation disclosed herein may be used to control unwanted insect or mite infestation. Examples of insects and mites can include, but are not limited to spiders, gnats, mealybugs, whiteflies, predator mites, spider mites and aphids.

The compound, salt, solvate, or formulation disclosed herein may be used to regulate growth of the plant. Regulating plant growth may comprise regulating plant breeding. Regulating plant growth may comprise inhibiting shoot branching. Regulating plant growth may comprise regulating one or more plant products. Regulating plant growth may comprise inhibiting root development.

The compound, salt, solvate, or formulation disclosed herein may be used to promote or stimulate activity in fungi. The compound, salt, solvate, or formulation may stimulate hyphal branching activity of one or more fungi. The compound, salt, solvate, or formulation may induce spore germination of one or more fungi. The one or more fungi may be arbuscular mycorrhizal (AM) fungi.

Further disclosed herein are methods of preserving or extending the life of a plant. Generally, the method may comprise contacting the plant with a compound, salt, solvate, or formulation disclosed herein. The compound, salt, solvate, or formulation for use in preserving or extending the life of a plant may be produced by any of the methods disclosed herein. The compound, salt, solvate, or formulation may be produced by chemical synthesis. For example, the compound, salt, solvate, or formulation can be produced by conducting a condensation reaction on a sesquiterpene lactone, salt, solvate, polymorph, stereoisomer, isomer or derivative thereof. The compound, salt, solvate, or formulation may be produced by conducting a hydroxymethylation on a sesquiterpene lactone, salt, solvate, polymorph, stereoisomer, isomer or derivative thereof. The compound, salt, solvate, or formulation may be produced by (a) conducting a hydroxymethylation on a sesquiterpene lactone, salt, solvate, polymorph, stereoisomer, isomer or derivative thereof to produce a first product; and (b) conducting an alkylation reaction on the first product. Alternatively, the compound, salt, solvate, or formulation can be produced by biological synthesis. Biological synthesis may comprise the use of one or more cells, genes, or vectors disclosed herein.

The compound, salt, solvate, or formulation may be used to preserve or extend the life of a cut plant. The cut plant may be a flower. The cut plant may be a tree. The cut plant may be bush or shrub. The cut plant may be a vegetable. The compound, salt, solvate, or formulation may be used to preserve or extend the life of an uncut plant. The uncut plant may be a flower. The uncut plant may be a tree. The uncut plant may be bush or shrub. The uncut plant may be a vegetable. The compound, salt, solvate, or formulation may be used to preserve or extend the life of a potted plant. The potted plant may be a flower. The potted plant may be a tree. The potted plant may be bush or shrub. The potted plant may be a vegetable.

The compound, salt, solvate, or formulation may be used to preserve or extend the life of a flower. Examples of flowers can include, but are not limited to, lilies, daisies, roses, marigolds, Angel's trumpet, phlox, vinca, snapdragons, toadflax, orchids, ferns, black-eyed Susans, blood flowers, blue lobelias, morning glories, poppies, calendulas, geraniums, impatiens, lantanas, larkspurs, calla lilies, hyacinths, azaleas, pointsettias, and begonias.

The compound, salt, solvate, or formulation may be used to preserve or extend the life of a bush or shrub. Examples of bushes and shrubs can include, but are not limited to, forsynthia, fuchsia, hibiscus, currant, lilac, rose, hydrangea, willow, magnolia, thyme, snowberry, dogwood and holly.

The compound, salt, solvate, or formulation may be used to preserve or extend the life of a tree. Examples of trees can include, but are not limited to, cypress, poinsettia, palm, fir, pine, spruce, cedar, oak, mulberry, chestnut, hawthorn, poplar, and maple. The tree may be a fir tree. The fir tree may be a Douglas, Balsam or Fraser fir tree. The tree may be a pine tree. The pine tree may be a Scotch or White pine tree. The tree may be a spruce tree. The spruce tree may be a White, Norway or Blue spruce tree. The tree may be a cedar tree. The cedar tree may be a Deodara or Eastern red cedar. The tree may be a cypress tree. The cypress tree may be an Arizona or Leland cypress tree.

The plant may be contacted with a compound, salt, solvate, or formulation disclosed herein, thereby extending or preserving the life of the plant. Contacting the plant with the compound, salt, solvate, or formulation may comprise administering the compound, salt, solvate, or formulation as a spray. Contacting the plant with the compound, salt, solvate, or formulation may comprise adding the plant growth material to the irrigation water of the plant. Contacting the plant with the compound, salt, solvate, or formulation may comprise applying the compound, salt, solvate, or formulation to the habitat of the plant. Contacting the plant with the compound, salt, solvate, or formulation may comprise adding the compound, salt, solvate, or formulation to a plant container (e.g., vase) and placing the plant in the plant container. Contacting the plant with the compound, salt, solvate, or formulation may comprise adding the compound, salt, solvate, or formulation to soil.

The life of the plant may be extended by at least about 1%, 5%, 10%, 15%, 20%, 25%, 30%, 35%, 40%, 45%, 50%, 55%, 60%, 65%, 70%, 75%, 80%, 85%, 90%, 95%, or 97% as compared to an untreated plant. The life of the plant may be extended by at least about 20% as compared to an untreated plant. The life of the plant may be extended by at least about 30% as compared to an untreated plant. The life of the plant may be extended by at least about 40% as compared to an untreated plant. The life of the plant may be extended by at least about 50% as compared to an untreated plant. The life of the plant may be extended by at least about 55% as compared to an untreated plant. The life of the plant may be extended by at least about 60% as compared to an untreated plant. The life of the plant may be extended by at least about 65% as compared to an untreated plant. The life of the plant may be extended by at least about 70% as compared to an untreated plant. The life of the plant may be extended by at least about 75% as compared to an untreated plant. The life of the plant may be extended by at least about 80% as compared to an untreated plant. The life of the plant can be determined by measuring the growth time between initial planting of a seed of the plant to the death of the plant.

The life of the plant may be extended by at least about 6, 12, 24, 30, 36, 42, 48, 54, 60, 66, 72, 78, 84, 90, 96, 102, 108, 114, or 120 hours as compared to an untreated plant. The life of the plant may be extended by at least about 24 hours as compared to an untreated plant. The life of the plant may be extended by at least about 36 hours as compared to an untreated plant. The life of the plant may be extended by at least about 48 hours as compared to an untreated plant. The life of the plant may be extended by at least about 72 hours as compared to an untreated plant. The life of the plant may be extended by at least about 96 hours as compared to an untreated plant.

The life of the plant may be extended by at least about 1, 1.5, 2, 2.5, 3, 3.5, 4, 4.5, 5, 5.5, 6, 6.5, or 7 days as compared to an untreated plant. The life of the plant may be extended by at least about 8, 9, 10, 11, 12, 13, 14, 15, 16, 17, 18, 19, or 20 days as compared to an untreated plant. The life of the plant may be extended by at least about 1 day as compared to an untreated plant. The life of the plant may be extended by at least about 2 days as compared to an untreated plant. The life of the plant may be extended by at least about 2.5 days as compared to an untreated plant. The life of the plant may be extended by at least about 3 days as compared to an untreated plant. The life of the plant may be extended by at least about 3.5 days as compared to an untreated plant. The life of the plant may be extended by at least about 4 days as compared to an untreated plant. The life of the plant may be extended by at least about 4.5 days as compared to an untreated plant.

The life of the plant may be extended by at least about 1, 1.5, 2, 2.5, 3, 3.5, 4, 4.5, 5, 5.5, 6, 6.5, or 7 weeks as compared to an untreated plant. The life of the plant may be extended by at least about 8, 9, 10, 11, 12, 13, 14, 15, 16, 17, 18, 19, or 20 weeks as compared to an untreated plant. The life of the plant may be extended by at least about 1, 1.5, 2, 2.5, 3, 3.5, 4, 4.5, 5, 5.5, 6, 6.5, or 7 months as compared to an untreated plant. The life of the plant may be extended by at least about 8, 9, 10, 11, 12, 13, 14, 15, 16, 17, 18, 19, or 20 months as compared to an untreated plant.

Preserving or extending the life of the plant may comprise reducing wilting of the plant. Reducing wilting of the plant may comprise reducing flower or leaf rolling of the plant. The wilting of the plant may be reduced by at least about 1%, 5%, 10%, 15%, 20%, 25%, 30%, 35%, 40%, 45%, 50%, 55%, 60%, 65%, 70%, 75%, 80%, 85%, 90%, 95%, or 97% as compared to an untreated plant. The wilting of the plant may be reduced by at least about 10% as compared to an untreated plant. The wilting of the plant may be reduced by at least about 30% as compared to an untreated plant. The wilting of the plant may be reduced by at least about 50% as compared to an untreated plant. The wilting of the plant may be reduced by at least about 70% as compared to an untreated plant. The wilting of the plant may be reduced by at least about 80% as compared to an untreated plant.

A sign of plant stress may include wilting of the plant. For example, stressed plants may have rolled leaves or petals. The plant growth materials disclosed herein may promote the life of the plant by reducing the wilting of the plant. Reducing the wilting of the plant may comprise delaying the wilting of the plant as compared to an untreated plant. For example, an untreated cut plant may show signs of wilting within 36 hours of being cut, however, a cut plant treated with a plant growth material may have delayed wilting. The wilting of the plant may be delayed by at least about 2, 3, 4, 5, 6, 7, 8, 9, 10, 11, 12, 13, 14, 15, 16, 17, 18, 19, 20, 21, 22, 23, or 24 hours as compared to an untreated plant. The wilting of the plant may be delayed by at least about 12 hours as compared to an untreated plant. The wilting of the plant may be delayed by at least about 24 hours as compared to an untreated plant. The wilting of the plant may be delayed by at least about 36 hours as compared to an untreated plant. The wilting of the plant may be delayed by at least about 48 hours as compared to an untreated plant.

An additional sign of plant stress may include reduced turgidity. Turgidity may refer to pressure caused by the osmotic flow of water from an area of low solute concentration outside of the cell into the cell cell's vacuole. Turgidity may be used by plants to maintain rigidity. Often, healthy plants are turgid, whereas, unhealthy plants are less turgid. Preserving or extending the life of the plant may comprise prolonging or maintaining the turgidity of the plant. The turgidity of the plant may be greater than the turgidity of an untreated plant. The turgidity of the plant may be at least about 1%, 5%, 10%, 15%, 20%, 25%, 30%, 35%, 40%, 45%, 50%, 55%, 60%, 65%, 70%, 75%, 80%, 85%, 90%, 95%, or 97% greater than the turgidity of an untreated plant. The turgidity of the plant may be at least about 10% greater than the turgidity of an untreated plant. The turgidity of the plant may be at least about 15% greater than the turgidity of an untreated plant. The turgidity of the plant may be at least about 25% greater than the turgidity of an untreated plant. The turgidity of the plant may be at least about 35% greater than the turgidity of an untreated plant. The turgidity of the plant may be at least about 45% greater than the turgidity of an untreated plant. The turgidity of the plant may be at least about 60% greater than the turgidity of an untreated plant. The turgidity of the plant may be at least about 75% greater than the turgidity of an untreated plant.

A stressed plant may also show a reduction in the turgid state. The turgid state may refer to a period of time in which the plant maintains its rigidity. The rigidity of the plant may refer to the rigidity of the stem of the plant. For example, as cut plants die, the stem of the plant may be less rigid, thereby causing the cut plant to fall over or bend. A stressed plant may be unable to hold itself upright. Preserving or extending the life of the plant may comprise prolonging the turgid state of the plant. The turgid state of the plant may be increased by at least about 1%, 5%, 10%, 15%, 20%, 25%, 30%, 35%, 40%, 45%, 50%, 55%, 60%, 65%, 70%, 75%, 80%, 85%, 90%, 95%, or 97% as compared to an untreated plant. The turgid state of the plant may be increased by at least about 20% as compared to an untreated plant. The turgid state of the plant may be increased by at least about 30% as compared to an untreated plant. The turgid state of the plant may be increased by at least about 40% as compared to an untreated plant. The turgid state of the plant may be increased by at least about 50% as compared to an untreated plant.

The turgid state of the plant may be increased by at least about 2, 3, 4, 5, 6, 7, 8, 9, 10, 11, 12, 13, 14, 15, 16, 17, 18, 19, 20, 21, 22, 23, or 24 hours as compared to an untreated plant. The turgid state of the plant may be increased by at least about 6 hours as compared to an untreated plant. The turgid state of the plant may be increased by at least about 12 hours as compared to an untreated plant. The turgid state of the plant may be increased by at least about 24 hours as compared to an untreated plant.

A stressed plant may lose leaves or petals. Contacting a plant with a plant growth material may reduce or delay the loss of one or more petals or leaves of the plant. For example, an untreated plant may lose 50% of its leaves or petals, whereas a treated plant may lose 10-25% of its leaves or petals. The loss of the one or more petals of the plant may be reduced by least about 1%, 5%, 10%, 15%, 20%, 25%, 30%, 35%, 40%, 45%, 50%, 55%, 60%, 65%, 70%, 75%, 80%, 85%, 90%, 95%, or 97% as compared to the loss of the one or more petals of an untreated plant. The loss of the one or more petals of the plant may be reduced by least about 10% as compared to the loss of the one or more petals of an untreated plant. The loss of the one or more petals of the plant may be reduced by least about 20% as compared to the loss of the one or more petals of an untreated plant. The loss of the one or more petals of the plant may be reduced by least about 35% as compared to the loss of the one or more petals of an untreated plant. The loss of the one or more petals of the plant may be reduced by least about 50% as compared to the loss of the one or more petals of an untreated plant. The loss of the one or more petals of the plant may be reduced by least about 60% as compared to the loss of the one or more petals of an untreated plant. The loss of the one or more petals of the plant may be reduced by least about 70% as compared to the loss of the one or more petals of an untreated plant.

The loss of the one or more petals of the plant may be delayed by at least about 2, 3, 4, 5, 6, 7, 8, 9, 10, 11, 12, 13, 14, 15, 16, 17, 18, 19, 20, 21, 22, 23, or 24 hours as compared to the loss of one or more petals of an untreated plant. The loss of the one or more petals of the plant may be delayed by at least about 25, 30, 35, 40, 45, 50, 55, 60, 65, 70, 75, 80, 85, 90, 95 or 100 hours as compared to the loss of one or more petals of an untreated plant. The loss of the one or more petals of the plant may be delayed by at least about 6 hours as compared to the loss of one or more petals of an untreated plant. The loss of the one or more petals of the plant may be delayed by at least about 12 hours as compared to the loss of one or more petals of an untreated plant. The loss of the one or more petals of the plant may be delayed by at least about 18 hours as compared to the loss of one or more petals of an untreated plant. The loss of the one or more petals of the plant may be delayed by at least about 36 hours as compared to the loss of one or more petals of an untreated plant. The loss of the one or more petals of the plant may be delayed by at least about 48 hours as compared to the loss of one or more petals of an untreated plant. The loss of the one or more petals of the plant may be delayed by at least about 60 hours as compared to the loss of one or more petals of an untreated plant. The loss of the one or more petals of the plant may be delayed by at least about 72 hours as compared to the loss of one or more petals of an untreated plant. The loss of the one or more petals of the plant may be delayed by at least about 96 hours as compared to the loss of one or more petals of an untreated plant.

A stressed plant may show signs of discoloration. The stressed plant may appear brownish. Alternatively, or additionally, the stressed plant shows a reduction in the appearance of green leaves. The chlorophyll content of the stressed plant may also be reduced. Preserving or extending the life of the plant may comprise maintaining the chlorophyll content of the plant. For example, a reduction in the chlorophyll content of an untreated plant may appear within 48 hours of being cut. However, a reduction in the chlorophyll content of a treated plant may appear after 60 hours of being cut. The chlorophyll content of the plant may be maintained for at least about 2, 3, 4, 5, 6, 7, 8, 9, 10, 11, 12, 13, 14, 15, 16, 17, 18, 19, 20, 21, 22, 23, or 24 hours. The chlorophyll content of the plant may be maintained for at least about 6 hours. The chlorophyll content of the plant may be maintained for at least about 12 hours. The chlorophyll content of the plant may be maintained for at least about 24 hours. Discoloration such as leaf firing (premature yellowing) may occur as a result of poor nutrient availability, and can be an indicator of poor plant health. For, example, leaf firing may be a result of nitrogen deficiency.

Preserving or extending the life of the plant may comprise reducing or delaying the loss of the chlorophyll content of the plant. The chlorophyll content of the plant may be greater than the chlorophyll content of an untreated plant. The chlorophyll content of the plant may be at least about 1%, 5%, 10%, 15%, 20%, 25%, 30%, 35%, 40%, 45%, or 50% greater than the content of an untreated plant. The chlorophyll content of the plant may be at least about 55%, 60%, 65%, 70%, 75%, 80%, 85%, 90%, 95% or 97% greater than the content of an untreated plant. The chlorophyll content of the plant may be at least about 20% greater than the content of an untreated plant. The chlorophyll content of the plant may be at least about 30% greater than the content of an untreated plant. The chlorophyll content of the plant may be at least about 40% greater than the content of an untreated plant. The chlorophyll content of the plant may be at least about 50% greater than the content of an untreated plant. The chlorophyll content of the plant may be at least about 60% greater than the content of an untreated plant. The chlorophyll content of the plant may be at least about 1.5, 2, 2.5, 3, 3.5, 4, 4.5, 5, 5.5, 6, 6.5, 7, 8, 9, or 10-fold greater than the content of an untreated plant. The chlorophyll content of the plant may be at least about 11, 12, 13, 14, 15, 16, 17, 18, 19, 20, 25, 30, 35, 40, 45, 50, 55, 60, 65, 70, 75, 80, 85, 90, 95 or 100-fold greater than the content of an untreated plant. The chlorophyll content of the plant may be at least about 2-fold greater than the content of an untreated plant. The chlorophyll content of the plant may be at least about 3-fold greater than the content of an untreated plant. The chlorophyll content of the plant may be at least about 4-fold greater than the content of an untreated plant. The chlorophyll content of the plant may be at least about 5-fold greater than the content of an untreated plant. The chlorophyll content of the plant may be at least about 10-fold greater than the content of an untreated plant.

The loss of the chlorophyll content of the plant may be delayed by at least about 2, 3, 4, 5, 6, 7, 8, 9, 10, 11, 12, 13, 14, 15, 16, 17, 18, 19, 20, 21, 22, 23, or 24 hours as compared to the loss of the chlorophyll content of an untreated plant. The loss of the chlorophyll content of the plant may be delayed by at least about 30, 35, 40, 45, 50, 55, 60, 65, 70, 75, 80, 85, 90, 95, or 100 hours as compared to the loss of the chlorophyll content of an untreated plant. The loss of the chlorophyll content of the plant may be delayed by at least about 6 hours as compared to the loss of the chlorophyll content of an untreated plant. The loss of the chlorophyll content of the plant may be delayed by at least about 12 hours as compared to the loss of the chlorophyll content of an untreated plant. The loss of the chlorophyll content of the plant may be delayed by at least about 24 hours as compared to the loss of the chlorophyll content of an untreated plant. The loss of the chlorophyll content of the plant may be delayed by at least about 36 hours as compared to the loss of the chlorophyll content of an untreated plant. The loss of the chlorophyll content of the plant may be delayed by at least about 48 hours as compared to the loss of the chlorophyll content of an untreated plant. The loss of the chlorophyll content of the plant may be delayed by at least about 60 hours as compared to the loss of the chlorophyll content of an untreated plant. The loss of the chlorophyll content of the plant may be delayed by at least about 72 hours as compared to the loss of the chlorophyll content of an untreated plant.

The loss of the chlorophyll content of the plant may be less than the loss of the chlorophyll content of an untreated plant. The loss of the chlorophyll content of the plant may be at least about 1%, 5%, 10%, 15%, 20%, 25%, 30%, 35%, 40%, 45%, 50%, 55%, or 60% less than the loss of the chlorophyll content of an untreated plant. The loss of the chlorophyll content of the plant may be at least about 65%, 70%, 72%, 75%, 77%, 80%, 85%, 90%, 92%, 95%, or 97% less than the loss of the chlorophyll content of an untreated plant. The loss of the chlorophyll content of the plant may be at least about 5% less than the loss of the chlorophyll content of an untreated plant. The loss of the chlorophyll content of the plant may be at least about 10% less than the loss of the chlorophyll content of an untreated plant. The loss of the chlorophyll content of the plant may be at least about 20% less than the loss of the chlorophyll content of an untreated plant. The loss of the chlorophyll content of the plant may be at least about 30% less than the loss of the chlorophyll content of an untreated plant. The loss of the chlorophyll content of the plant may be at least about 40% less than the loss of the chlorophyll content of an untreated plant. The loss of the chlorophyll content of the plant may be at least about 50% less than the loss of the chlorophyll content of an untreated plant. The loss of the chlorophyll content of the plant may be at least about 60% less than the loss of the chlorophyll content of an untreated plant.

The loss of the chlorophyll content of the plant may be at least about 1.5, 2, 2.5, 3, 3.5, 4, 4.5, 5, 5.5, 6, 6.5, 7, 7.5, 8, 8.5, 9, 9.5, or 10-fold less than the loss of the chlorophyll content of an untreated plant. The loss of the chlorophyll content of the plant may be at least about 11, 12, 13, 14, 15, 16, 17, 18, 19, 20, 25, 30, 35, 40, 45, 50, 55, 60, 65, 70, 75, 80, 85, 90, 95 or 100-fold less than the loss of the chlorophyll content of an untreated plant. The loss of the chlorophyll content of the plant may be at least about 2-fold less than the loss of the chlorophyll content of an untreated plant. The loss of the chlorophyll content of the plant may be at least about 3-fold less than the loss of the chlorophyll content of an untreated plant. The loss of the chlorophyll content of the plant may be at least about 5-fold less than the loss of the chlorophyll content of an untreated plant. The loss of the chlorophyll content of the plant may be at least about 10-fold less than the loss of the chlorophyll content of an untreated plant.

The compound, salt, solvate, or formulation may be applied directly to the plant. The compound, salt, solvate, or formulation may be applied to one or more parts of the plant. The one or more parts of the plant may comprise a terminal bud, flower, lateral bud, leaf blade, leaf axil, node, internode, petiole, primary root, lateral root, root hair, root cap, or a combination thereof. The formulations may be applied to the leaf blade of the plant. The formulations may be applied to the root of the plant.

Alternatively, or additionally, the compound, salt, solvate, or formulation can be applied to a soil. The formulation may be applied to an area around the plant. The area around the plant may comprise soil. The area around the plant may comprise an adjacent plant. The formulation may be applied to a soil before placing a plant or seed in the soil. The formulation may be applied to bacterial consortium present in the soil. The formulation may be applied with additional bacteria to supplement the natural bacterial consortium in the soil.

The compound, salt, solvate, or formulation may be applied to a plant that is susceptible to a parasitic weed. Examples of plants include, but are not limited to, corn, rice, sorghum, millets, and sugar cane. The plant may be corn. The plant may be tobacco. The plant may be rice.

The compound, salt, solvate, or formulation may be applied as a seed coating. The compound, salt, solvate, or formulation may be applied as a seed treatment. The compound, salt, solvate, or formulation may be applied as a seed dressing. The compound, salt, solvate, or formulation may be applied as a spray. The compound, salt, solvate, or formulation may be applies as a foliar spray. The compound, salt, solvate, or formulation may be applied as a powder. The powder may be a wettable powder.

The compound, salt, solvate, or formulation may be applied 1, 2, 3, 4, 5, 6, 7, 8, 9, 10 or more times a day. The compound, salt, solvate, or formulation may be applied once a day. The compound, salt, solvate, or formulation may be applied twice a day. The compound, salt, solvate, or formulation may be applied 1, 2, 3, 4, 5, 6, 7, 8, 9, 10 or more times per week. The compound, salt, solvate, or formulation may be applied once a week. The compound, salt, solvate, or formulation may be applied twice a week. The compound, salt, solvate, or formulation may be applied three times a week. The compound, salt, solvate, or formulation may be applied four times a week. The formulations may be applied 1, 2, 3, 4, 5, 6, 7, 8, 9, 10 or more times a month. The formulations may be applied once a month. The compound, salt, solvate, or formulation may be applied twice a month. The compound, salt, solvate, or formulation may be applied three times a month. The compound, salt, solvate, or formulation may be applied four times a month. The formulations may be applied ten times a month. The compound, salt, solvate, or formulation may be applied 15 times a month. The formulations may be applied 20 times a month.

In some instances, the measurement described herein can be made at a temperature of about 1, 2, 3, 4, 5, 6, 7, 8, 9, 10, 11, 12, 13, 14, 15, 16, 17, 18, 19, 20, 21, 22, 23, 24, 25, 6, 27, 28, 29, 30, 31, 32, 33, 34, 35, 36, 37, 38, 39, or 40° C.

In some aspects, a compound disclosed herein, e.g., AB09, stimulates bacterial phosphate solubilization activity. To demonstrate that the compound herein enhances bacterial phosphate solubilization, orthophosphate was measured in liquid cultures of *Bacillus megaterium*, a known phosphate solubilizer. Cultures of *B. megaterium* were grown in media containing only insoluble phosphorus with and without a compound such as AB09. At the start of the experiment, there was no detectable difference of orthophosphate levels in the growth media alone and media supplemented with *B. megaterium* and/or AB09. Orthophosphate was measured after 72 hours of bacterial growth. Specifically, A 5 mL culture of *B. megaterium* was seeded from a single colony into Nutrient Broth (NB) and grown overnight in a 30° C. shaker. The cell pellet was collected by centrifugation, washed twice and resuspended in water. The concentration of *B. megaterium* was measured using a Nanodrop $OD_{600}$ reading. *B. megaterium* was inoculated into liquid NBRIP media, which contains insoluble tricalcium phosphate as its sole phosphorus source. The final concentration of *B. megaterium* in the NBRIP media was $OD_{600}$=0.02 ($3\times10^3$ CFU/mL). NBRIP media was supplemented with ML in a 1% DMSO solution to a final concentration of 100 ug/ML or 1% DMSO (both were filter sterilized through a 0.2 uM filter). Cell counts at the start of the experiment (0 hours) and at 72 hours post inoculation were measured using dilution plating. At the experiment start and after 72 hours of growth, 1 mL of culture was collected from the culture tubes. The supernatant was collected by centrifugation (5 min at 13,000 rpm). The cleared supernatant was diluted 1:00 in molecular grade water and used for orthophosphate analysis. The remaining 4 mL of supernatant were collected by centrifugation for pH readings. Orthophosphate was measured using the malachite-green phosphate method (BioAssay Systems Malachite Green Phosphate Assay Kit Catalog No: POMG-25H). Briefly, the sample is mixed with a solution of Malachite Green and molybdate, which forms a green complex with free orthophosphate from the sample. Data are quantified on a plate reader at 620 nm. Unknown samples were run with a standard curve of known concentrations of orthophosphate. In some instances, at 72 hours the average concentration of orthophosphate significantly increased in *B. megaterium* cultures with ML (AB09) compared to control *B. megaterium* cultures. Phosphate solubilization in NBRIP culture media is shown at experiment start (0 h) and after 72 hours of shaking at 30° C. The left axis corresponds to box plots and whisker plots of the concentration of solubilized phosphate in the bacterial supernatant. The right axis corresponds to the pH of the supernatant. n=7 culture tubes for each *B. megaterium* with and without ML, and n=3 culture tubes for no bacteria with and without AB09. The malachite green phosphate assay was performed in triplicate. This two-fold phosphate solubilization gain was observed concurrently with a decrease in the pH of the supernatant, indicating that organic acid secretion may be involved in the mechanism of increased phosphate solubilization. The increased phosphate solubilization effect was also observed qualitatively via an increased clearing of insoluble phosphate in culture tubes containing the AB09 treatment. In some instances, disclosed herein are experimental culture tubes of *B. megaterium* growing in NBRIP without ML (AB09; leftmost two tubes) and with 100 ug/mL ML (right three tubes). An increased clearing of the insoluble phosphate is apparent with AB09 treatment.

In some aspects, a compound disclosed herein, e.g., AB09, stimulates phosphate solubilization of innate soil microbes. The induced phosphate solubilization enhancement was tested for in plant-free soil, which contains an innate diverse microflora of bacteria and fungi. Soil was evenly distributed into pots, half of which were pressure-sterilized in an autoclave. Half of the sterile and half of the non-sterile soil received a treatment. Control pots received a mock treatment. Pots were covered, incubated at room temperature, and orthophosphate levels were measured after twelve days. Specifically, four ounces of commercially available potting soil (Sunshine Mix No. 4 Aggregate plus mycorrhizae) were added to 6 oz pots. Three replicates pots were made for each sterile control, sterile+ML, non-sterile control, and non-sterile+ML. For the sterile condition, pots were covered with foil and autoclaved for 20 min. Non-sterile pots were not autoclaved, however all pots were administered treatment in the sterile hood and the treatments themselves were sterile. Twenty five milliliters of treatment, either 24 ug/mL ML in 1% DMSO, or 25 mL of 1% DMSO (for controls) were applied to the pots. Pots were covered with foil and allowed to sit at room temperature for 12 days. Prior to soil sampling, soils were thoroughly mixed by shaking and allowed to air dry. Three replicates of 20 mg air dried soil were measured from each pot and placed into 1.5 mL eppendorf tubes. One mililiter of Bray-P1 extractant (see Bray, R. H. and Kurtz, L. T. (1945) Determination of total, organic, and available forms of phosphorus in soils. *Soil Science*, 59:39-45) was added to each tube and tubes were shaken vigorously for 1 min, and allowed to sit for 4 min. Samples were centrifuged (13,000 rpm for 5 min) and the supernatant was collected into a new tube. A 1:10 dilution of cleared supernatant in water was used for the malachite green phosphate assay (described above). In some instances, disclosed herein are measured phosphate levels at 12 days post treatment. Three stars (***) represents a significant difference at p<0.001. Letters indicate statistical differences of at least p<0.01. n=3 pots per treatment, three technical replicates from each pot were tested. The malachite green phosphate assay was performed in triplicate for every test. It was observed that non-sterile soil (ie, with innate microbial activity) produced an increased level of orthophosphate compared to sterilized soil, indicating that the innate microbial activity of the potting soil is solubilizing phosphate. Remarkably, the level of orthophosphate was significantly increased with AB09 treatment in non-sterile soils. The AB09-induced phosphorus enhancement was not observed in sterile soil, indicating that AB09 enhances the phosphate solubilization activity of innate soil microbes. In some instances, disclosed herein is an experimental design of the plant-free soil pot experiment, including covered pots of sterile control soil, sterile soil plus ML (AB09), non-sterile control soil, and non-sterile soil plus ML. These results demonstrate that AB09 is a beneficial soil amendment that causes a significant increase in soil available phosphate. This effect was observed both in pure cultures of soil bacteria (*B. megaterium*) and in the innate soil microflora of commercial potting mix. The AB09 mode of action depends upon the soil's microbial community, as sterilized soil with AB09 did not show an increase in orthophosphate compared with non-sterile soil with AB09. Interestingly, AB09 has an effect on pure bacterial strains in the absence of fungal or other bacterial interactions, indicating that higher level symbiotic interactions (e.g., plant-fungal, bacterial-fungal) may not be required for AB09-induced phosphate solubilization enhancement.

EXAMPLES

Example 1. AB09 Stimulates Phosphate Solubilization Activity of a Pure Isolate of Soil Bacterium A strain of *Bacillus megaterium* (*B. megaterium*) was isolated from Iowa field soil and confirmed its ability to solubilize phosphorus by observing a cleared zone (or halo) around *B. megaterium* colonies when grown on solid media (NBRIP+Agar) containing only in insoluble form of phosphorus, $Ca_3(PO_4)_2$. Cultures of *B. megaterium* were then grown in liquid NBRIP (containing only insoluble $Ca_3(PO_4)_2$) with and without AB09. The growth media supernatant was analyzed for orthophosphate at the start of the experiment (0 h) and after 72 hours of growth by the malachite green quantification method.

At the start of the experiment, there was no detectable difference of orthophosphate levels in the growth media alone and media supplemented with *B. megaterium* and/or AB09. As shown in FIG. 1A, at 72 hours the average concentration of orthophosphate significantly increased in *B. megaterium* cultures with AB09 compared to control *B. megaterium* cultures mock treated with water. A two-fold phosphate solubilization increase was observed concurrently with a decrease in the pH of the growth media, indicating that organic acid secretion may be involved in the mechanism of phosphate release. Increased phosphate solubilization can also be observed qualitatively via an increased clearing of insoluble phosphate in culture tubes containing the AB09 treatment (FIG. 1B).

Figure 1B:
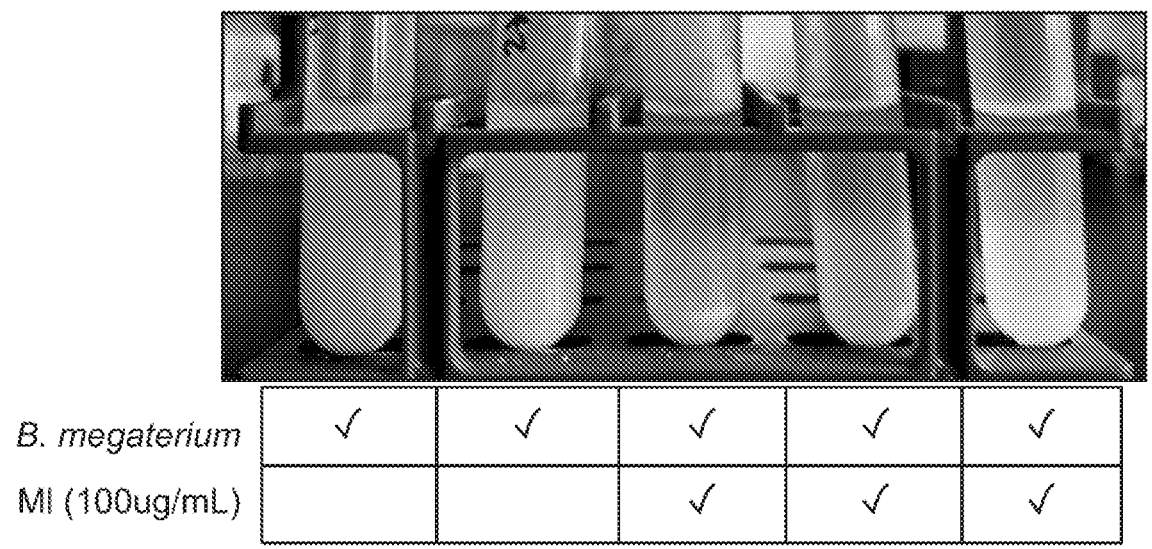

FIGS. 1A and 1B show that AB09 increases phosphate solubilization in *Bacillus megaterium* cultures. FIG. 1A illustrates phosphate solubilization in NBRIP culture media at experiment start (0 h) and after 72 hours of shaking at 30° C. The left axis corresponds to box plots and whisker plots of the concentration of available phosphate (orthophosphate) in the bacterial supernatant. The right axis corresponds to the pH of the supernatant (displayed as squares). n=7 culture tubes for each *B. megaterium* with and without AB09 100 ug/mL (green and purple boxes, respectively), and n=3 culture tubes for no bacteria with and without AB09 (yellow and grey boxes, respectively). The malachite green phosphate assay was performed in triplicate. FIG. 1B illustrates an example of experimental culture tubes of *B. megaterium* growing in NBRIP without AB09 (leftmost two tubes) and with 100 ug/mL AB09 (right three tubes). An increased clearing of the insoluble phosphate is apparent with AB09 treatment.

Example 2. AB09 Stimulates Phosphate Solubilization May Require Soil Microbes

The effect of AB09 on a soil microbiome's innate ability to solubilize phosphorus was tested using commercially available soil, which contains a diverse microflora of bacteria. To show if soil microbes may be required for AB09 activity, both sterile and non-sterile soil were treated with AB09. After 12 days of incubation soil phosphorus was extracted using the Bray-1P method and quantified using the malachite green assay.

Figure 2:
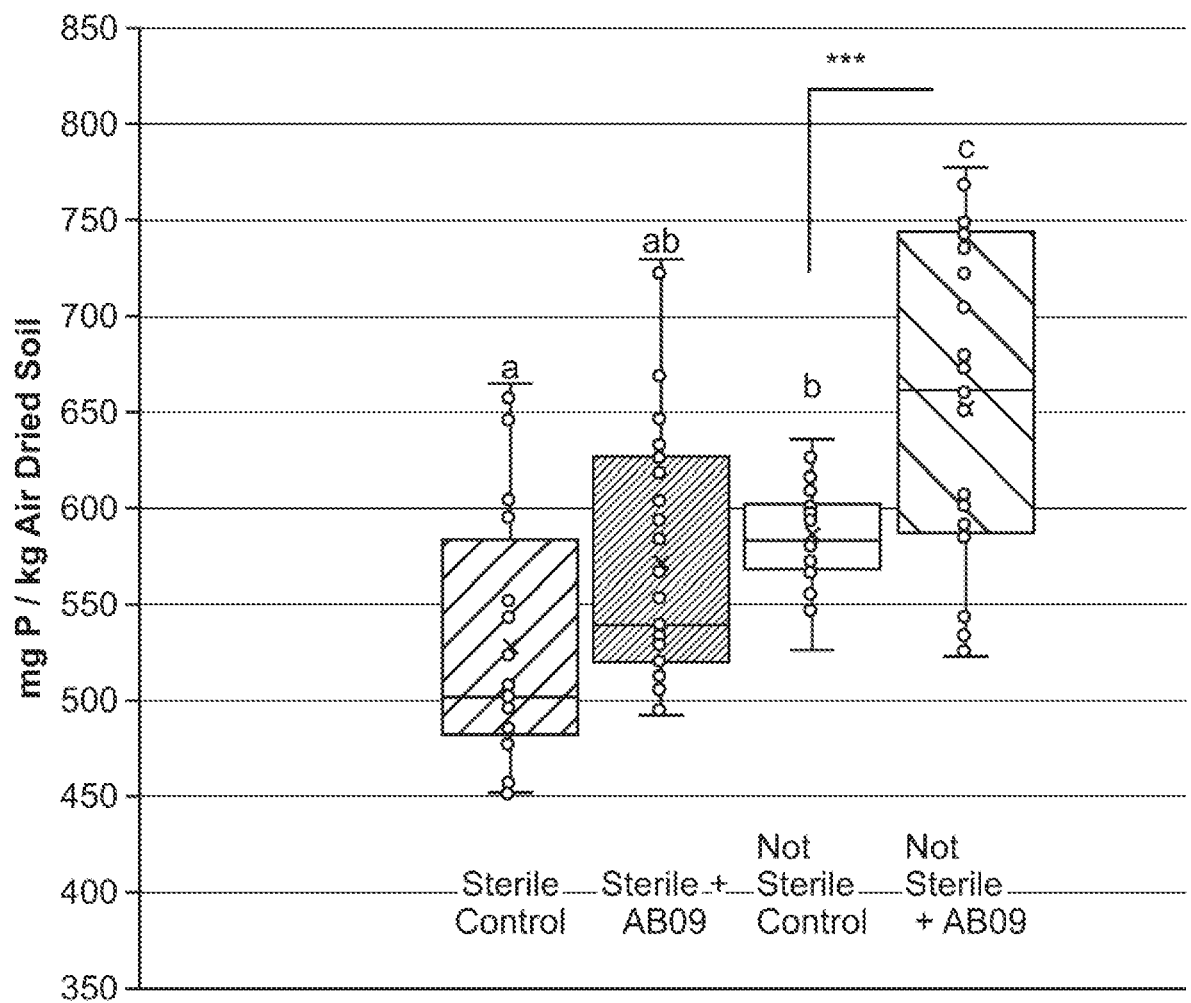
FIG. 2 shows live microbes may be required for AB09-induced phosphate solubilization activity in soil.

As shown in FIG. 2, non-sterile soil (with innate microbial activity) produced an increased level of orthophosphate compared to sterilized soil, indicating that the innate microbial activity of the soil is solubilizing phosphate. The level of orthophosphate was significantly increased in non-sterile soils with AB09 treatment. The AB09-induced phosphorus enhancement was not observed in sterile soil, indicating that AB09 enhances the phosphate solubilization activity of innate soil microbes.

FIG. 2 shows that live microbes may be required for AB09-induced phosphate solubilization activity in soil. Phosphate levels at 12 days post treatment. Three stars (***) represents a significant difference at $p<0.001$. Letters indicate statistical differences of at least $p<0.01$. $n=3$ pots per treatment, three replicates from each pot were tested. Orthophosphate was measured using the malachite-green phosphate method.

Figure 3:
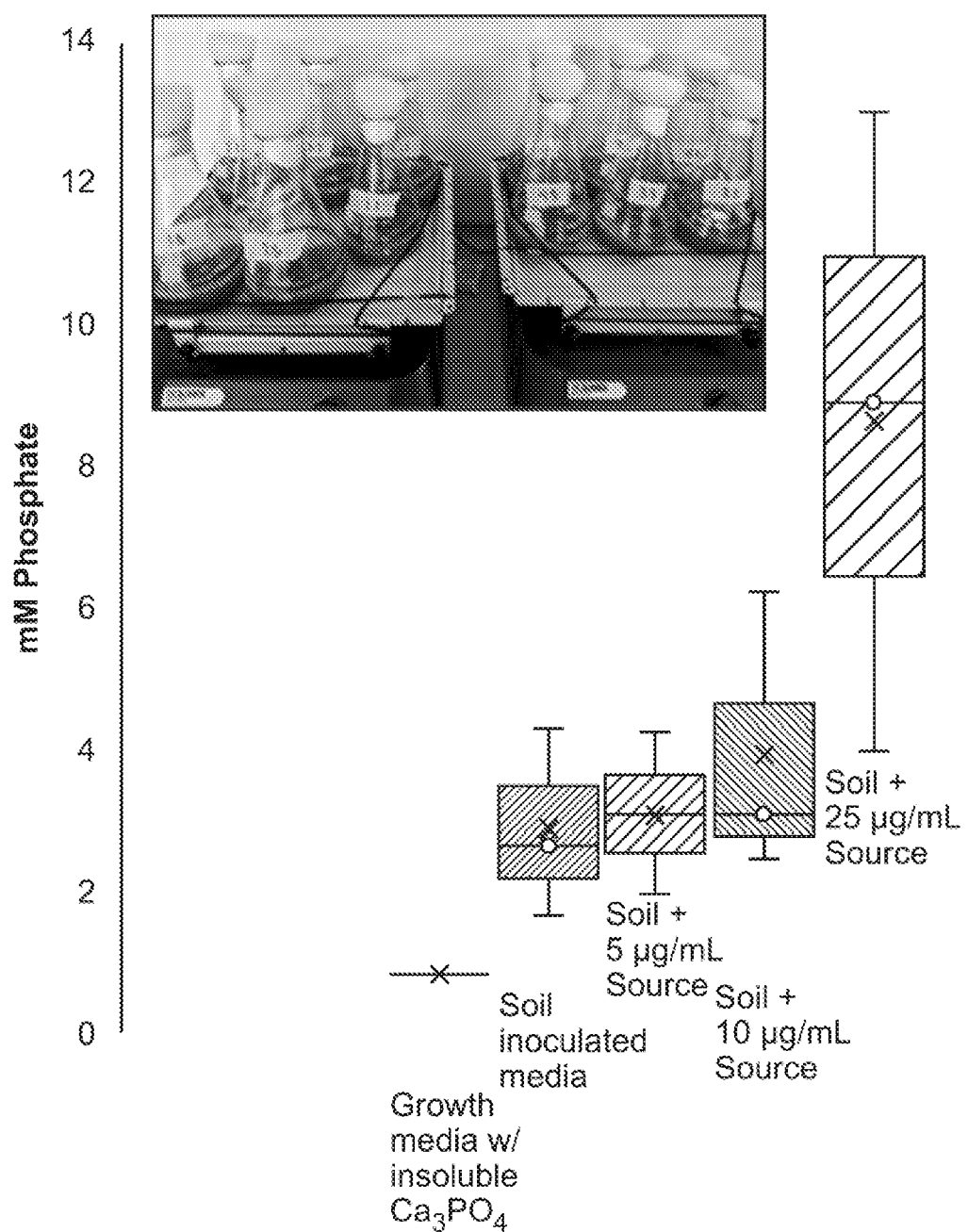
FIG. 3 shows that AB09 induced phosphate solubilization activity occurs in a dose-dependent manner in soil consortia cultures.

Example 3. AB09 Stimulates Phosphate Solubilization in a Dose-Dependent Manner in Soil-Inoculated Cultures To select for the native soil microbial consortia that solubilize phosphorus, a small quantity of soil was inoculated into flask cultures of NBRIP media. Flasks were treated with increasing amounts of AB09 and grown at room temperature on orbital shakers for 4 days. The cleared supernatant of the soil cultures were quantified for available phosphorus using the malachite green method. As shown in FIG. 3, the ability of soil consortia cultures to solubilize phosphorus was enhanced by AB09 in a dose-responsive manner, where the highest treatment (25 ug/mL AB09) increased the phosphate concentration over the untreated control by 2-3 fold.

FIG. 3. AB09 induced phosphate solubilization activity occurs in a dose-dependent manner in soil consortia cultures. 50 mL of NBRIP growth medium was added to 250 mL baffled flasks, containing 500 mg of 2 mm particle-sized soil, to select for phosphate solubilizing microbes. Flasks with sterilized foam caps were placed on orbital shakers at 110 RPM for 4 days at room temperature. Orthophosphate was measured using the malachite-green phosphate method.

Figure 4A:
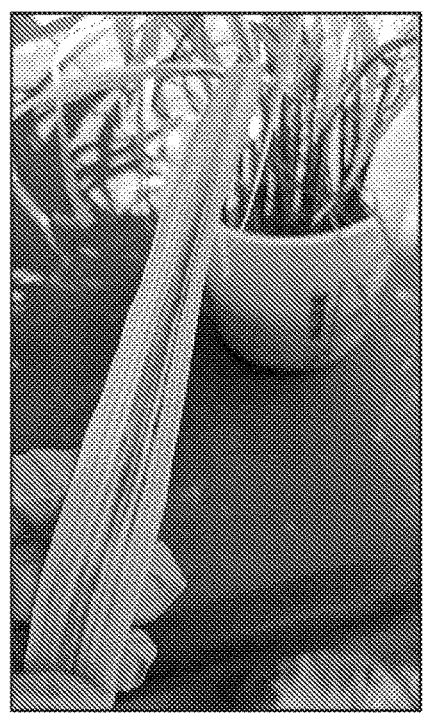
FIGS. 4A, 4B, and 4C show that AB09 stimulated phosphate solubilization when applied directly to the soil or when applied as a spray to plant foliage.
Figure 4B:

Example 4. AB09 Stimulates Phosphate Solubilization when Applied as a Foliar Spray in Corn In order to test the ability of AB09 to stimulate a phosphate solubilization phenotype when applied on plants versus directly into soil, a 3 week old corn plant was introduced into the soil consortia cultures. Approximately two weeks prior to the experiment, corn plants were removed from soil and roots were cleaned of potting soil. Plants were left in tap water to induce nutrient stress and showed purple streaking, a typical sign of phosphate starvation (FIG. 4A). Corn leaves were sprayed with AB09 (roots protected with foil during spray application) and roots were placed in flasks of NBRIP liquid media and soil inoculant (FIG. 4B). The flasks were placed on a low speed orbital shaker under fluorescent lights and the media supernatant was tested for phosphate concentration after 24 h.

Figure 4C:
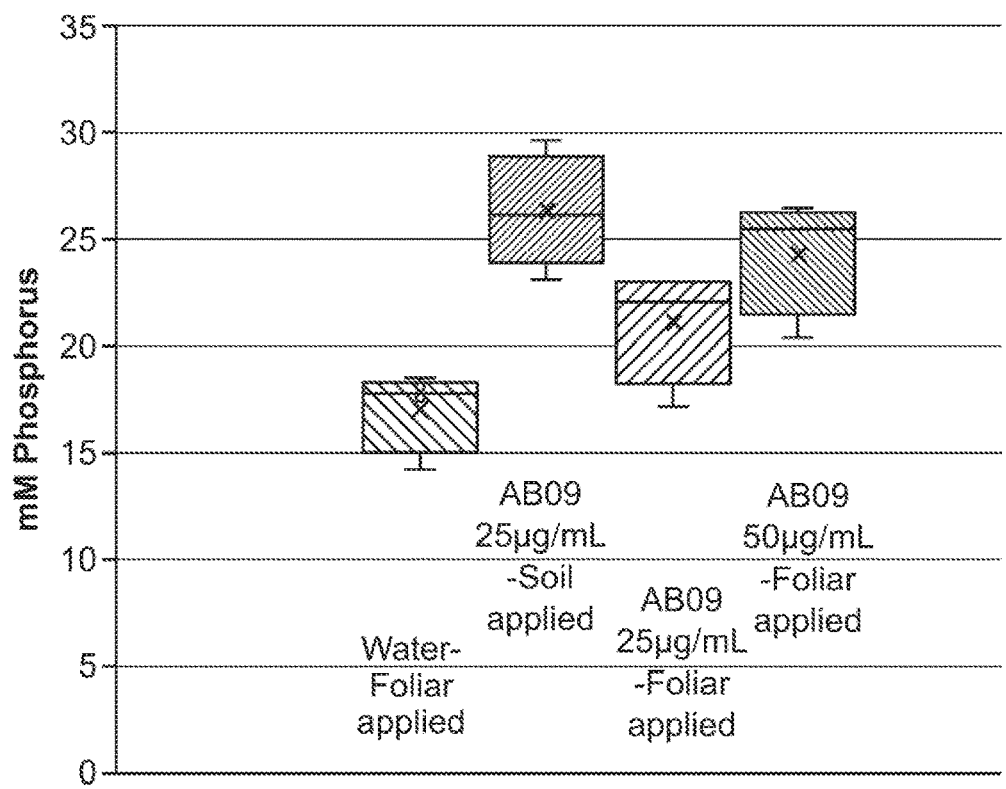

An increase in phosphate solubilization was observed in response to AB09 treatment applied to corn leaves as a foliar spray (at two treatment doses) and also when directly applied to the soil supernatant (FIG. 4C).

FIGS. 4A, 4B, 4C show that AB09 stimulated phosphate solubilization when applied directly to the soil or when applied as a spray to plant foliage. FIG. 4A illustrates that B73 Corn plants were grown until V3 growth stage, removed from soil, rinsed, and placed in tap water for 1.5 weeks to induce nutrient stress FIG. 4B illustrates that plants received either foliar (3 mL/plant using a fingertip sprayer) or soil applied treatments and were placed in 250 mL baffled flasks containing 50 mL NBRIP growth medium ([53 mM] $Ca_3(PO_4)_2$) and 500 mg of 2 mm particle-sized soil. Flasks with treated corn and sterilized foam caps with were placed on orbital shakers at 100 RPM for 1 day at room temperature under fluorescent lights. FIG. 4C illustrates that orthophosphate was measured using the malachite-green phosphate method.

Example 5. AB09 Increases Nitrogen Fixation in a Model Free-Living Nitrogen Fixing Bacteria

*Azotobacter vinlandii* is a model free-living nitrogen fixing bacteria, or diazotroph, commonly found in soils. The acetylene reduction technique was used to determine if the nitrogen fixation activity of *A. vinlandii* is altered due to AB09 treatment. The acetylene reduction technique relies on the non-specific activity of the nitrogenase enzyme (which is responsible for reducing atmospheric dinitrogen gas $N_2$ to ammonia $NH_3$), to reduce acetylene to ethylene. Acetylene and ethylene gases were detected and quantified by GC/MS.

Figure 5:
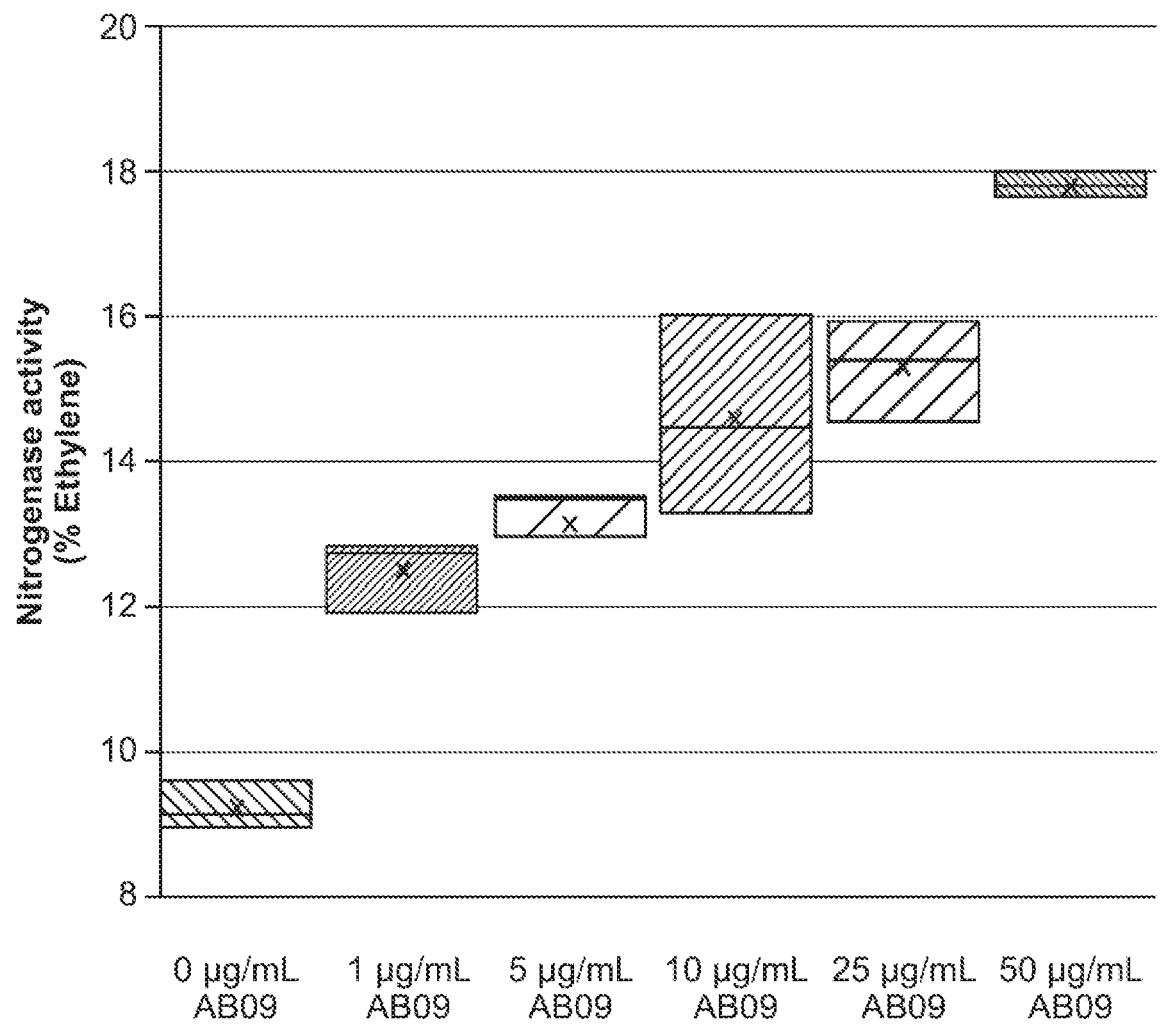
FIG. 5 shows that biological nitrogen fixation activity in *Azotobacter vinlandii* increased in a dose-responsive manner with increasing amounts of AB09 treatment.

Liquid flask cultures of *A. vinlandii* were grown in nitrogen-free growth media (Burks-N) and supplemented with varying amounts of AB09 (0 ug/mL culture received a mock treatment of water). Samples were analyzed for acetylene reduction to ethylene after 48 h of growth (cell concentration was normalized prior to the addition of acetylene). As shown in FIG. 5, a dose response relationship was observed where increased amounts of AB09 resulted in increased amounts of ethylene gas in *A. vinlandii* cultures, indicating an increase in nitrogenase activity in response to AB09.

FIG. 5 shows that biological nitrogen fixation activity in *Azotobacter vinlandii* increased in a dose-responsive manner with increasing amounts of AB09 treatment. *Azotobacter vinlandii* cultures starting from $OD_{600}=0.02$ were grown in liquid N-free bacterial growth media (Burks-N) with varying amounts of AB09 shaking at 28 C. Three flasks of bacteria were grown for each concentration of AB09. After 48 h, cultures were normalized $OD_{600}=0.1$ and 5 mL of the normalized culture was transferred to gas-tight autosampler vials. 1 mL of headspace was removed from the vial and 1 mL of acetylene gas was added to each vial. After 3 hours of incubation (with shaking at 28 C), the gas headspace of the vials was measured via GC/MS for acetylene and ethylene.

Example 6. AB09 Increases the Gene Expression of the nif Cluster of Nitrogen Fixing Genes Global gene expression profiles of *Azotobacter vinlandii* grown in nitrogen free media were compared with and without AB09 treatment using RNA sequencing (RNA-seq). AB09 treated cultures showed an increase in the expression of the three nif operon structural genes (nifH, nifD, and nifK—encoding nitrogenase) over control cultures, suggesting an upregulation of nitrogen fixation in response to AB09 (FIG. 6).

Figure 6:
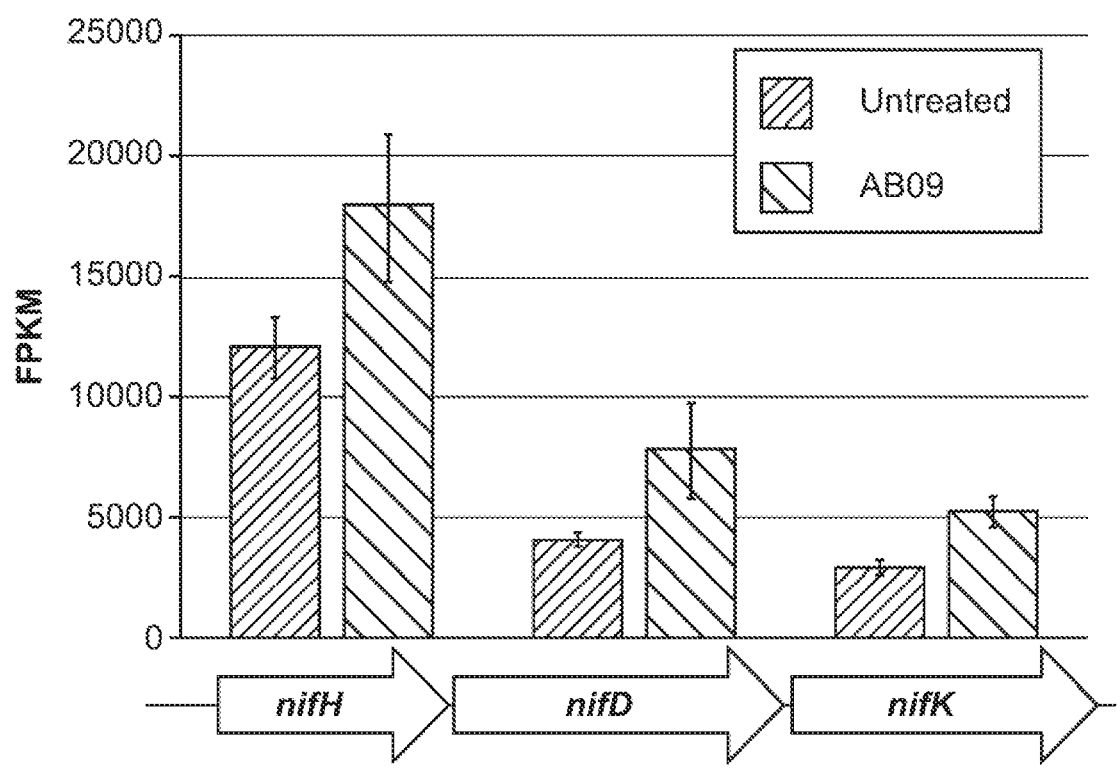
FIG. 6 shows increased relative gene expression of nitrogenase genes nifHDK in response to AB09 treatment in *Azotobacter vinlandii*.

FIG. 6 shows increased relative gene expression of nitrogenase genes nifHDK in response to AB09 treatment in *Azotobacter vinlandii*. cDNA transcripts were mapped to the *Azotobacter vinlandii* CA genome and analyzed for the identity of genes that displayed expression enrichment in AB09-over control-treated samples. Relative gene expression displayed as Fragments Per Kilobase of transcript per Million mapped reads (FPKM).

Example 7. AB09 Stimulates Nitrogen Fixation in Diverse Soil Consortia Cultures

To demonstrate whether AB09 stimulates bacterial nitrogen fixation in diverse soils, a small quantity of soil from three separate agricultural soils was inoculated into Burks-N media. One flask culture per soil received an AB09 treatment and the other received a control treatment of water. After 72 h of growth, 5 mL of each culture were analyzed for nitrogenase activity using the acetylene reduction method. Results for three soil's nitrogenase activity (% ethylene) are displayed in Table 1. In all three soils, the control treatment did not display a detectable ethylene peak, indicating an absence of nitrogen fixation, whereas the AB09 treated soil cultures did show detectable ethylene. These results indicate that AB09 stimulated biological nitrogen fixation from diverse soil samples.

TABLE 1

AB09 stimulates nitrogen fixation in soil consortia cultures. The acetylene reduction assay was used to compare levels of nitrogenase activity between nitrogen-free soil consortia cultures with and without AB09.

| Soil | Treatment | % Ethylene |
| --- | --- | --- |
| Alpha | AB09 | 14.5 |
| Alpha | Control | nd |
| Bennet | AB09 | 0.7 |
| Bennet | Control | nd |
| U of I | AB09 | 4.2 |
| U of I | Control | nd | nd = ethylene was not detected.

Example 8. AB09 Enriches the Diversity and Abundance of Diazotrophs in Soil Consortias Grown in Nitrogen-Free Growth Media 16S microbiome analysis was performed on soil-inoculated cultures grown in nitrogen free media in order to compare the effects of AB09 treatment vs control. The relative abundance of bacterial species in the AB09 and control soil cultures are displayed in FIG. 7 in a stacked bar graph. The AB09 treatment increased the abundance of two known nitrogen fixing bacteria, *Azotobacter chroococcum* and *Pseudomonas stutzeri* (indicated with a *). The increased abundance of these diazotrophs in response to AB09 is consistent with the increased nitrogenase activity observed in Table 1 for Alpha soil.

Figure 7:
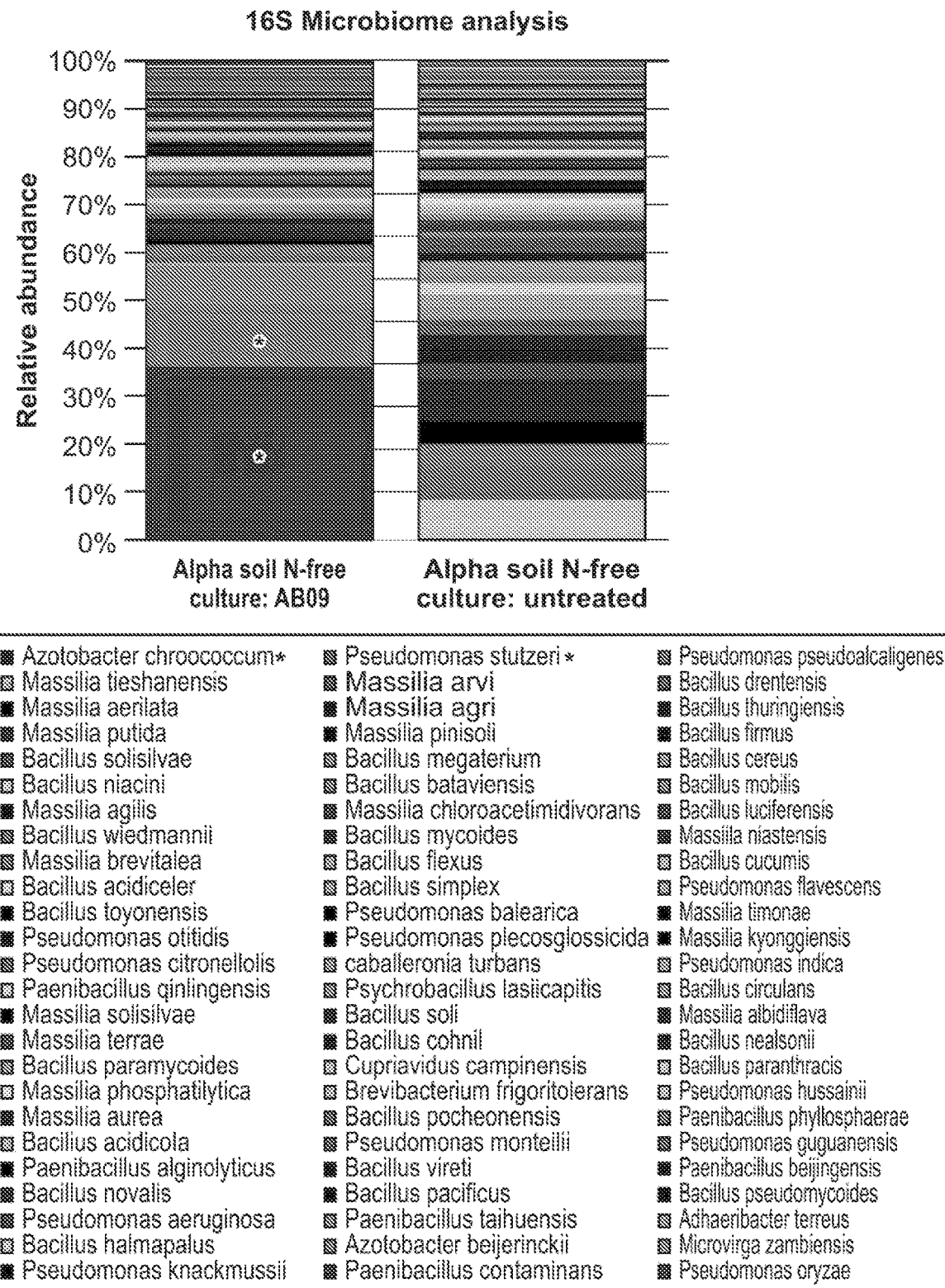
FIG. 7 shows that AB09 treatment increased the population of nitrogen fixing bacteria in soil consortia cultures.

FIG. 7 shows that AB09 treatment increased the population of nitrogen fixing bacteria in soil consortia cultures. Known nitrogen fixing bacteria are indicated with an asterisk (*). Soil inoculated cultures (from Alpha Ag soil culture from Table 1) experience an increase in the relative abundance of diazotrophs when treated with AB09.

Example 9. AB09 Stimulates Plant Growth in Plant Bioassays

To determine the effect of AB09 on plants, AB09 was seed treated at a rate of 1 ug/seed onto wheat seeds. Plants were analyzed four days after emergence. AB09 resulted in an increase in plant growth for shoot height, root surface area, and root length (FIG. 8).

Figure 8:
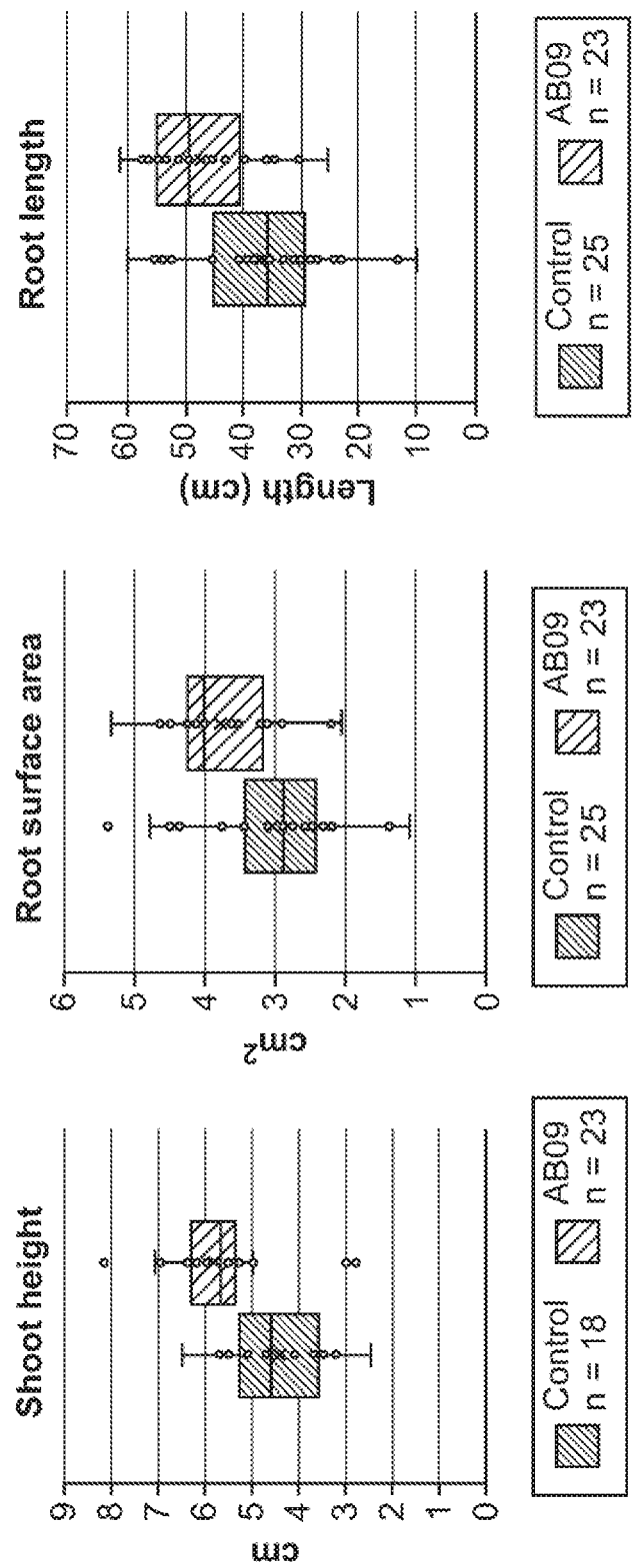
FIG. 8 shows that AB09 stimulated plant growth in roots and shoots.

FIG. 8 shows that AB09 stimulated plant growth in roots and shoots. AB09 was applied to wheat seeds, which were planted in sand and shoots were measured for height at four days post-emergence. Control seeds received a mock treatment. The WinRhizo Pro root scanner and software were used to obtain root length and surface area.

Example 10. AB09 Structure-Activity Relationship

Figure 9A:
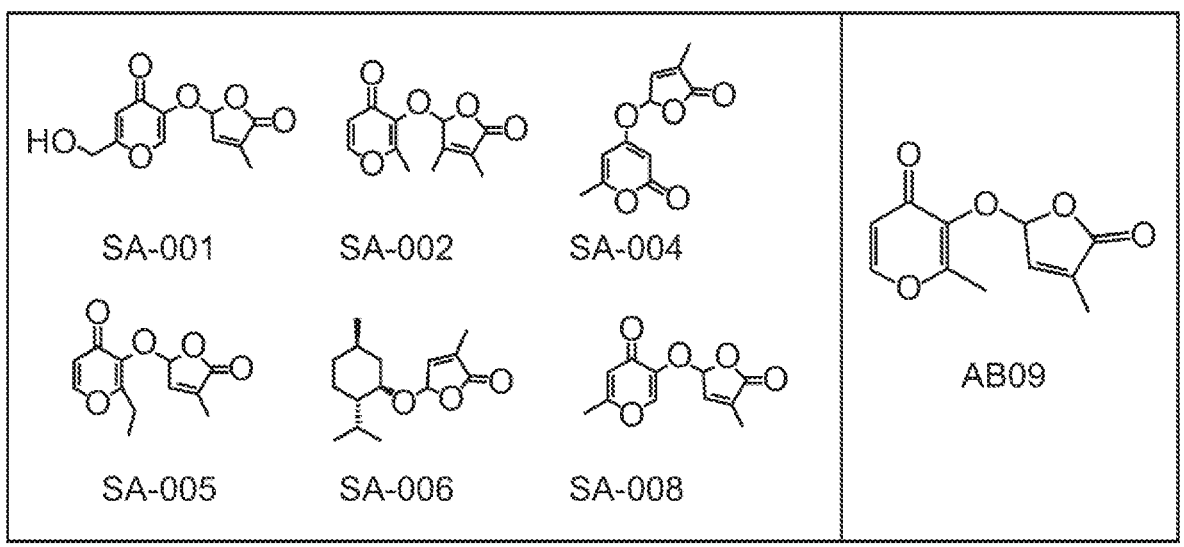
FIGS. 9A and 9B show structural derivatives of AB09 have differential effects on phosphate solubilization in *Bacillus megaterium*.
Figure 9B:
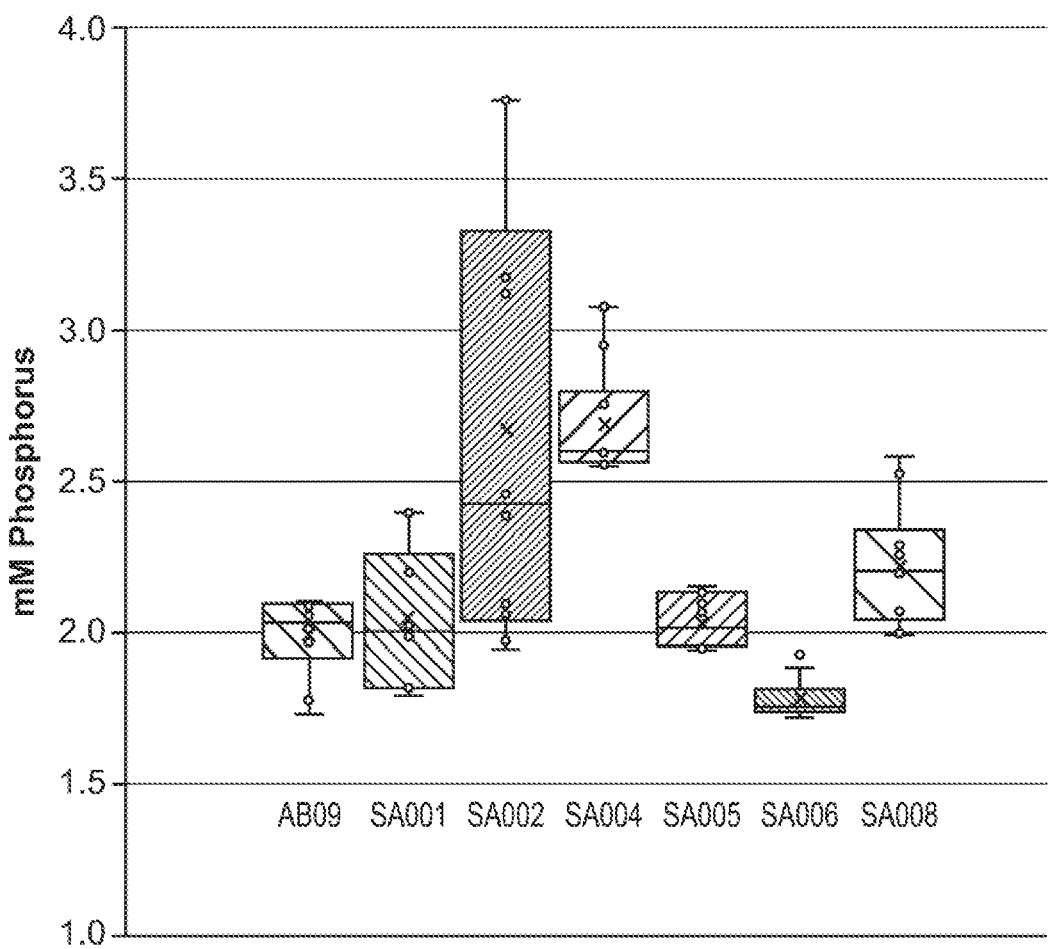

To determine the structure-activity relationship of AB09, new molecules were synthesized that represent variations of the AB09 original structure, such as moving the position of the butenolide ring (FIG. 9A). These derivative molecules were tested against AB09 for phosphate solubilization effect in *Bacillus megaterium*. As shown in FIG. 9B, the derivatives of AB09 had diverse responses in their ability to affect bacterial phosphate solubilization. For example, SA-001 and SA-005 treatments did not differ from AB09, whereas SA-002 and SA-004 showed an enhanced phosphate solubilization effect. SA006 treatment decreased phosphate solubilization compared to the original AB09 molecule. These results indicate that there are diverse opportunities to enhance the effects of AB09 on soil microbes through structural modifications.

FIGS. 9A and 9B show structural derivatives of AB09 have differential effects on phosphate solubilization in *Bacillus megaterium*. FIG. 9A illustrates chemical structure of AB09 and AB09-derivatives for structure-activity relationship studies. FIG. 9B illustrates treatments of AB09 derivatives reveal differential abilities to increase phosphate solubilization in *Bacillus megaterium* compared to the original AB09 molecule.

Additional Method Details for Examples 1-10

Phosphate Solubilization Assay with *Bacillus megaterium*

A 5 mL culture of *B. megaterium* was seeded from a single colony into Nutrient Broth (NB) and grown overnight in a 30° C. shaker. The cell pellet was collected by centrifugation, washed twice and resuspended in water. The concentration of *B. megaterium* was measured using a Nanodrop $OD_{600}$ reading. *B. megaterium* was inoculated into liquid NBRIP media, which contains insoluble tricalcium phosphate [53 mM] $Ca3(PO_4)_2$) as its sole phosphorus source. The final concentration of *B. megaterium* in the NBRIP media was $OD_{600}$=0.02 ($3\times10^3$ CFU/mL). NBRIP media was supplemented with AB09 in a 1% DMSO solution to a final concentration of 100 ug/mL. AB09 and DMSO were filter sterilized through a 0.2 uM filter.

At the experiment start and after 72 hours of growth, 1 mL of culture was collected from the culture tubes. The supernatant was collected by centrifugation (5 min at 13,000 rpm). The cleared supernatant was diluted 1:00 in molecular grade water and used for orthophosphate analysis with the malachite-green method. The remaining 4 mL of supernatant were collected by centrifugation and used for pH readings.

Phosphate Measurement Using the Machite-Green Method

Orthophosphate was measured using the malachite-green phosphate method (BioAssay Systems Malachite Green Phosphate Assay Kit Catalog No: POMG-25H). Briefly, a diluted sample is mixed with a solution of Malachite Green and molybdate, which forms a green complex with free orthophosphate from the sample. Data are quantified on a plate reader at 620 nm. Unknown samples were run with a standard curve of known concentrations of orthophosphate. The standard curve and linear fit line were calculated based on the μM orthophosphate concentrations of the standards. The μM concentrations of the unknown samples were determined using the equation of the linear fit line from the known standards.

Phosphate Solubilization in Commercial Soil

Four ounces of commercially available potting soil (Sunshine Mix No. 4 Aggregate plus mycorrhizae) were added to 6 oz pots. Three replicates pots were made for each sterile control, sterile+AB09, non-sterile control, and non-sterile+AB09. For the sterile condition, pots were covered with foil and autoclaved for 20 min. Non-sterile pots were not autoclaved, however all pots were administered treatment in the sterile hood and the treatments themselves were sterile. Twenty five milliliters of treatment, either 24 ug/mL AB09 in 1% DMSO, or 25 mL of 1% DMSO (for controls) were applied to the pots. Pots were covered with foil and allowed to sit at room temperature for 12 days. Prior to soil sampling, soils were thoroughly mixed by shaking and allowed to air dry. Three replicates of 20 mg air dried soil were measured from each pot and placed into 1.5 mL Eppendorf tubes. One milliliter of Bray-P1 extractant was added to each tube, and tubes were shaken vigorously for 1 min and allowed to sit for 4 min. Samples were centrifuged (13,000 rpm for 5 min) and the supernatant was collected into a new tube. A 1:10 dilution of cleared supernatant in water was used for phosphate quantification using the malachite green method.

Phosphate Solubilization in Soil-Inoculated Cultures 50 mL of NBRIP growth medium was added to 250 mL baffled flasks, containing 500 mg of 2 mm particle-sized soil, to select for phosphate solubilizing microbes. AB09 stock solution (10 mg/mL) was prepared in distilled water. Untreated controls received no AB09. An NBRIP only treatment (no soil or AB09) was used as a negative control.

Flasks with sterilized foam caps were placed on orbital shakers at 110 RPM for 4 days at room temperature. 500 μl aliquots of supernatant were removed in duplicate from each biological replicate and placed into 1.5 mL microcentrifuge tubes. Samples were centrifuged at 13,000 rpm for 5 minutes. Supernatant from samples were removed and placed into new microcentrifuge tubes for orthophosphate quantification using the malachite green method.

Phosphate Solubilization with Corn

B73 Corn plants were propagated in Sunshine mix 4 under fluorescent lights until V3 growth stage. Roots were rinsed free of soil particles and placed into 1 L beakers containing only tap water. Plants were nutrient starved until displaying phosphate deficient phenotype (approx. 1-2 weeks). Corn roots were covered with foil to prevent contact from foliar application.

AB09 stock solution (10 mg/mL) was prepared by dissolving active ingredient in distilled water and placing on a stir plate until fully resuspended into solution. Plants received either foliar (3 mL/plant using a fingertip sprayer) or soil applied treatments and were placed in 250 mL baffled flasks containing 50 mL NBRIP growth medium and 500 mg of 2 mm particle-sized soil. Untreated controls received distilled water whereas AB09 treated replicates received 25 μg/mL or 50 μg/mL of active ingredient, from freshly prepared stock solution.

Flasks with treated corn and sterilized foam caps with were placed on orbital shakers at 100 RPM for 1 day at room temperature under fluorescent lights. 500 μl aliquots of supernatant were removed in duplicate from each biological replicate and placed into 1.5 mL microcentrifuge tubes. Samples were centrifuged at 13,000 g for 5 minutes. Supernatant from samples were removed and placed into new microcentrifuge tubes for orthophosphate analysis.

Acetylene Reduction Method to Measure Nitrogen Fixation in *Azotobacter vinlandii*

*Azotobacter vinlandii* (Lipman ATCC® BAA-1303) liquid cultures were seeded into a 50 mL culture of nitrogen free media (Burks-N) at a starting concentration of $OD_{600}=0.02$. Cultures were grown in 250 mL flasks on an orbital platform shaker at 150 rpm. Sterile filtered AB09 (dissolved in molecular grade water) was added to 25 ug/mL, and equivalent amounts of sterile filtered water were added to control cultures. After 48 h, cultures were normalized to $OD_{600}=0.8$ with Burks-N. Five mL of the normalized $OD_{600}=0.8$ culture was transferred to a glass 20 mL screw vial (Agilent Cat No. 5188-2753) with magnetic PTFE cap (Agilent Cat No. 5188-2759). One mL of headspace was removed from each capped vial using a gastight 1 mL syringe, and replaced with 1 mL of acetylene gas (Airgas). Vials of bacterial cultures were incubated with acetylene for 3 hours, shaking at 275 rpm at 30 C. Samples were submitted to the UC Berkeley Mass Spectrometry Facility (http://qb3.berkeley.edu/msf/analysis-techniques/) and headspace gas samples were run using an autosampler on an Autospec magnetic sector mass spectrometer equipped with a gas chromatograph with a Carboxen-1010 with 0.32 mm ID column.

RNA-seq of *Azotobacter vinlandii*

A starter liquid culture of *A. vinlandii* in Burks-N media (at $OD_{600}=0.02$) was divided into six flasks. Three flasks received AB09 at 25 ug/mL and three received a mock treatment. RNA was collected at 48 h of growth. One mL of 48 h cultures of *Azotobacter vinlandii* were pelleted for 3 minutes as 13,000 rpm. Supernatant was removed and pellets were flash frozen in liquid nitrogen. RNA was extracted with the Norgen RNA extraction kit. Ribo-depletion and sequencing libraries were constructed by Seqmatic, Inc. (Fremont, CA). Illumina single-end reads of 150 nt were mapped using bowtie (-v 2 -k2 -chunkmbs 3000) to the *Azotobacter vinelandii* CA (ASM38033v1) cds sequences. Custom perl scripts were used to extract the uniquely mapped reads and calculate the read count per million mapped reads (multi and uniquely mapped) per kilobase of gene for each gene.

Acetylene Reduction Method to Measure Nitrogen Fixation in Soil Consortia Nitrogen Free Cultures Soil from agricultural areas was air dried and sieved with a 2 mm sieve. Five hundred milligrams of dried, sieved soil was added to 50 mL of Burks-N media in a 250 mL baffled flask. AB09 was added to 25 ug/mL and water was added in equivalent amounts for controls. Flasks were topped with a foam plug and incubated at 30 C, shaking at 100 rpm. After 72 h, 5 mL of the soil culture was transferred to 20 mL autosampler vials and analyzed for ethylene gas with the acetylene reduction technique and GC/MS as described as above.

Microbiome Analysis of Soil Cultures Grown in Nitrogen Free Media

Soil from agricultural areas was air dried and sieved with a 2 mm sieve. Five hundred milligrams of dried, sieved soil was added to 50 mL of nitrogen free media (Burks-N) in a 250 mL baffled flask. AB09 was added to 25 ug/mL and water was added in equivalent amounts for controls. Flasks were topped with a foam plug and incubated at 30 C, shaking at 100 rpm. DNA was extracted from 250 ul of the soil culture after 72 h of growth using the Qiagen PowerSoil Pro Kit (Cat No. 47014). DNA was checked on a gel and Qubit for quality and concentration, respectively. Ten nanograms of DNA was used in the 16S barcoding kit (SQK-RAB204) with the MinION sequencer. Fastq files from MinKnow were uploaded to Epi2Me and the 16S Oxford Nanopore Technologies kit (SQK-RAB204) was selected. Custom perl scripts were used to extract and count NCBI taxid numbers and to convert the numbers to their respective taxonomic name. Read counts were normalized to the total number of reads with an identified barcode.

Wheat Plant Growth Assays

AB09 at a rate of 1ug/seed in acetone was treated onto seeds and the acetone was allowed to fully evaporate. Control seeds were mock treated with acetone. Seeds were planted in wet sand in 50 mL tubes sand, placed under fluorescent lights, and watered with tap water. Seedlings were measured four days post-emergence for shoot height. The WinRhizo Pro root scanner and software were used to obtain root length and surface area.

AB09 Structure-Activity Relationship (SAR)

AB09 derivatives were designed by Sound Agriculture. A 25 ug/mL treatment (solvent: 50% acetone) of each compound was applied to cultures of *B. megaterium* in NBRIP media $OD_{600}$=0.02, and cultures were grown shaking at 30 C. After 72 h, the supernatant was collected by centrifugation (5 min at 13,000 rpm) and diluted 1:00 in molecular grade water. Diluted supernatant was tested for orthophosphate analysis with the malachite-green method.

Example 11. AB09 Reduces Soil Phosphate Depletion in Field Trials

Figure 10:
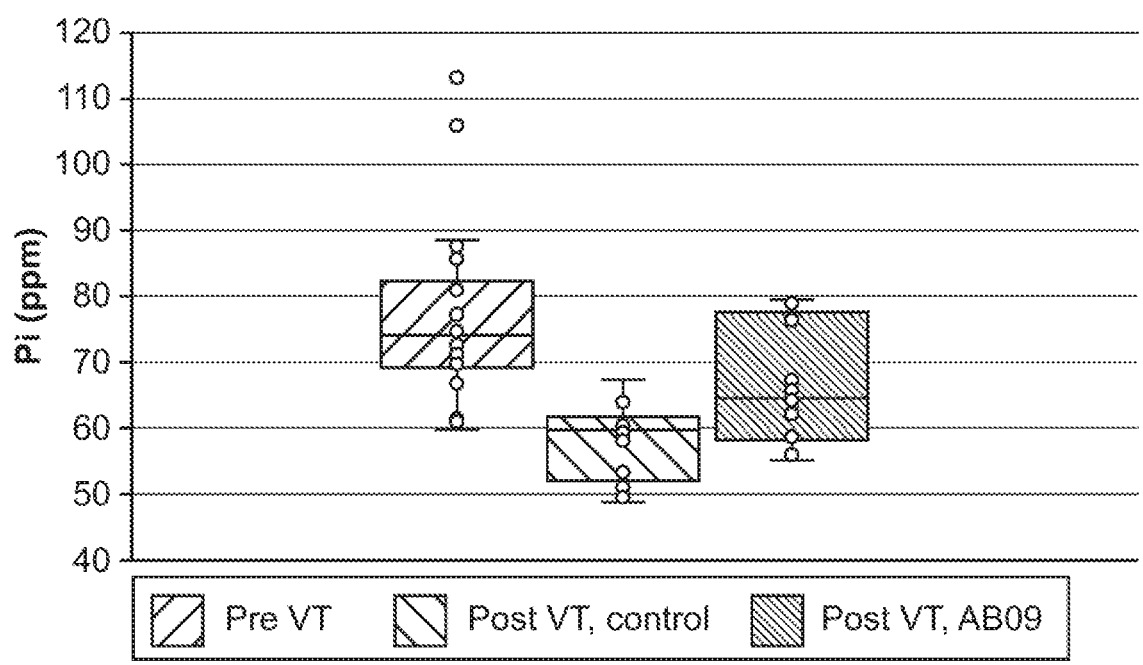
FIG. 10 shows plant available soil phosphate during a season in a field trial. Available soil phosphate was measured at the beginning of the growing season (Pre VT) and at the end of the growing season (Post VT). Addition of AB09 (ML) significantly reduced soil phosphate depletion over the course of the season, relative to an untreated control plot.

The solubilizing activity of AB09 was measured in field trials on Iowa farmland. Over the course of a growing season, plants pull available phosphate from the soil, resulting in lower levels at the end of the season versus at the beginning. This phosphate depletion can be measured with standard soil tests. FIG. 10 shows phosphate levels in parts per million in Iowa field plots at the start of the growing season (pre VT) and at the end of the season (post VT) for plots that received AB09 treatment, and those that did not. Compared to untreated plots, there is less phosphate depletion in the AB09 plots, indicating that the soil phosphate reservoir is being better replaced by microbial action as the plant growth depletes it.

Example 12. AB09 Primes Nitrogen Fixing Microbes for Symbiosis

Expression levels for all genes in a nitrogen fixing bacteria (*Bradyrhizobium japonicum*) were measured in the presence or absence of AB09 using Illumina RNASeq technology. AB09 induced genetic regulators and pathways for nitrogen fixation and for microaerophilic growth. These results indicate that AB09 signals to the nitrogen fixing bacteria to "turn on" nitrogen fixation when it otherwise would not.

Example 13. AB09 Reduces Nitrogen Deficiency Effect in the Field

Figure 11:
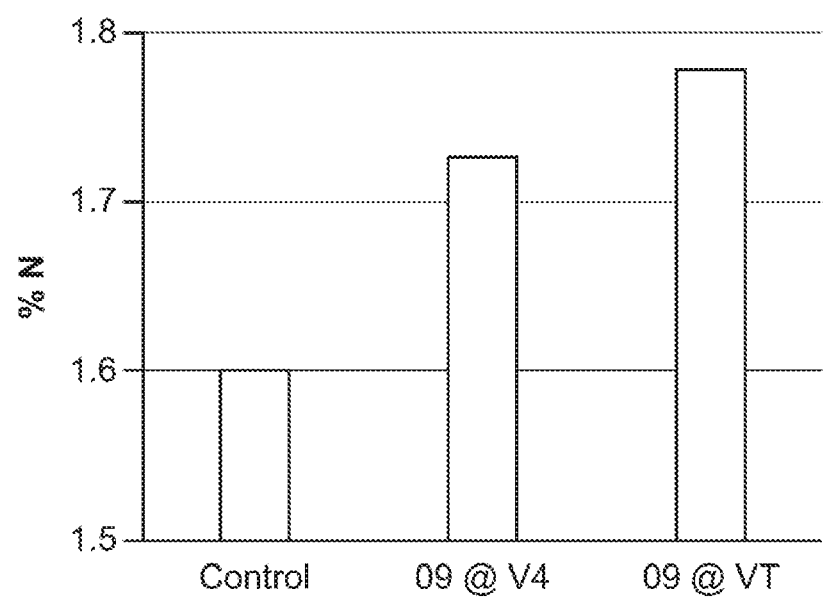
FIG. 11 shows quantification of nitrogen in corn leaf tissue samples. Administration of AB09 resulted in higher leaf nitrogen content, compared to a control sample.

Field trials in Iowa show that AB09 application reduces the negative effects of nitrogen deficiency. AB09 was applied to Buckingham, Iowa corn plots at the start of the season. In some instances, disclosed herein is a photo of corn at stage R3, with a treated plot on the right, and an untreated plot on the right. Leaf firing (yellowing on the lower leaves) is apparent on the untreated plot, where AB09 plants are greener. In some instances, disclosed herein is an aerial image of treated and untreated plots at tasseling. The image shows DNVI (greener pixels=healthier plants). AB09 treated plots show higher NDVI values across the treated strip (lower boxed plot) compared to the untreated plot (upper boxed plot). Nitrogen content was quantified using a standard tissue sampling test to measure percent nitrogen content in leaf tissue samples. FIG. 11 shows % nitrogen content in corn leaf tissue samples at plant growth stage V4 and VT, compared to an untreated VT control.

Example 14. AB09 Improves Plant Growth in in Nitrogen-Deficient Conditions

Figure 12:
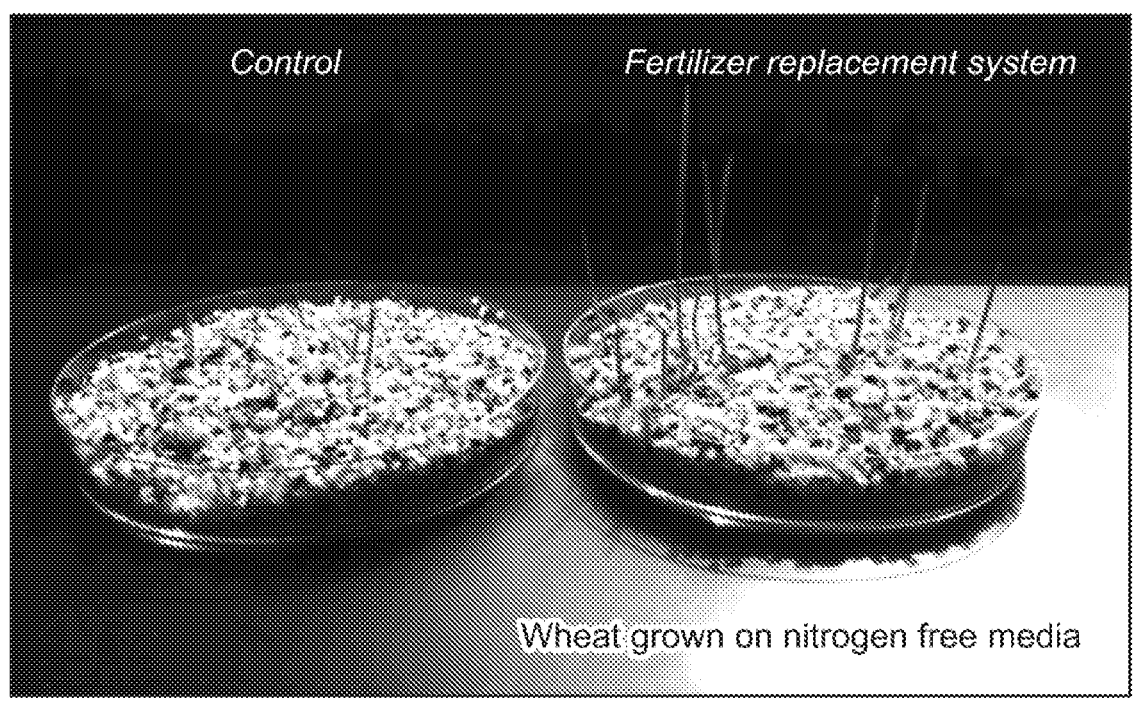
FIG. 12 shows wheat grown on nitrogen-free media. Addition of AB09 resulted in more robust growth relative to a control.
Figure 13:
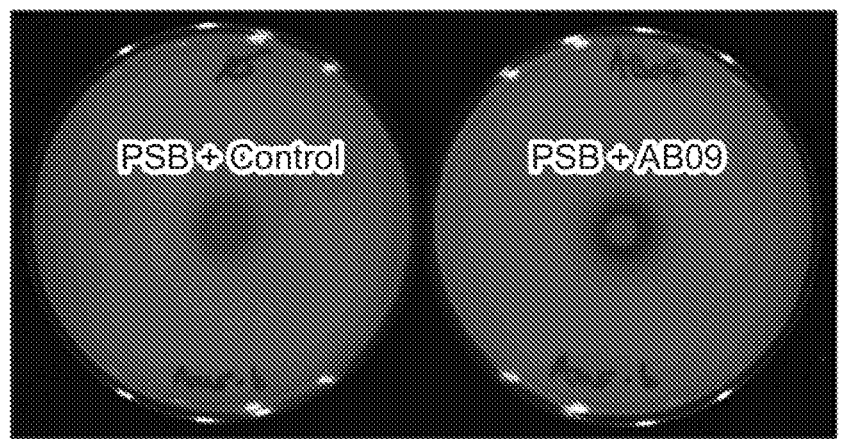
FIG. 13 shows a highly effective phosphate solubilizing bacteria (PSB), which is several fold more effective than commercial PSBs. In the agar plates containing insoluble phosphate, the AB09 treated PSB solubilization created a larger clearance "halos" around colony compared to the control treated PSB. Larger halos indicate higher microbial solubilization activity.
Figure 14:
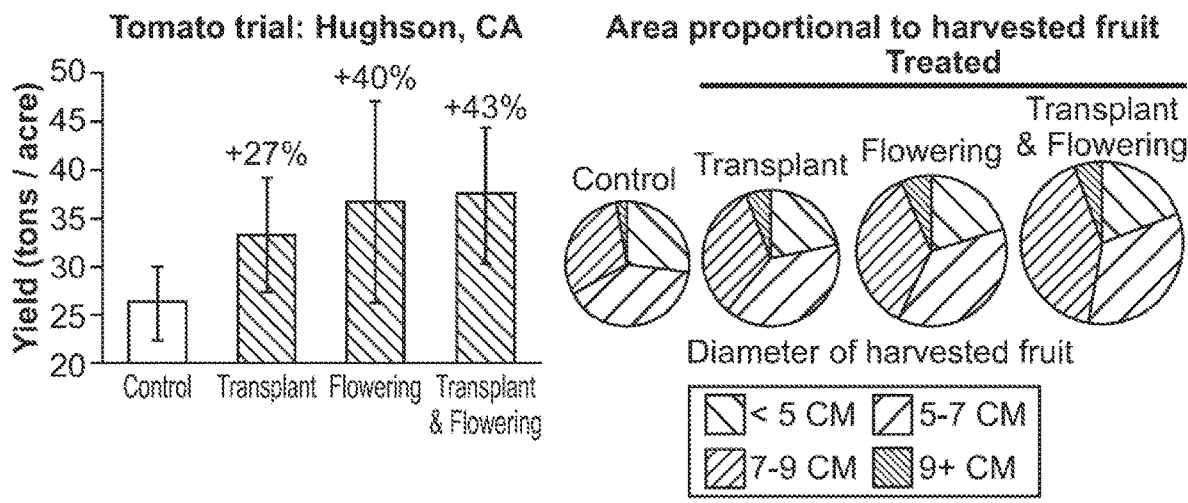
FIG. 14 shows results of field trials of AB09 in tomato and lettuce. Field trials show both increasing yield and larger, higher quality fruits. Tomato yields were increased by up to 40% in California field trials. Treated plants showed larger and more numerous fruits. AB-09 treated lettuce increased the average size of lettuce heads, resulting in a 25% increase in harvest weight.
Figure 14:
Figure 14:
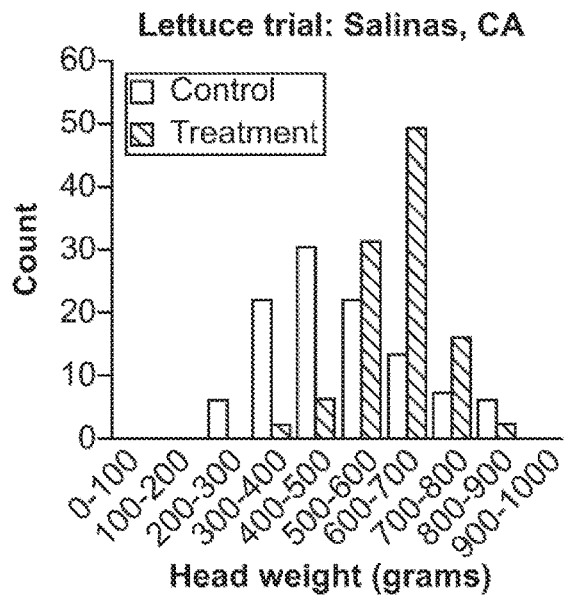

The ability of the AB09 molecule to control useful soil bacteria metabolism has implications for building integrated technology systems and groundbreaking products. In the lab, AB09 was administered in combination with a nitrogen fixing bacterium to nitrogen free media. FIG. 12 shows the results of wheat germination relative to a control lacking treatment. Wheat growth on the nitrogen free media was substantially greater than on the control media lacking treatment. This result suggests that AB09 in combination with nitrogen fixing bacteria can replace fertilizer in nitrogen poor conditions.

Example 15. Preparation of a Combination of a Phosphate Solubilizing Bacterium and a Compound Disclosed Herein, for Example AB09

A product is formulated for co-administration of a novel phosphate solubilizing bacterium (PSB), e.g., at $10^6$-$10^8$ cfu/g, and the compound, e.g., at ~4% wt/wt, in an agriculturally acceptable excipient, e.g., talc-based carrier or wettable powder. This product increases phosphorus and nitrogen availability for higher yield potential in crops. The product may have two modes of action: a PSB to help release bound phosphorus in the soil, and the compound to stimulate phosphate solubilization and/or to enhance the soil microbial environment to support the plant's nutritional availability. The formulation may be prepared as a wettable powder and/or a dry planter box application. The formulation may be applied in-furrow, on seed, or in a plantar box.

Example 16. Preparation of a Combination of a Nitrogen Fixing Bacterium and a Compound Disclosed Herein, for Example AB09

A product is formulated for co-administration of a novel nitrogen fixing bacterium, e.g., at $10^6$-$10^8$ cfu/g, and the compound, e.g., at ~4% wt/wt, in an agriculturally acceptable excipient, e.g., talc-based carrier or wettable powder. This product increases nitrogen and phosphorus availability for higher yield potential in crops. The product may have two modes of action: a nitrogen fixing bacterium to help nitrogen fixation in the soil, and the AB09 compound to increase nitrogen fixation and/or enhance the soil microbial environment to support the plant's nutritional availability. The formulation may be prepared as a wettable powder and/or a dry planter box application. The formulation may be applied in-furrow, on seed, or in a plantar box.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed. It is intended that the following claims define the scope of the disclosure and that methods and structures within the scope of these claims and their equivalents be covered thereby.

What is claimed is:
1. An agricultural formulation comprising:
one or more bacterial cells, and
a compound of Formula (3):

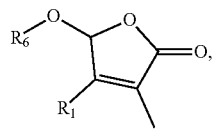

or any salt, solvate, or tautomer thereof,
wherein:
$R_1$ is H or methyl, and
$R_6$ has the structure:

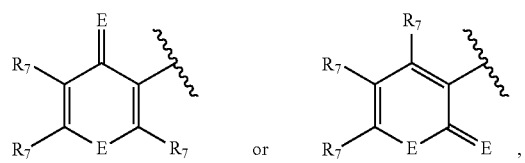

wherein each $R_7$ is independently H, substituted alkyl, or unsubstituted alkyl, and wherein each E is O.

2. A container that comprises the agricultural formulation of claim 1, optionally wherein the one or more bacterial cells and the compound, salt, solvate, or tautomer thereof are in separate compartments of the container.

3. A kit that comprises the container of claim 2 and instructions for use thereof.

4. The agricultural formulation of claim 1, wherein the one or more bacterial cells comprises an isolated bacterium, a bacterium from an inoculated or cultured soil, a wild-type bacterium, or a genetically engineered bacterium.

5. The agricultural formulation of claim 1, wherein the one or more bacterial cells is present in at least about 10 colony forming units per gram of the agricultural formulation.

6. The agricultural formulation of claim 1, wherein the compound of Formula 3 is selected from the group consisting of:

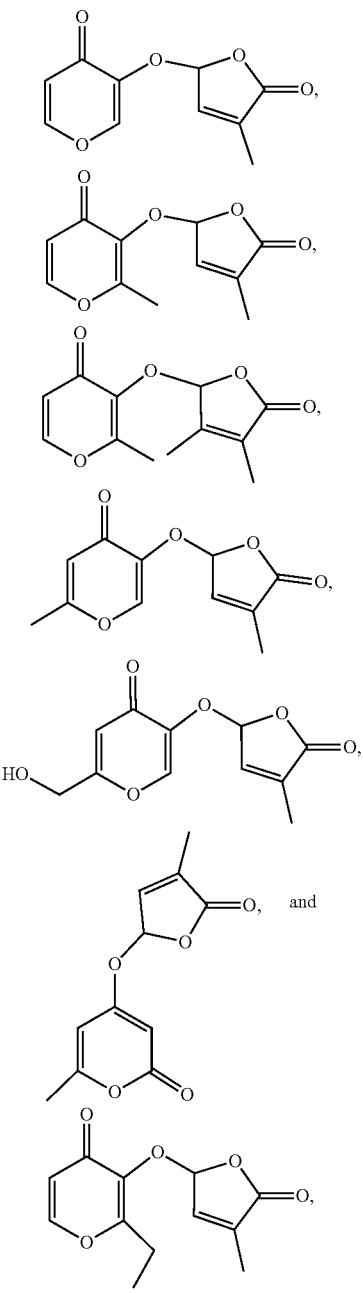

and salts, solvates, and tautomers thereof.

7. The agricultural formulation of claim 1, wherein the compound of Formula 3 is:

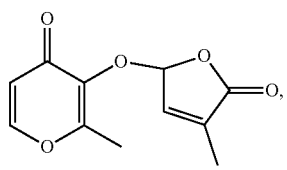 [SMILES: CC1=CC(Oc2c(C)occc2=O)OC1=O]

or a salt, solvate, or tautomer thereof.

8. The agricultural formulation of claim 1, wherein the one or more bacterial cells comprises a phosphate solubilizing bacterium.

9. The agricultural formulation of claim 1, wherein the one or more bacterial cells comprises a nitrogen fixing bacterium.

10. The agricultural formulation of claim 1, further comprising an agriculturally acceptable excipient.

11. The agricultural formulation of claim 1, wherein the one or more bacterial cells comprises at least one member selected from the group consisting of chlamydiae, green nonsulfure bacteria, acinobacteria, planctomycetes, spirochaetes, fusobacteria, cyanobacteria, thermophilic bacteria, acidobacteria, proteobacteria, *Azotobacter chroococcum, Pseudomonas stutzeri, Pseudomonas pseudoalcaligenes, Massilia tieshanesis, Massilia aerilata, Massilia putida, Bacillus solisilvae, Bacillus niacini, Massilia agilis, Bacillus wiedmannii, Massilia brevitalea, Bacillus acidiceler, Bacillus toyonensis, Pseudomonas otitidis, Pseudomonas citronellolis, Paenibacillus qinlingensis, Massilia solisilvae, Massilia terrae, Bacillus paramycoides, Massilia aurea, Bacillus acidicola, Panenibacillus alginolyticus, Bacillus novalis, Pseudomonas aeruginosa, Bacillus halmapalus, Pseudomonas knackmussii, Massilia arvi, Massilia agri, Massilia pinisoli, Bacillus megaterium, Bacillus bataviensis, Massilia chloroacetimidivorans, Bacillus mycoides, Bacillus flexus, Bacillus simplex, Pseudomonas balearica, Pseudomonas plecoglossicida, Caballeronia turbans, Psychobacillus lasiicaptis, Bacillus soli, Bacillus cohnii, Cupriavidus campinensis, Brevibacterium frigoritolerans, Bacillus pocheonensis, Pseudomonas monteilii, Bacillus vireti, Bacillus pacificus, Paenibacillus taihuensis, Azotobacter beijerinckii, Paenibacillus contaminans, Bacillus drentensis, Bacillus thuringiensis, Bacillus firmus, Bacillus cereus, Bacillus mobilis, Bacillus luciferensis, Massilia niastensis, Bacillus cucumis, Pseudomonas flavescens, Massilia timonae, Massilia kyonggiensis, Pseudomonas indica, Bacillus phyllosphaerae, Pseudomonas guguanensis, Paenibacillus beijingensis, Bacillus pseudomycoides, Adhaeribacter terreus, Microvirga zambiensis, Pseudomonas oryzae*, and any combination thereof.

12. A method comprising contacting a plant, seed, or soil with:
a compound of Formula (3):

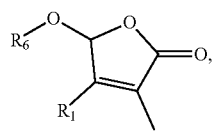

or any salt, solvate, or tautomer thereof, and
one or more bacterial cells,
wherein:
$R_1$ is H or methyl, and
$R_6$ has the structure:

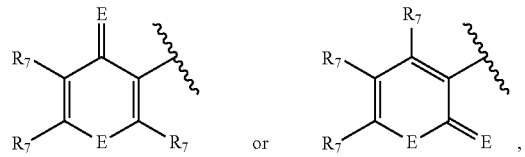

wherein each $R_7$ is independently H, substituted alkyl, or unsubstituted alkyl, and wherein each E is O.

13. The method of claim 12, wherein the plant, seed, or soil is contacted concurrently with the one or more bacterial cells and the compound of Formula (3), salt, solvate, or tautomer thereof.

14. The method of claim 12, wherein the plant, seed, or soil is contacted with the one or more bacterial cells before the compound of Formula (3), salt, solvate, or tautomer thereof.

15. The method of claim 12, wherein the plant, seed, or soil is contacted with the compound of Formula (3), salt, solvate, or tautomer thereof before the one or more bacterial cells.

16. The method of claim 12, wherein the yield of the contacted plant or seed is increased by at least about 10% compared to a substantially identical but otherwise uncontacted plant.

17. The method of claim 12, wherein the contacted plant or seed exhibits reduced leaf firing compared to a substantially identical but otherwise uncontacted plant.

18. The method of claim 12, wherein the contacting increases by at least about 10% in shoot height, root surface area, root length, or any combination thereof, compared to a substantially identical but otherwise uncontacted plant.

19. The method of claim 12, wherein the soil is a phosphate deficient soil.

20. The method of claim 12, wherein the compound, salt, solvate, or tautomer thereof is present in a concentration of at least about 1 µg/mL.

21. A method comprising contacting a compound of Formula (3):

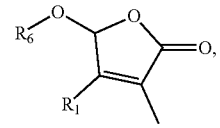

or any salt, solvate, or tautomer thereof, with a soil microbial consortium,
wherein:
$R_1$ is H or methyl, and
$R_6$ has the structure:

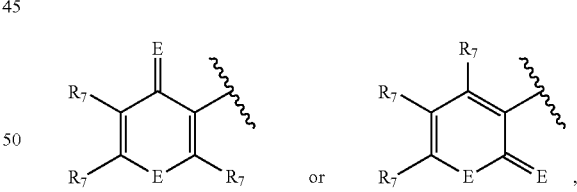

wherein each $R_7$ is independently H, substituted alkyl, or unsubstituted alkyl, and wherein each E is O.

22. The method of claim 21, wherein the method increases a population of a nitrogen fixing bacterium in the soil microbial consortium.

23. The method of claim 22, wherein the nitrogen fixing bacterium comprises *Azotobacter chroococcum, Pseudomonas stutzeri*, or a combination thereof.

24. The method of claim 21, wherein the contacted soil microbial consortium comprises one or more of *Azotobacter chroococcum, Pseudomonas stutzeri, Pseudomonas pseudoalcaligenes, Massilia tieshanesis, Massilia aerilata, Massilia putida, Bacillus solisilvae, Bacillus niacini, Massilia agilis, Bacillus wiedmannii, Massilia brevitalea,*

*Bacillus acidiceler, Bacillus toyonensis, Pseudomonas otitidis, Pseudomonas citronellolis, Paenibacillus qinlingensis, Massilia solisilvae, Massilia terrae, Bacillus paramycoides, Massilia aurea, Bacillus acidicola, Panenibacillus alginolyticus, Bacillus novalis, Pseudomonas aeruginosa, Bacillus halmapalus, Pseudomonas knackmussii, Massilia arvi, Massilia agri, Massilia pinisoli, Bacillus megaterium, Bacillus bataviensis, Massilia chloroacetimidivorans, Bacillus mycoides, Bacillus flexus, Bacillus simplex, Pseudomonas balearica, Pseudomonas plecoglossicida, Caballeronia turbans, Psychobacillus lasiicaptis, Bacillus soli, Bacillus cohnii, Cupriavidus campinensis, Brevibacterium frigoritolerans, Bacillus pocheonensis, Pseudomonas monteilii, Bacillus vireti, Bacillus pacificus, Paenibacillus taihuensis, Azotobacter beijerinckii, Paenibacillus contaminans, Bacillus drentensis, Bacillus thuringiensis, Bacillus firmus, Bacillus cereus, Bacillus mobilis, Bacillus luciferensis, Massilia niastensis, Bacillus cucumis, Pseudomonas flavescens, Massilia timonae, Massilia kyonggiensis, Pseudomonas indica, Bacillus phyllosphaerae, Pseudomonas guguanensis, Paenibacillus beijingensis, Bacillus pseudomycoides, Adhaeribacter terreus, Microvirga zambiensis, Pseudomonas oryzae*, or any combination thereof.

25. The method of claim 21, wherein in the contacted soil microbial consortium, *Azotobacter chroococcum* is present in a relative abundance of about 30% to about 40%, and *Pseudomonas stutzeri* is present in a relative abundance of about 10% to about 20%.

26. A kit that comprises two or more compartments, wherein at least one compartment contains one or more bacterial cells and at least one different compartment contains a compound of Formula (3):

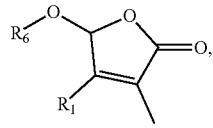

or any salt, solvate, or tautomer thereof, and
one or more bacterial cells, wherein:
$R_1$ is H or methyl, and
$R_6$ has the structure:

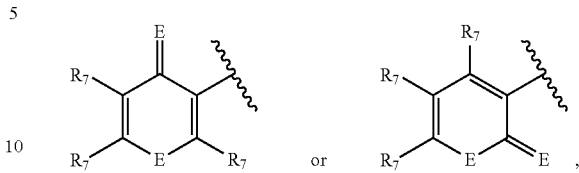

wherein each $R_7$ is independently H, substituted alkyl, or unsubstituted alkyl, and wherein each E is O.

27. A method of making an agricultural formulation, comprising admixing a phosphate solubilizing bacterium, a nitrogen fixing bacterium, or a combination thereof, with:
a compound of Formula (3):

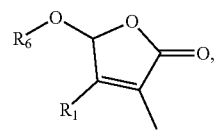

or any salt, solvate, or tautomer thereof, with a soil microbial consortium,
wherein:
$R_1$ is H or methyl, and
$R_6$ has the structure:

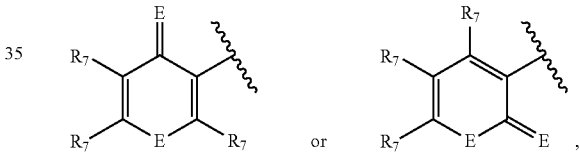

wherein each $R_7$ is independently H, substituted alkyl, or unsubstituted alkyl, and wherein each E is O.

* * * * *